(12) United States Patent
Le Gette et al.

(10) Patent No.: US 9,470,358 B2
(45) Date of Patent: Oct. 18, 2016

(54) ELECTRONIC DEVICE HOLDER WITH REPOSITIONABLE STAND AND SYSTEMS AND METHODS THEREOF

(71) Applicant: ZERO CHROMA, LLC., Sykesville, MD (US)

(72) Inventors: Brian Le Gette, Severna Park, MD (US); David Reeb, Sykesville, MD (US)

(73) Assignee: ZERO CHROMA LLC, Sykesville, MD (US)

( * ) Notice: Subject to any disclaimer, the term of this patent is extended or adjusted under 35 U.S.C. 154(b) by 0 days.

(21) Appl. No.: 13/887,036

(22) Filed: May 3, 2013

(65) Prior Publication Data

US 2014/0326852 A1 Nov. 6, 2014

(51) Int. Cl.
*F16M 13/00* (2006.01)
*F16M 11/10* (2006.01)

(52) U.S. Cl.
CPC .............. *F16M 13/00* (2013.01); *F16M 11/10* (2013.01); *Y10T 29/4984* (2015.01)

(58) Field of Classification Search
CPC ...... A47B 97/04; F16M 11/10; F16M 11/04; A47F 2200/0516
USPC ......... 248/460, 463, 163.1, 176.1, 371, 461, 248/462, 465, 454, 455, 457, 917–923, 121, 248/176.3, 122.1, 124.1, 302, 441.1, 444, 248/445, 447, 458, 465.1
See application file for complete search history.

(56) References Cited

U.S. PATENT DOCUMENTS

| | | | | |
|---|---|---|---|---|
| 4,622,767 A * | 11/1986 | Sullivan | ........................... | 40/120 |
| 5,082,229 A * | 1/1992 | Dahl | ........................... | 248/444.1 |
| 5,329,712 A * | 7/1994 | Keller | ............................. | 40/747 |
| 5,823,504 A * | 10/1998 | Kuwajima | ..................... | 248/685 |
| 5,933,996 A * | 8/1999 | Chang | ............................. | 40/748 |
| 6,003,260 A * | 12/1999 | Chang | ............................. | 40/748 |
| 6,003,831 A * | 12/1999 | Coleman | ........................ | 248/688 |
| 7,001,088 B2 * | 2/2006 | Hui-hu | .......................... | 400/681 |
| 7,702,297 B2 * | 4/2010 | Wu | ................................. | 455/90.3 |
| 7,744,055 B2 * | 6/2010 | Zeng et al. | ..................... | 248/447 |
| 7,770,862 B2 * | 8/2010 | Chen | ............................. | 248/351 |
| 7,798,457 B2 * | 9/2010 | Chih et al. | .................. | 248/284.1 |
| 7,836,623 B2 | 11/2010 | Wang et al. | | |
| 8,023,256 B2 * | 9/2011 | Walker et al. | ........... | 361/679.27 |
| 8,152,113 B2 * | 4/2012 | Chen et al. | .................... | 248/150 |
| 8,201,791 B2 * | 6/2012 | Zhang et al. | ............... | 248/278.1 |
| 8,282,060 B2 * | 10/2012 | Fan | ............................ | 248/291.1 |
| 8,382,059 B2 * | 2/2013 | Le Gette et al. | ............. | 248/460 |
| 8,403,288 B2 * | 3/2013 | Cheng | ............................ | 248/688 |

(Continued)

OTHER PUBLICATIONS

U.S. Appl. No. 13/735,702, filed Jan. 7, 2013, Le Gette, et al.

(Continued)

*Primary Examiner* — Nkeisha Smith
(74) *Attorney, Agent, or Firm* — Oblon, McClelland, Maier & Neustadt, L.L.P.

(57) ABSTRACT

Holders for electronic devices and systems, methods, and methods of making thereof. Electronic device holders include a base and a support rotatably coupled to the base. The support includes a base, a coupler, and a stand and is rotatable to a plurality of different or same orientations. The stand is rotatable outwardly and inwardly from and two fully retracted and fully extended positions and positions therebetween. In one or more extended positions, the stand can be supported by a support surface or a support device or apparatus.

26 Claims, 78 Drawing Sheets

(56) References Cited

U.S. PATENT DOCUMENTS

| | | | |
|---|---|---|---|
| 8,520,371 B2* | 8/2013 | Peng et al. | 361/679.01 |
| 8,605,429 B2* | 12/2013 | Shen et al. | 361/679.55 |
| 2005/0001114 A1* | 1/2005 | Ogawa | 248/127 |
| 2006/0049327 A1* | 3/2006 | Chen | 248/371 |
| 2007/0062089 A1* | 3/2007 | Homer et al. | 40/754 |
| 2008/0006745 A1 | 1/2008 | Chong et al. | |
| 2008/0099638 A1* | 5/2008 | Diener et al. | 248/176.3 |
| 2008/0156836 A1* | 7/2008 | Wadsworth et al. | 224/269 |
| 2010/0072334 A1 | 3/2010 | Le Gette et al. | |
| 2011/0025176 A1* | 2/2011 | McClure et al. | 312/223.2 |
| 2011/0031287 A1 | 2/2011 | Le Gette et al. | |
| 2012/0170194 A1* | 7/2012 | Lord et al. | 361/679.02 |
| 2012/0175474 A1* | 7/2012 | Barnard et al. | 248/122.1 |
| 2012/0199501 A1 | 8/2012 | Le Gette et al. | |
| 2012/0275094 A1 | 11/2012 | Zhou et al. | |
| 2012/0325986 A1* | 12/2012 | Chen et al. | 248/122.1 |
| 2013/0001382 A1* | 1/2013 | Jang | 248/176.1 |
| 2013/0077211 A1* | 3/2013 | Wang | 361/679.01 |
| 2013/0092811 A1* | 4/2013 | Funk et al. | 248/371 |
| 2013/0134267 A1* | 5/2013 | Liu | 248/122.1 |
| 2013/0134291 A1 | 5/2013 | Le Gette et al. | |
| 2013/0213826 A1* | 8/2013 | Partridge | 206/45.24 |
| 2014/0224947 A1* | 8/2014 | Barnard et al. | 248/122.1 |
| 2014/0226281 A1* | 8/2014 | Emami | 361/679.56 |

OTHER PUBLICATIONS

U.S. Appl. No. 29/435,155, filed Oct. 19, 2012, Le Gette et al.
International Search Report and Written Opinion for PCT/US 14/36806 dated Mar. 13, 2015.

* cited by examiner

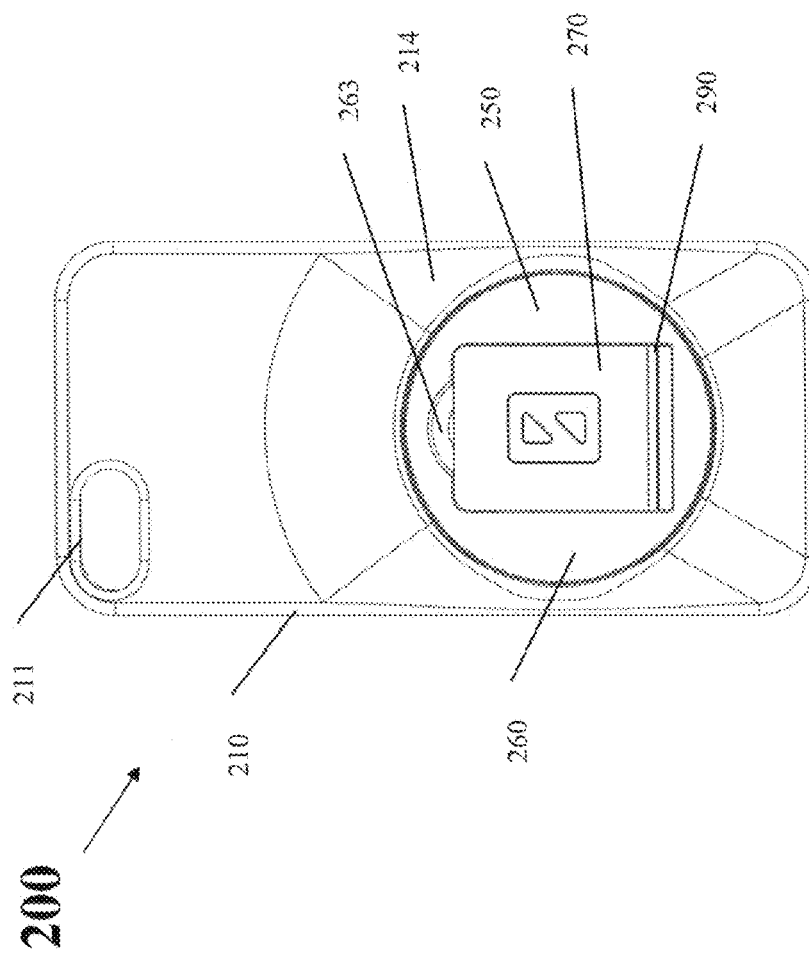

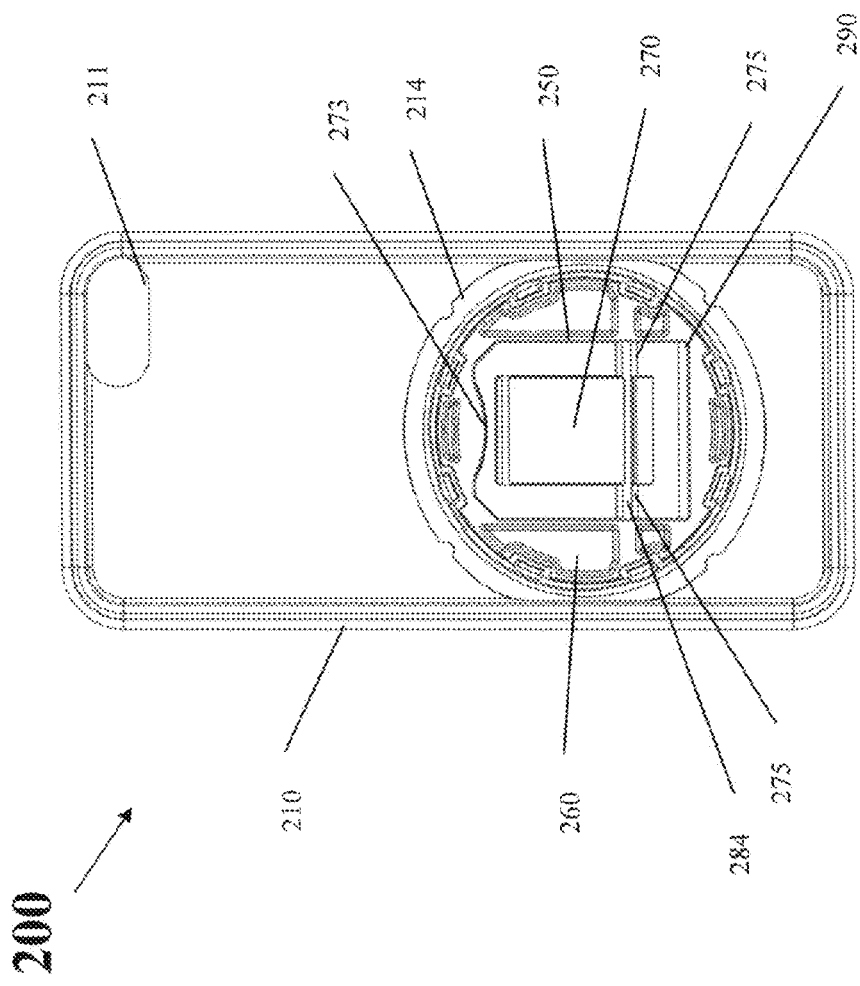

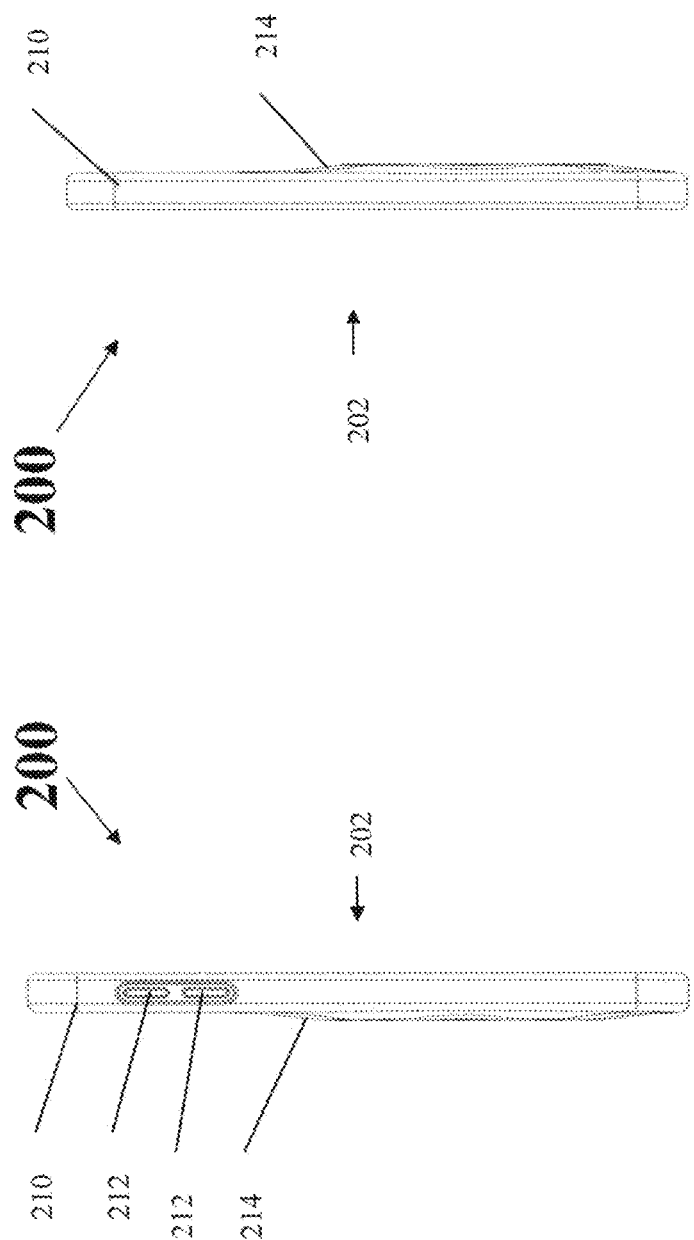

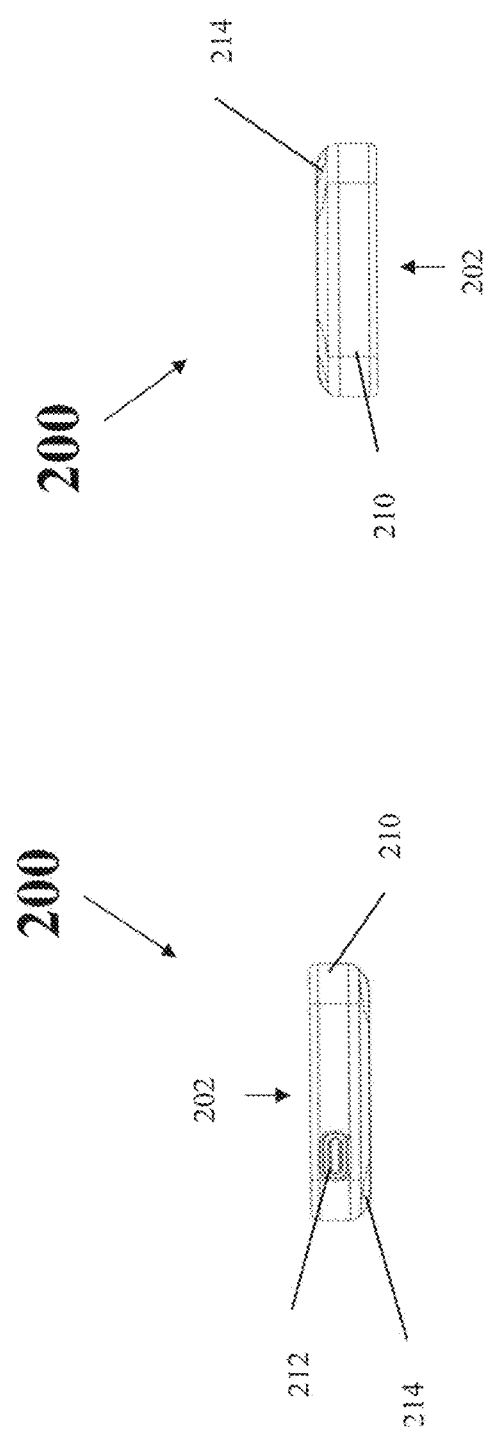

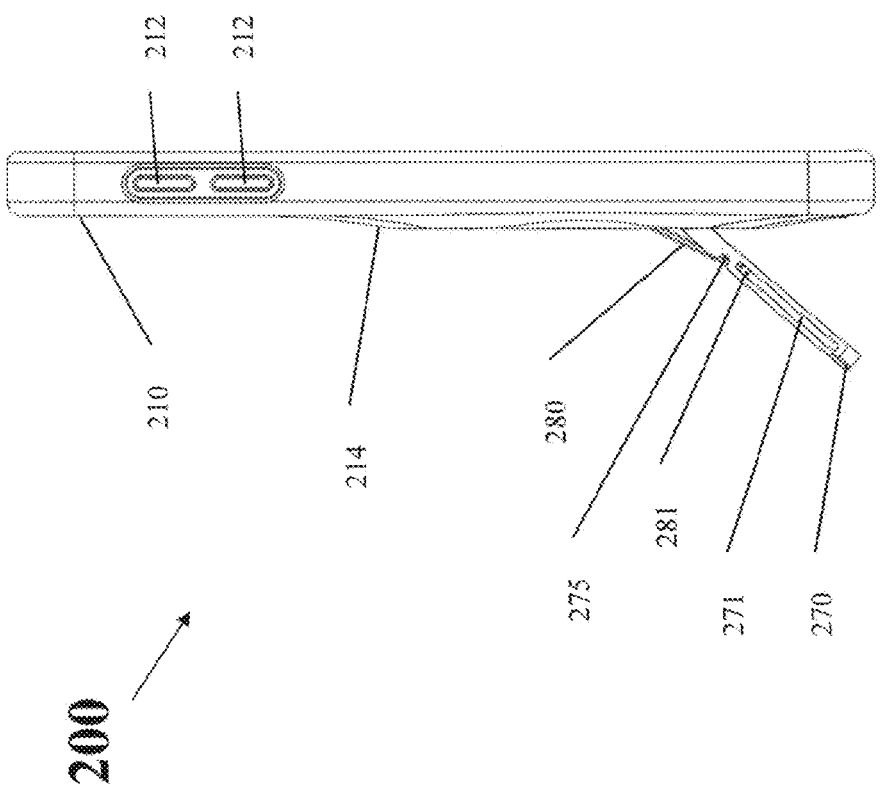

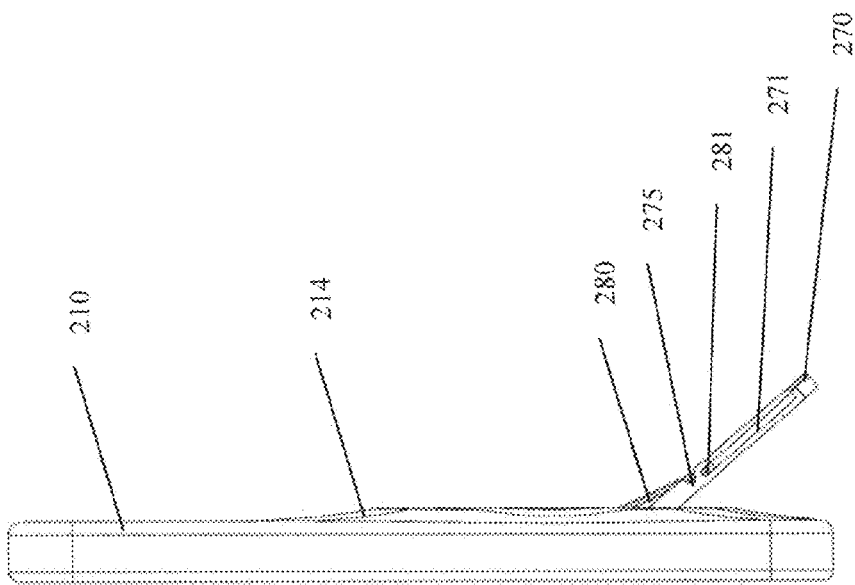

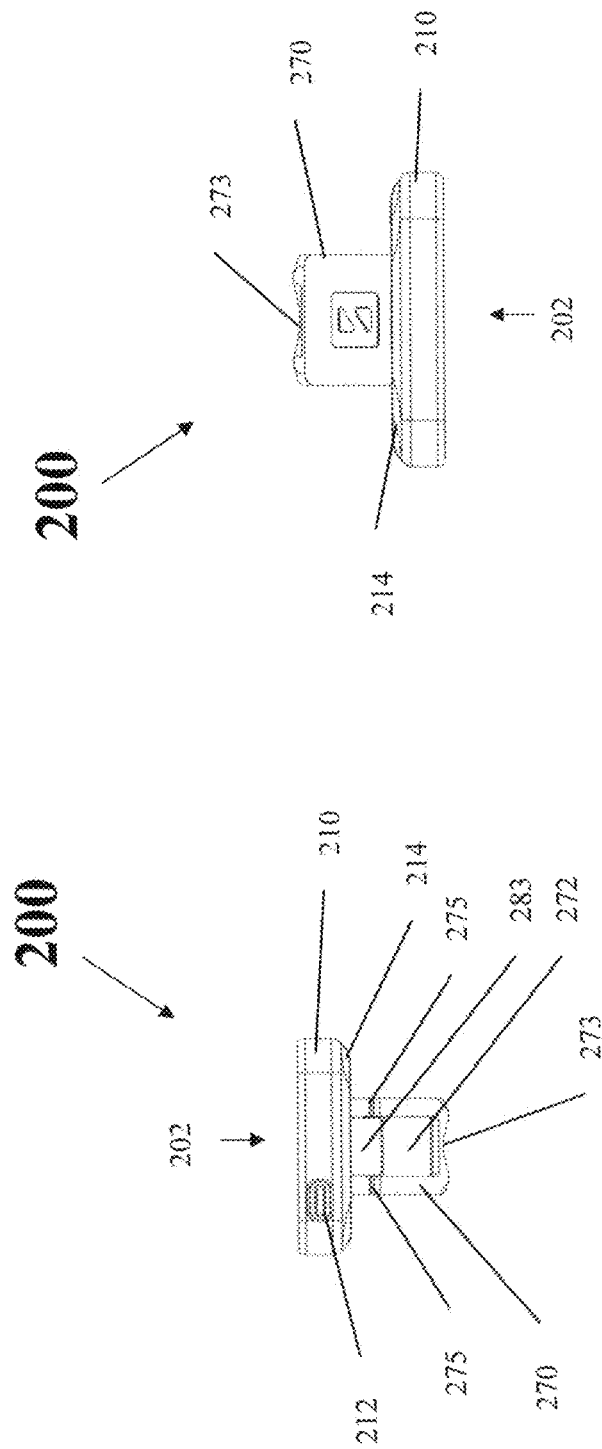

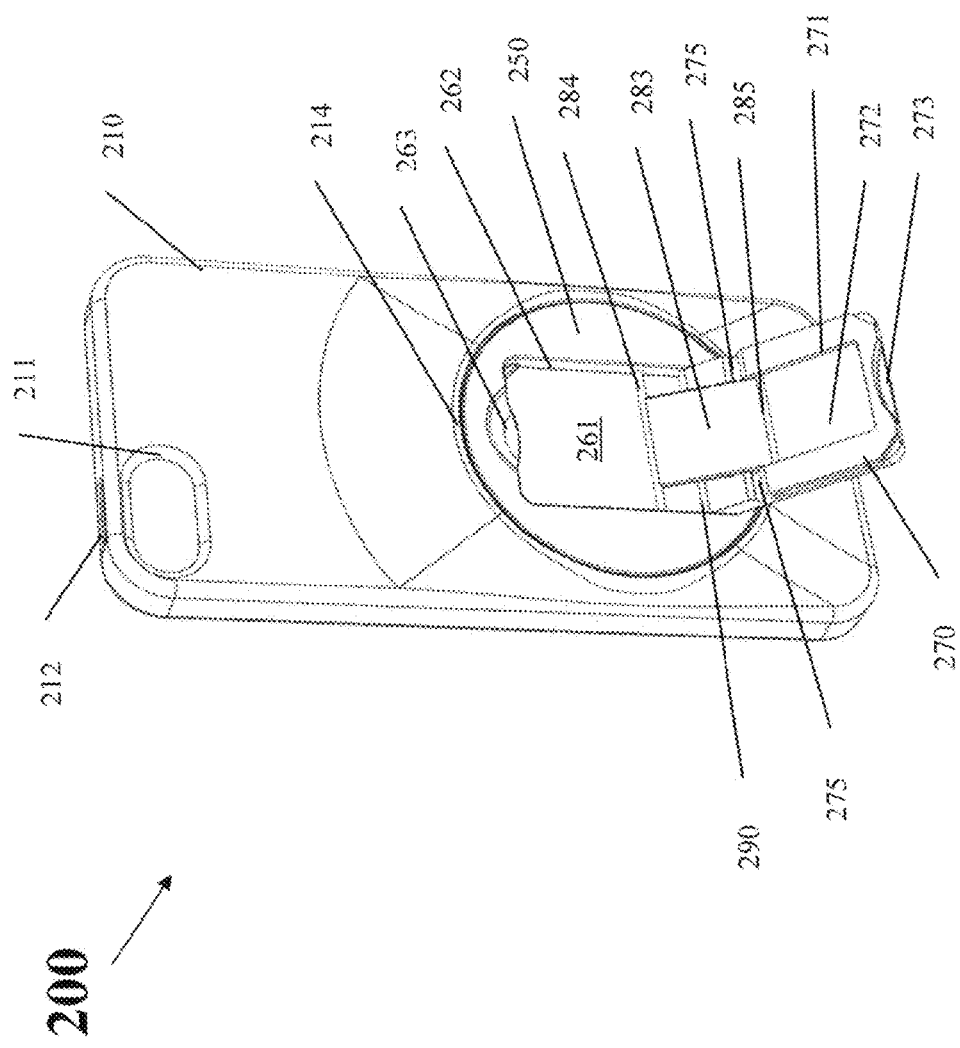

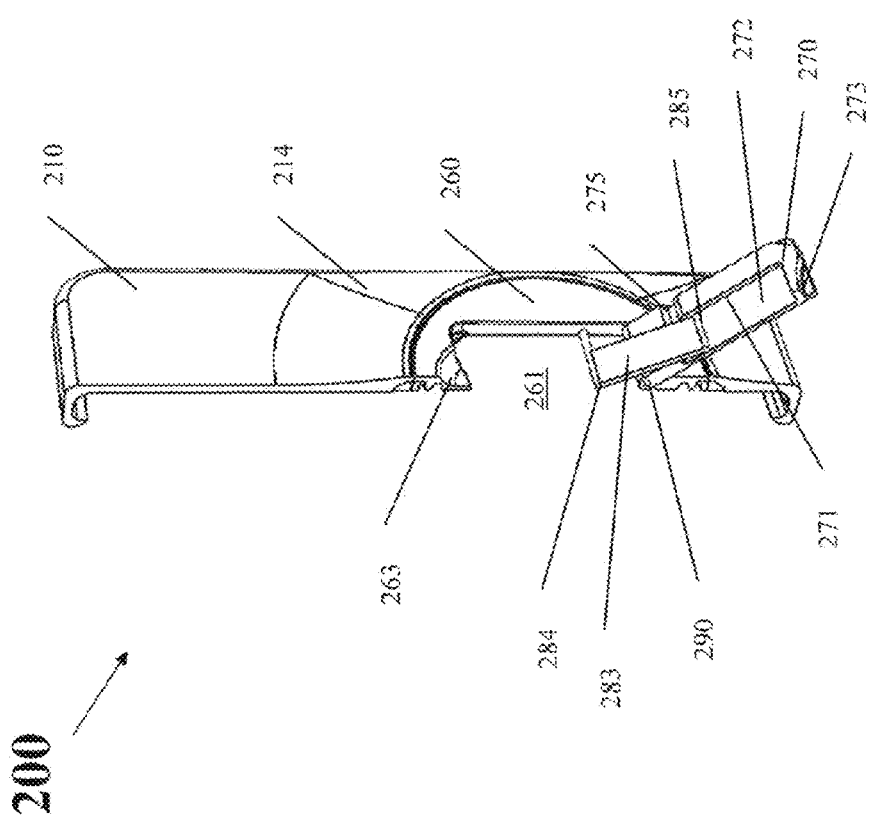

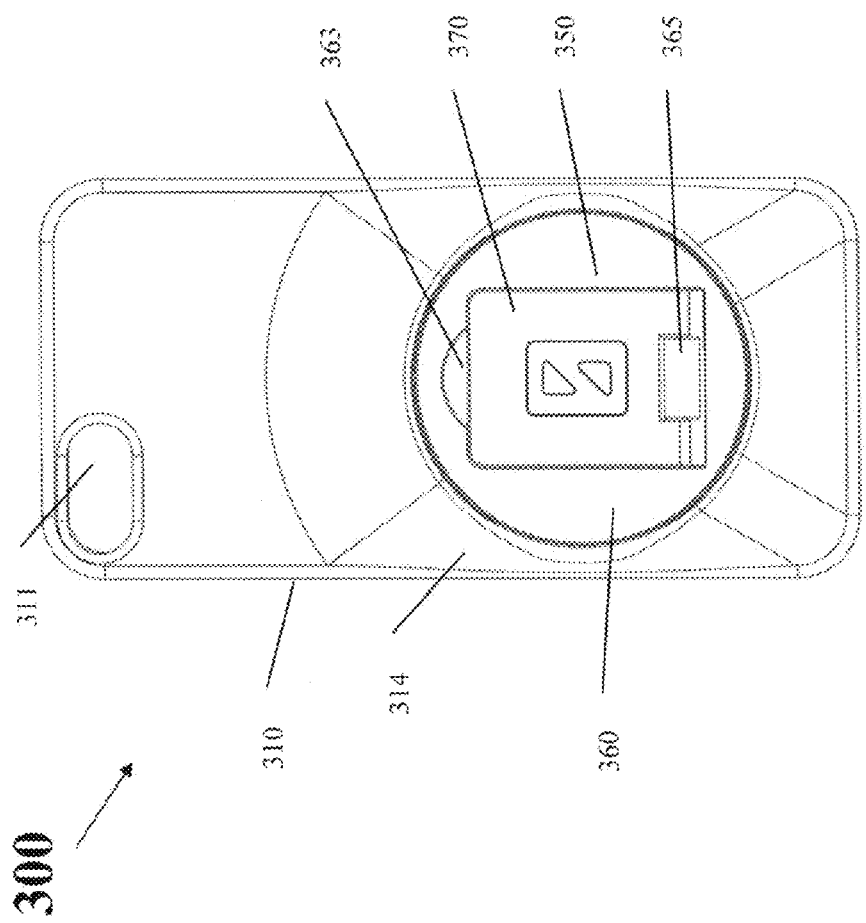

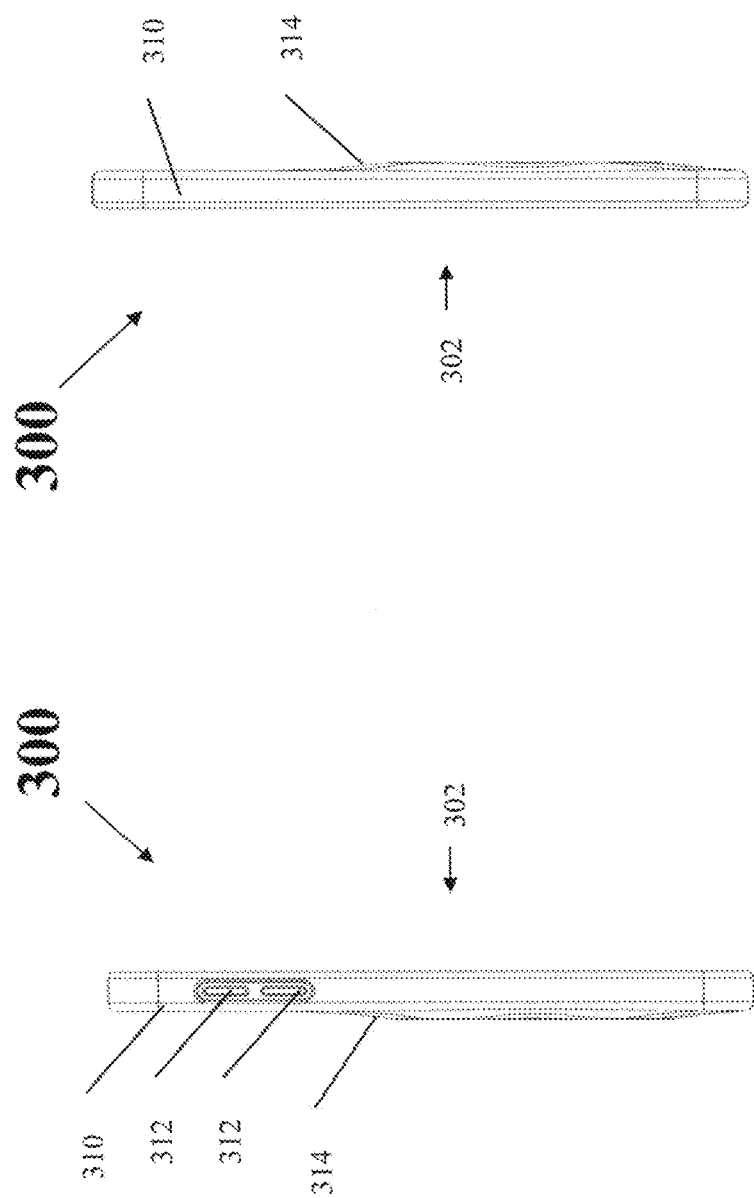

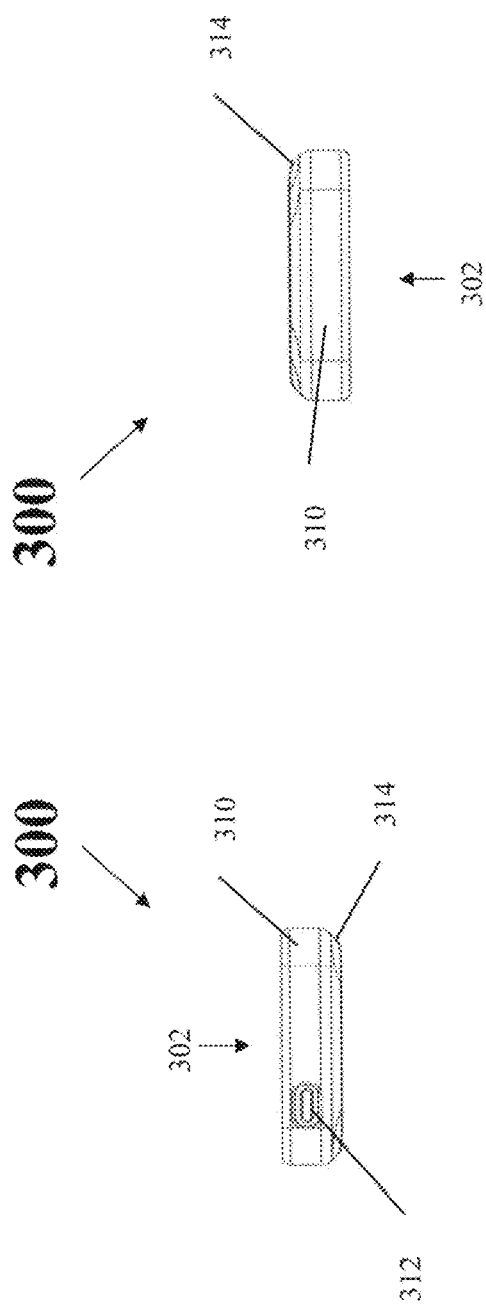

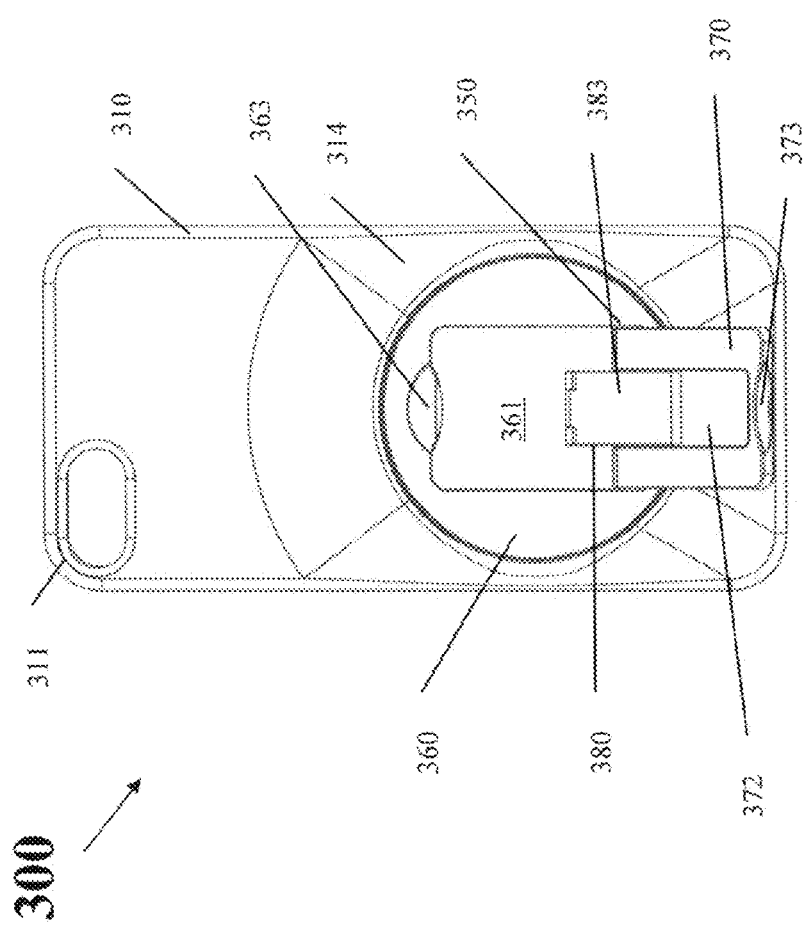

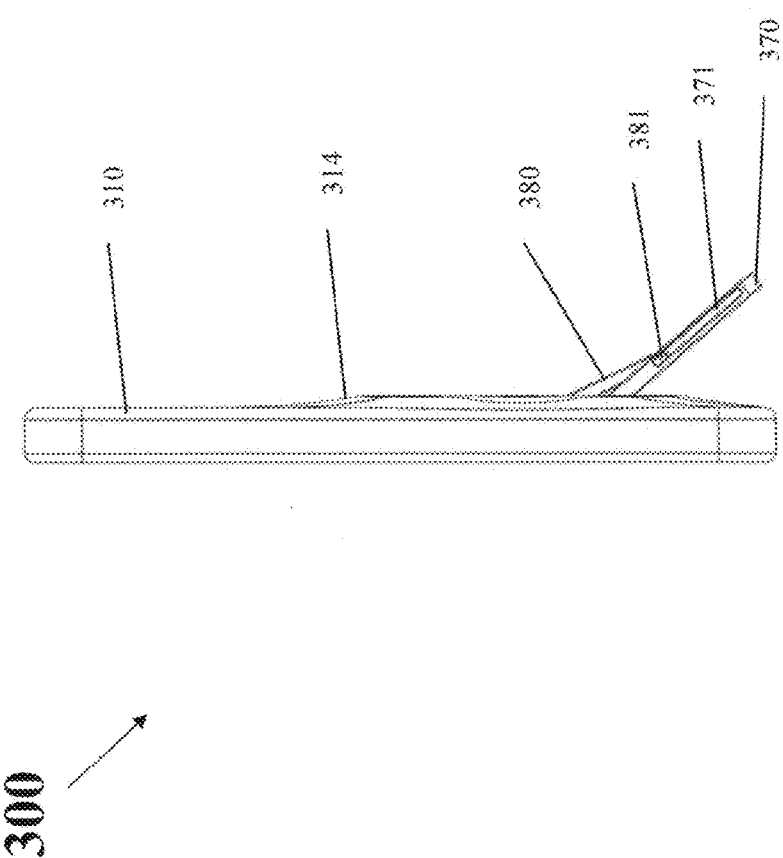

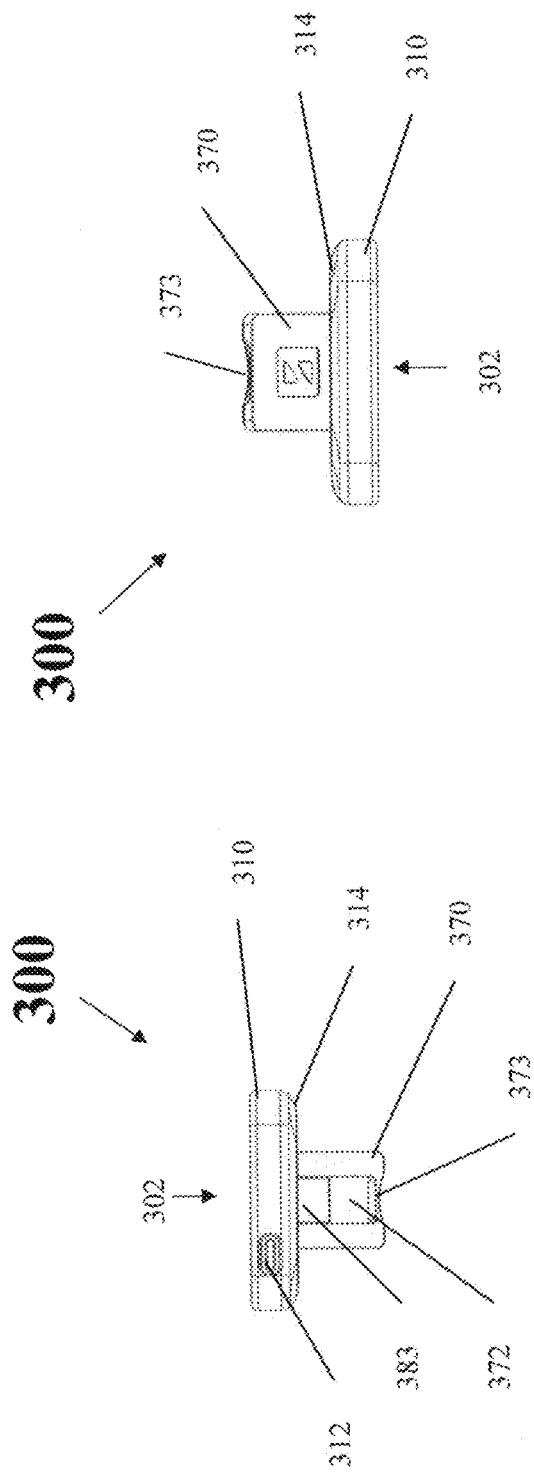

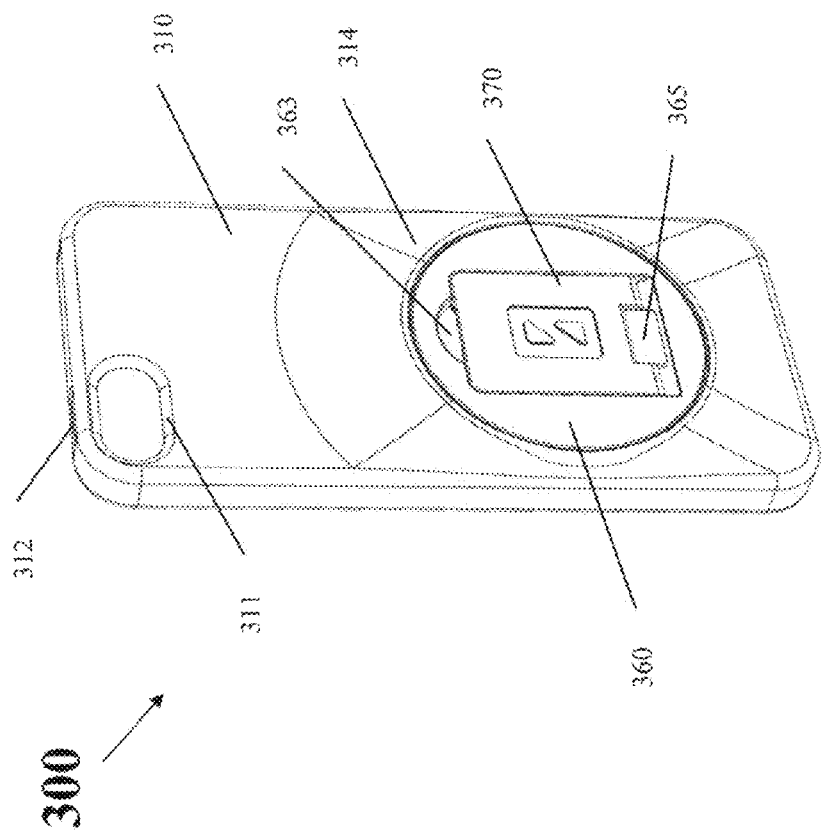

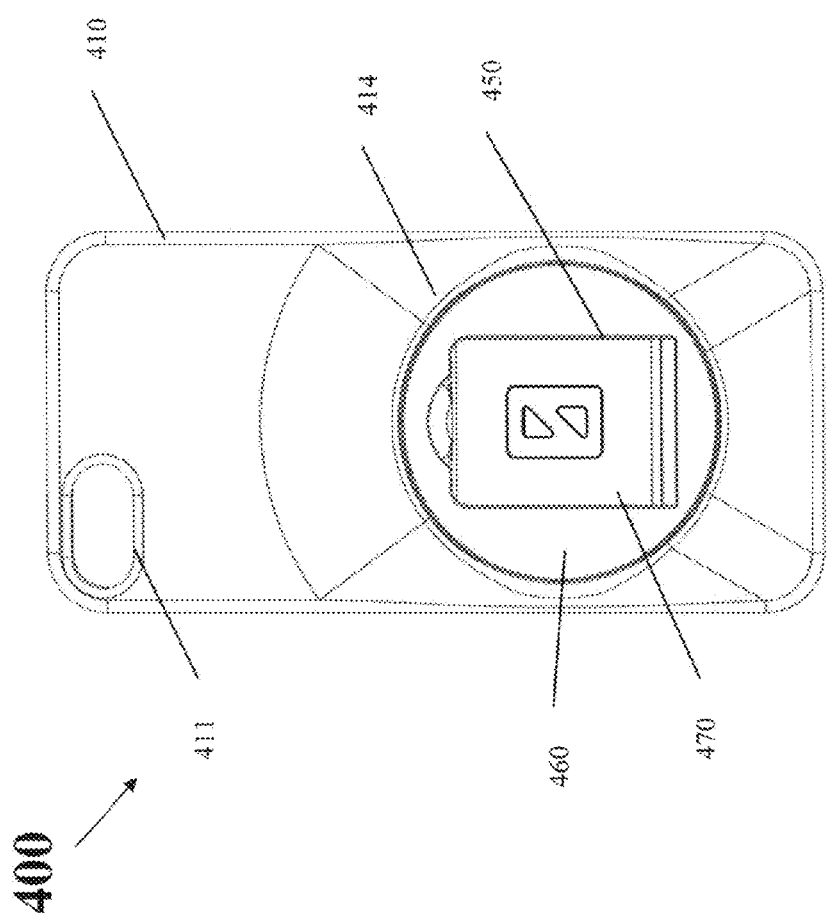

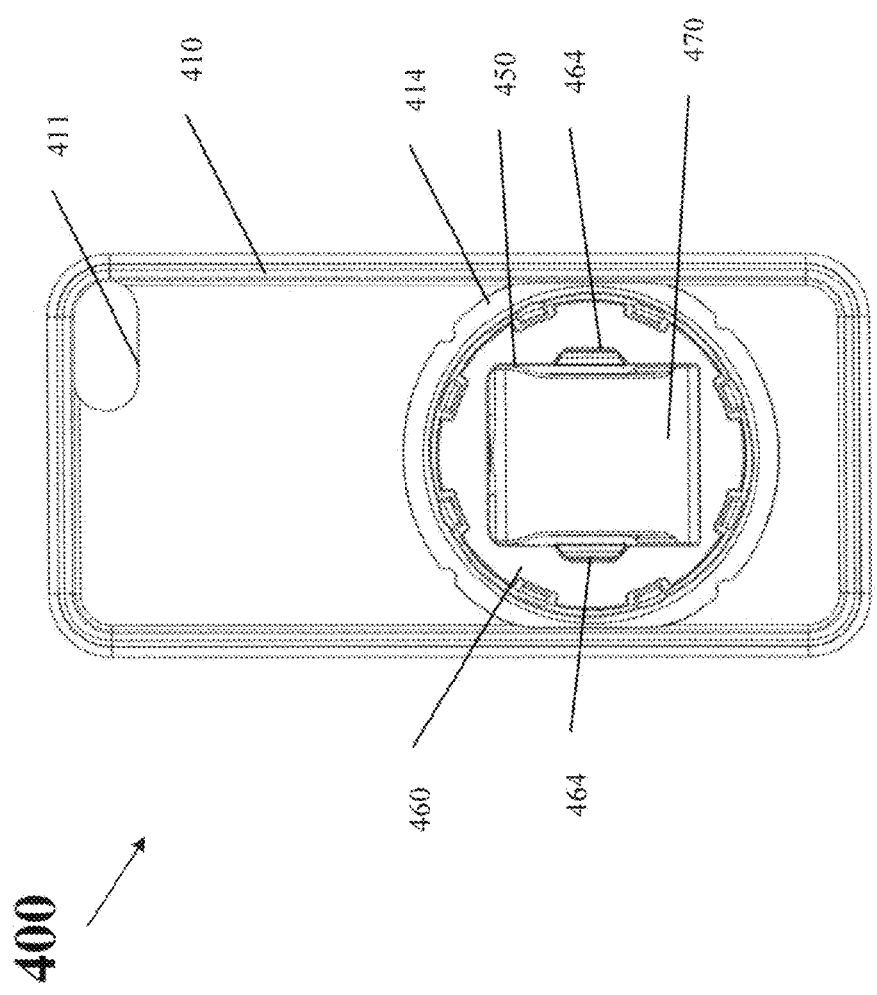

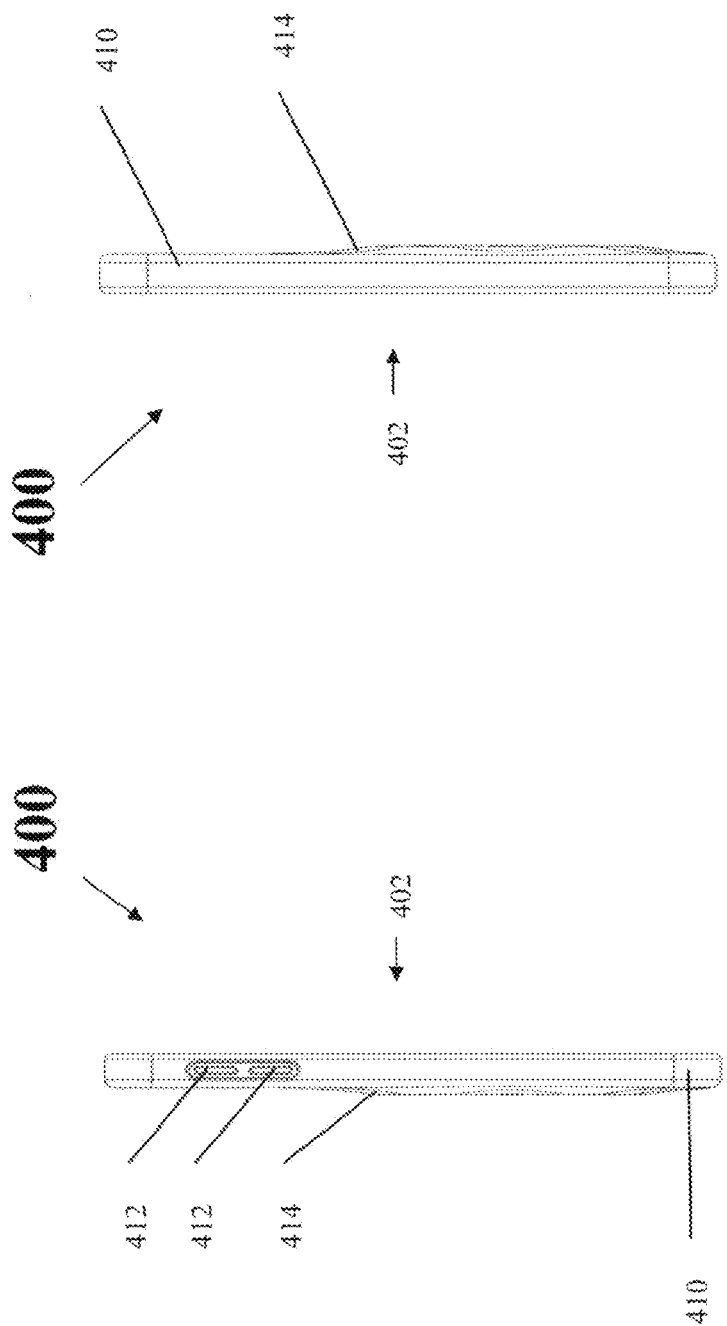

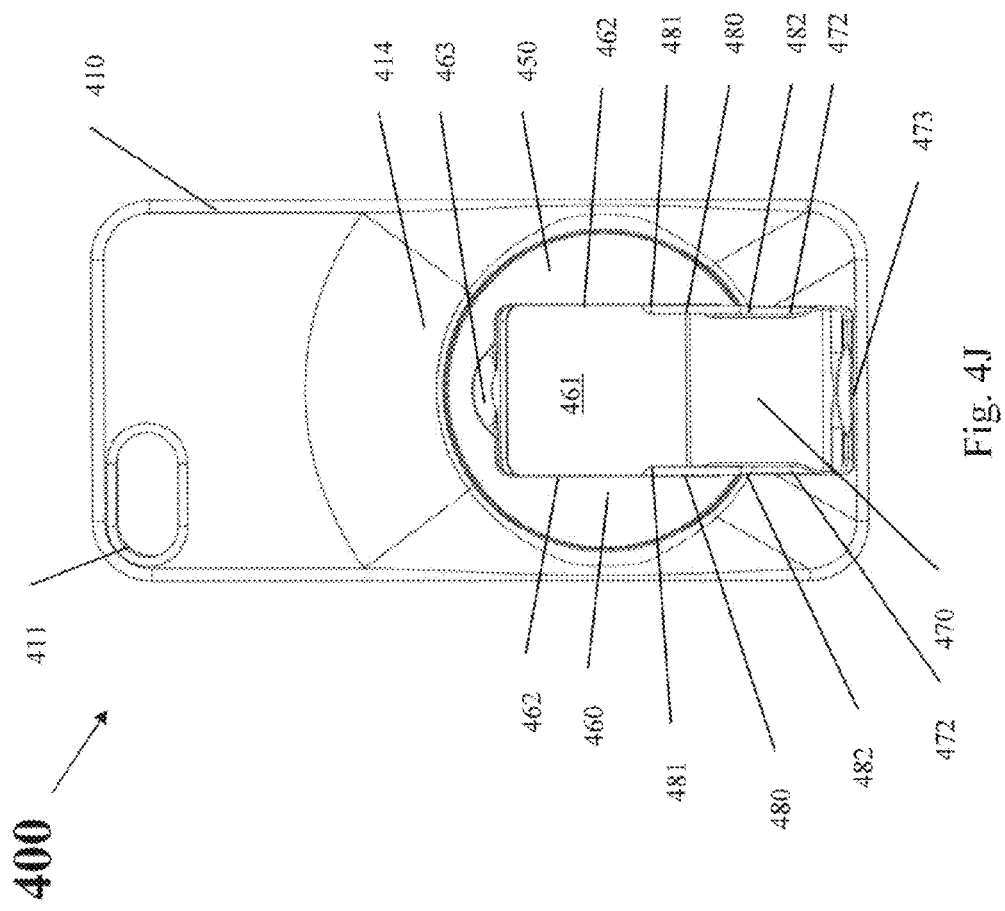

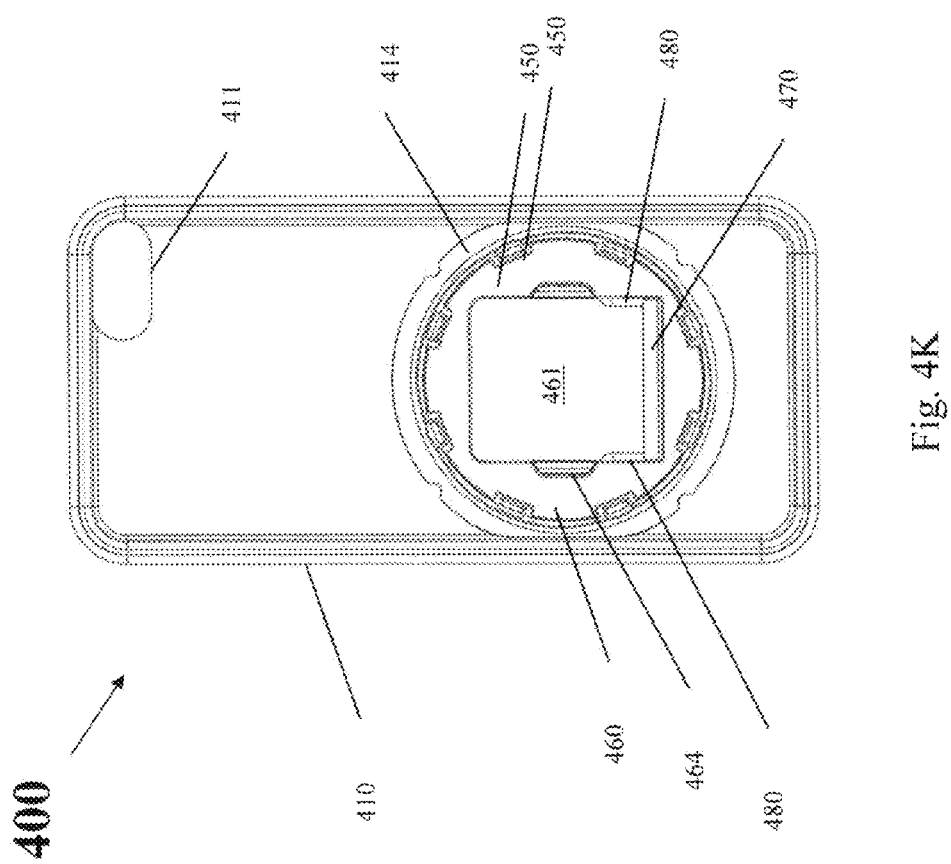

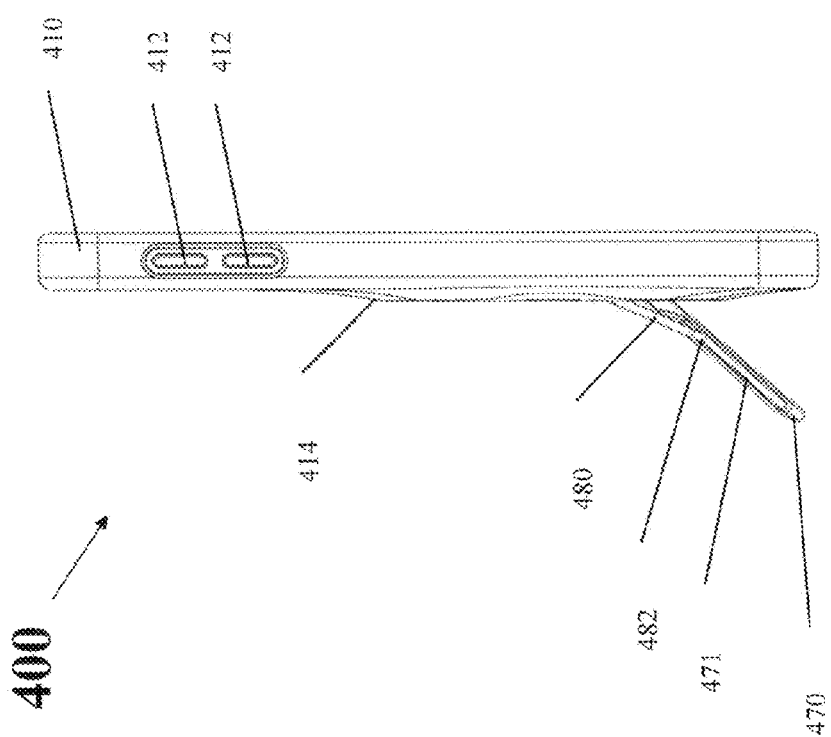

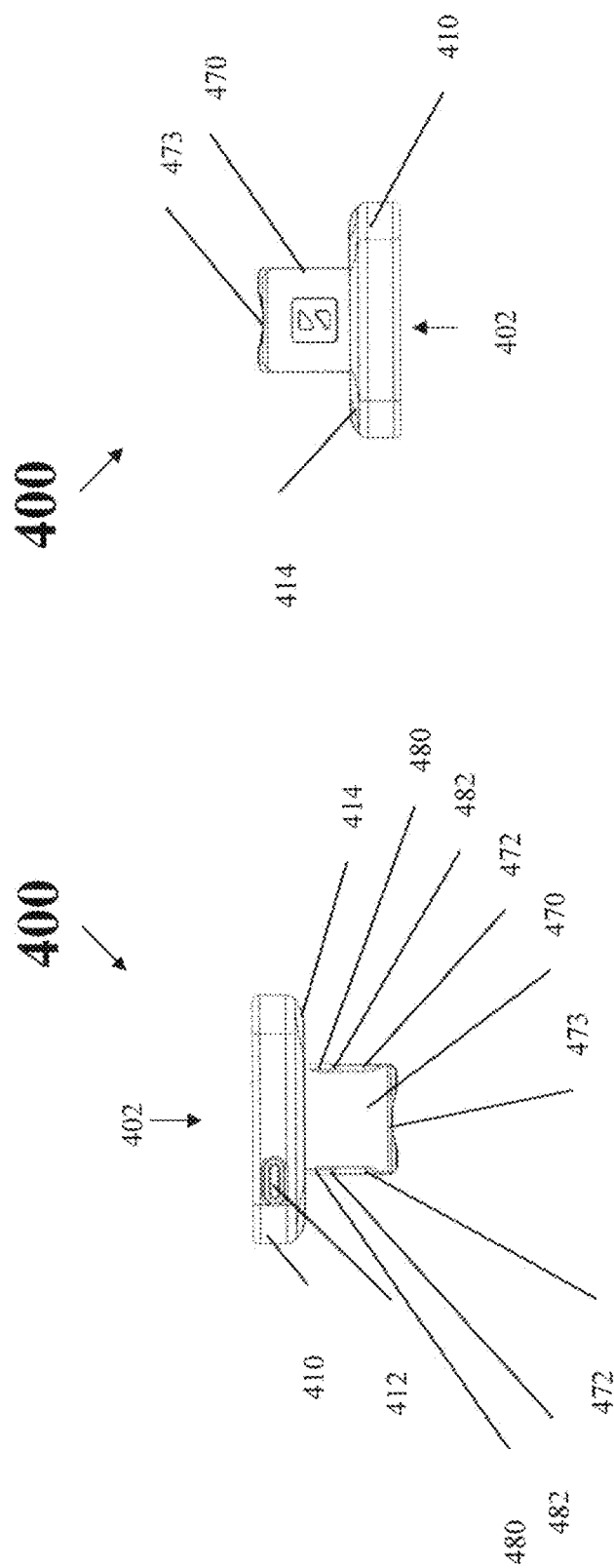

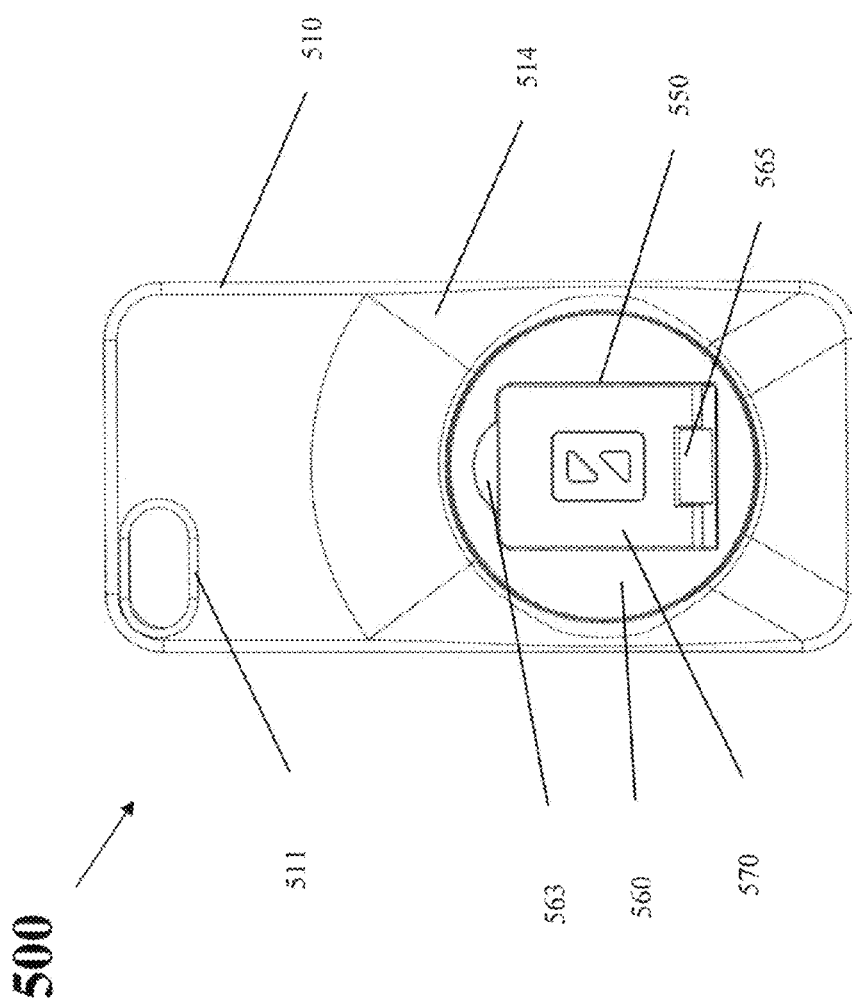

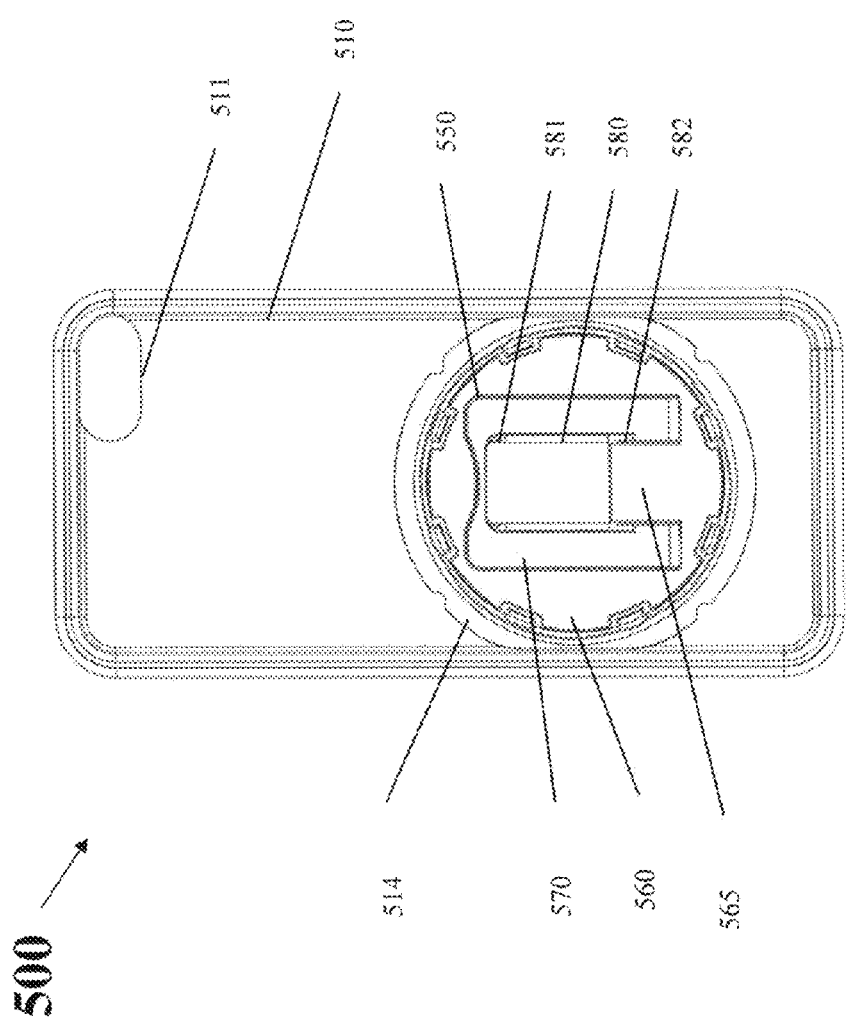

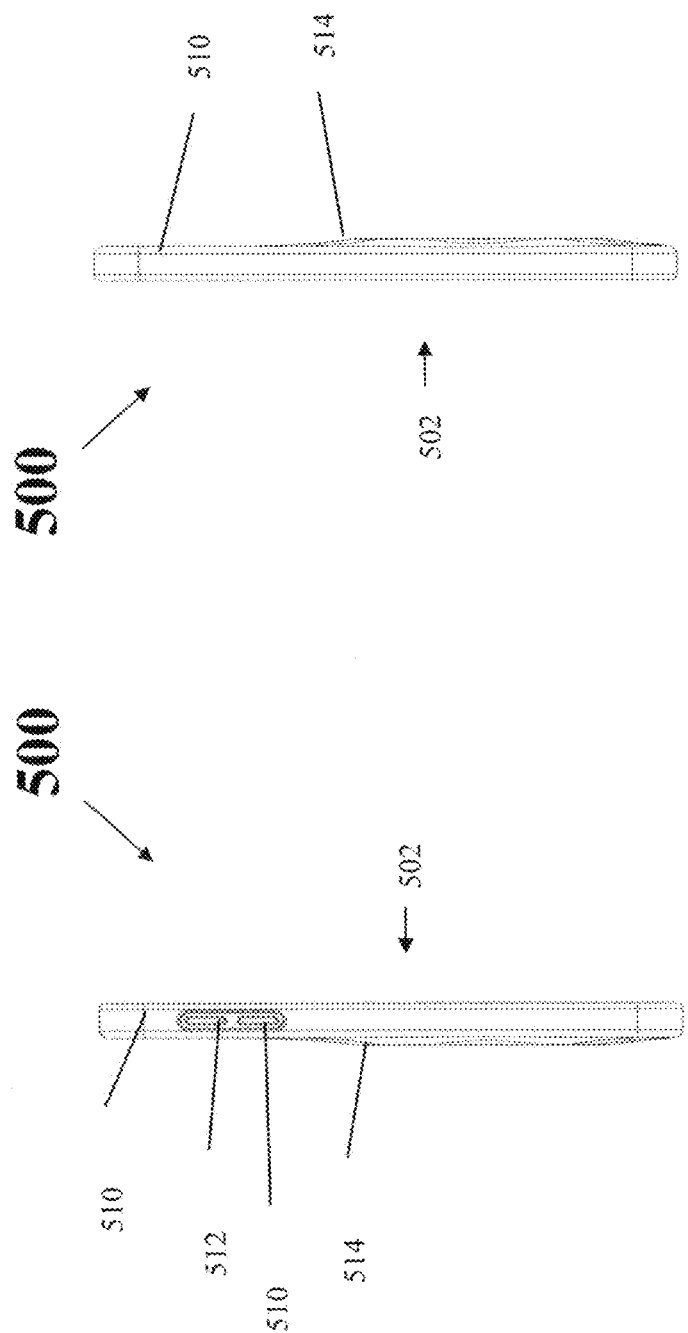

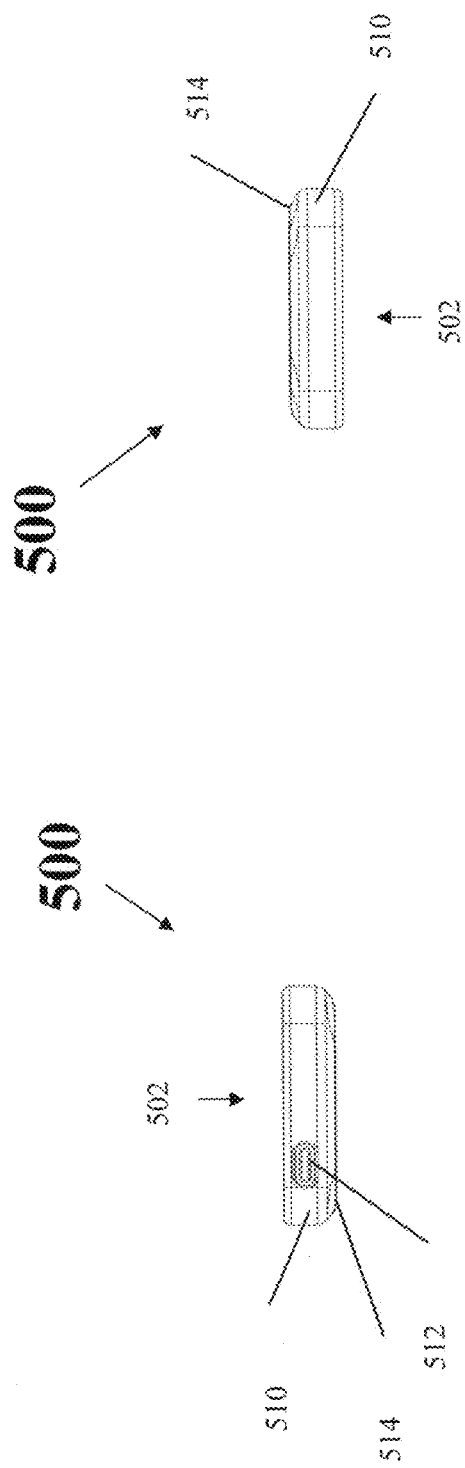

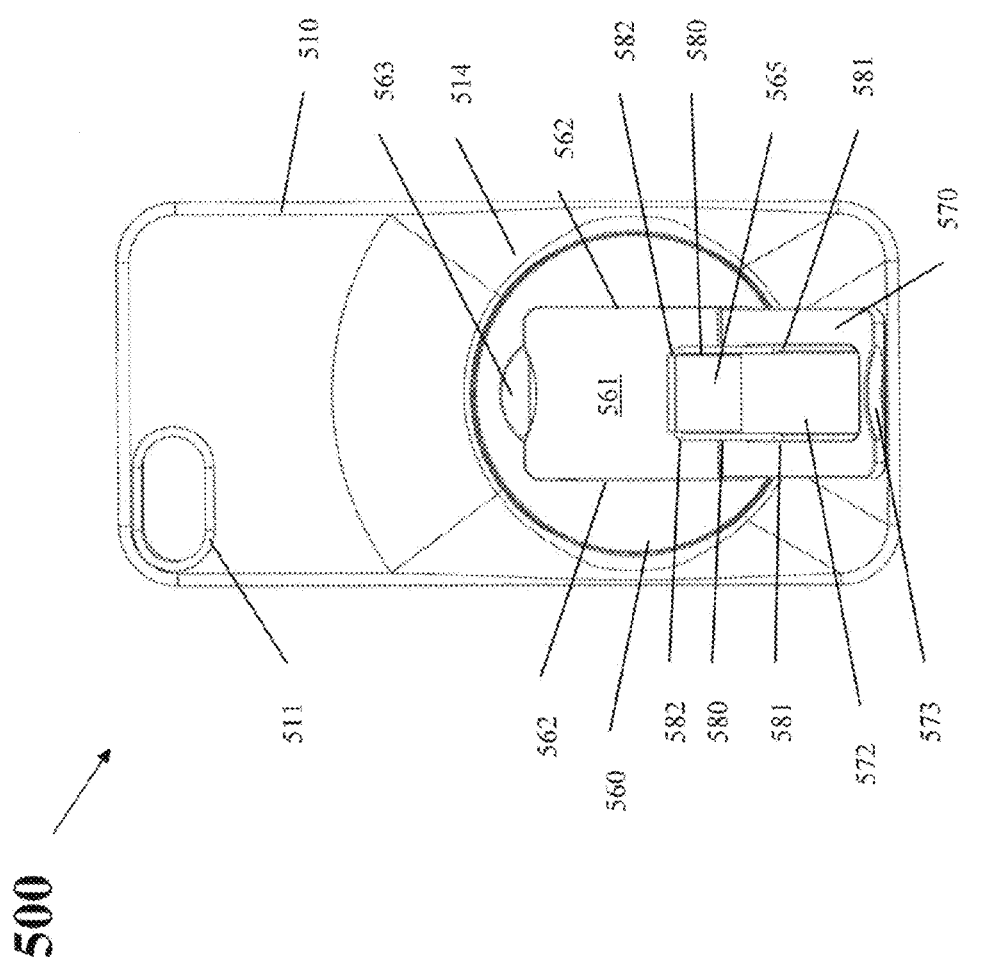

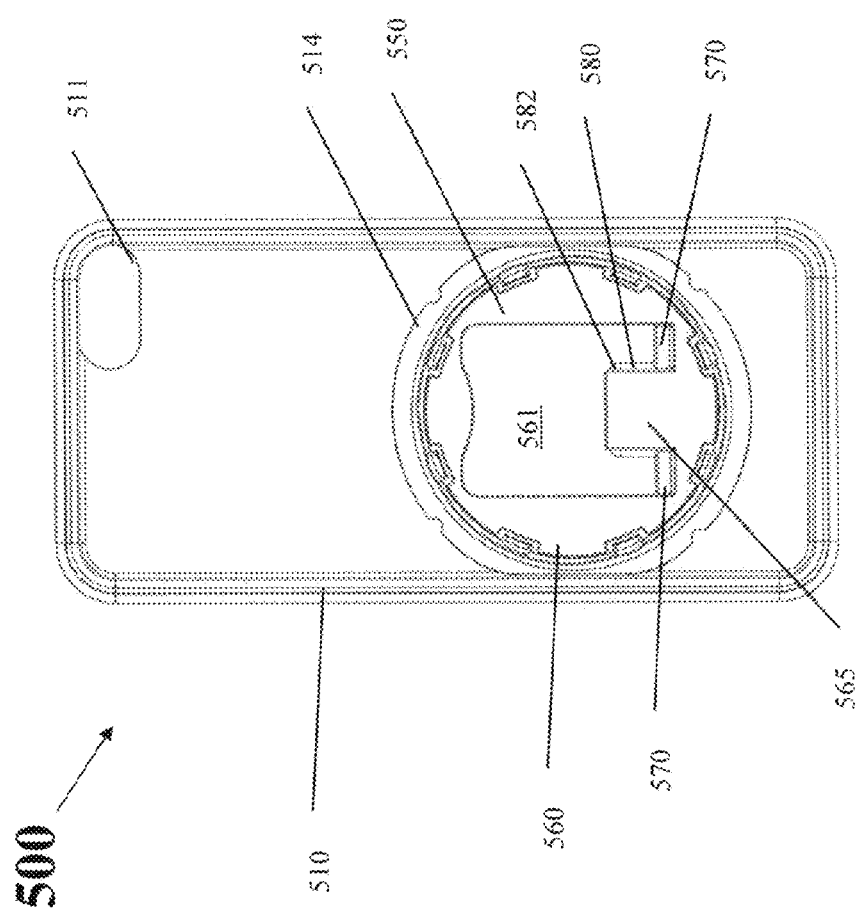

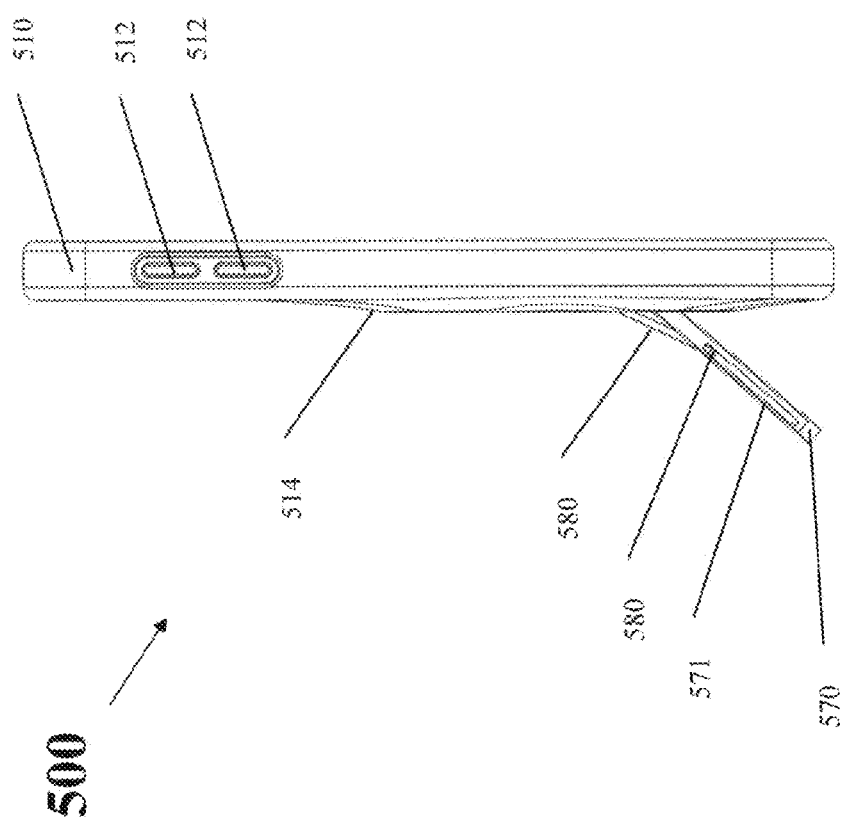

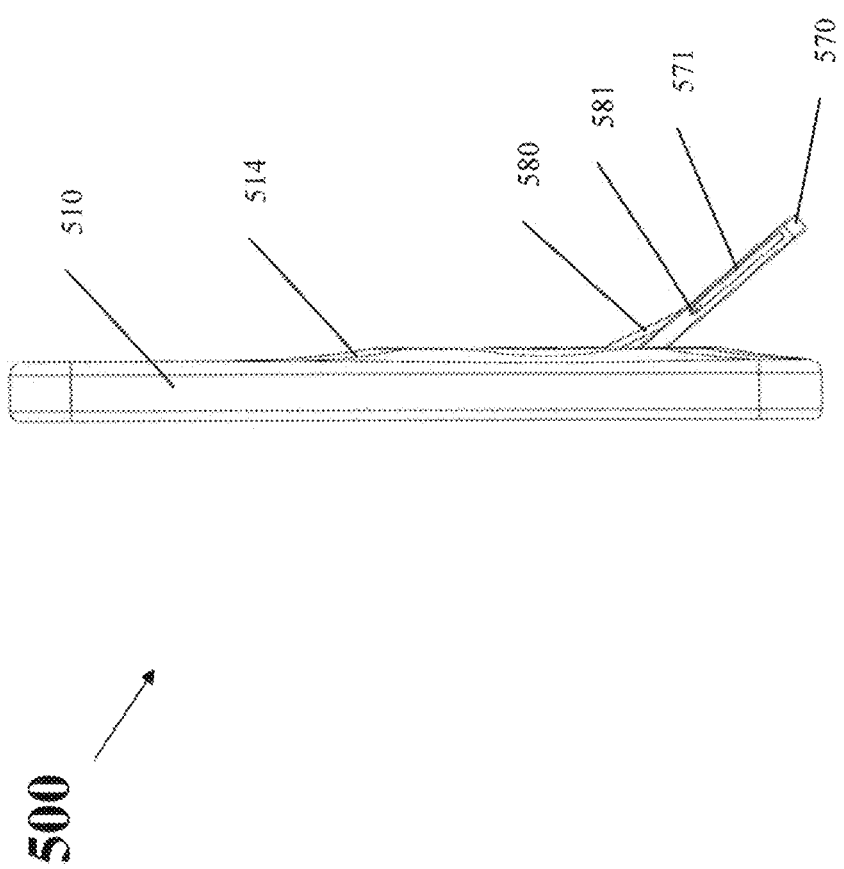

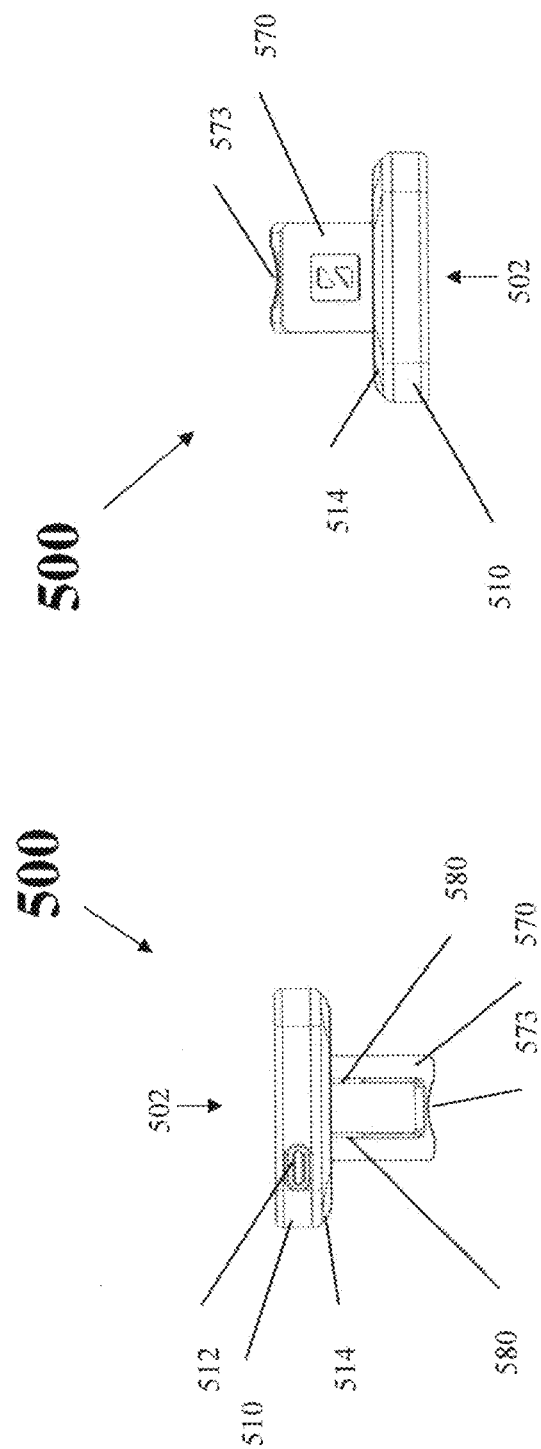

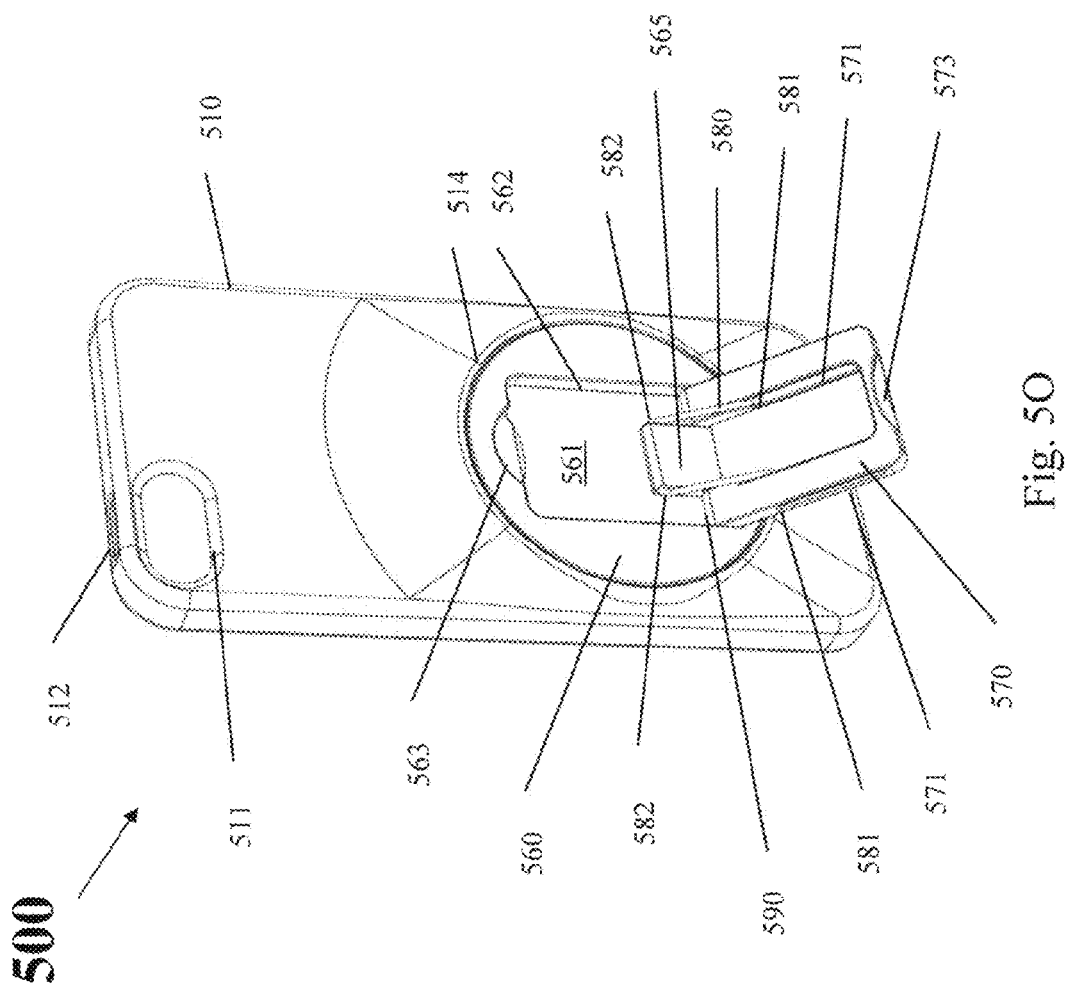

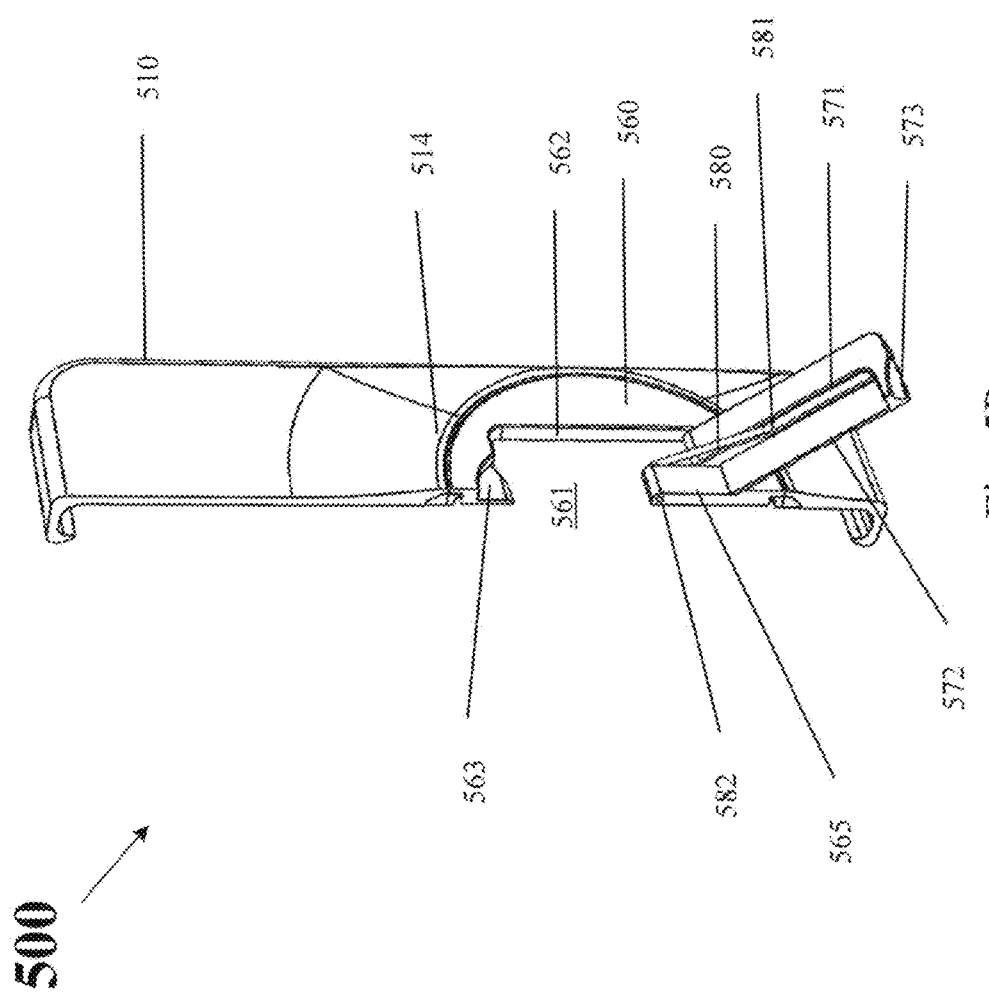

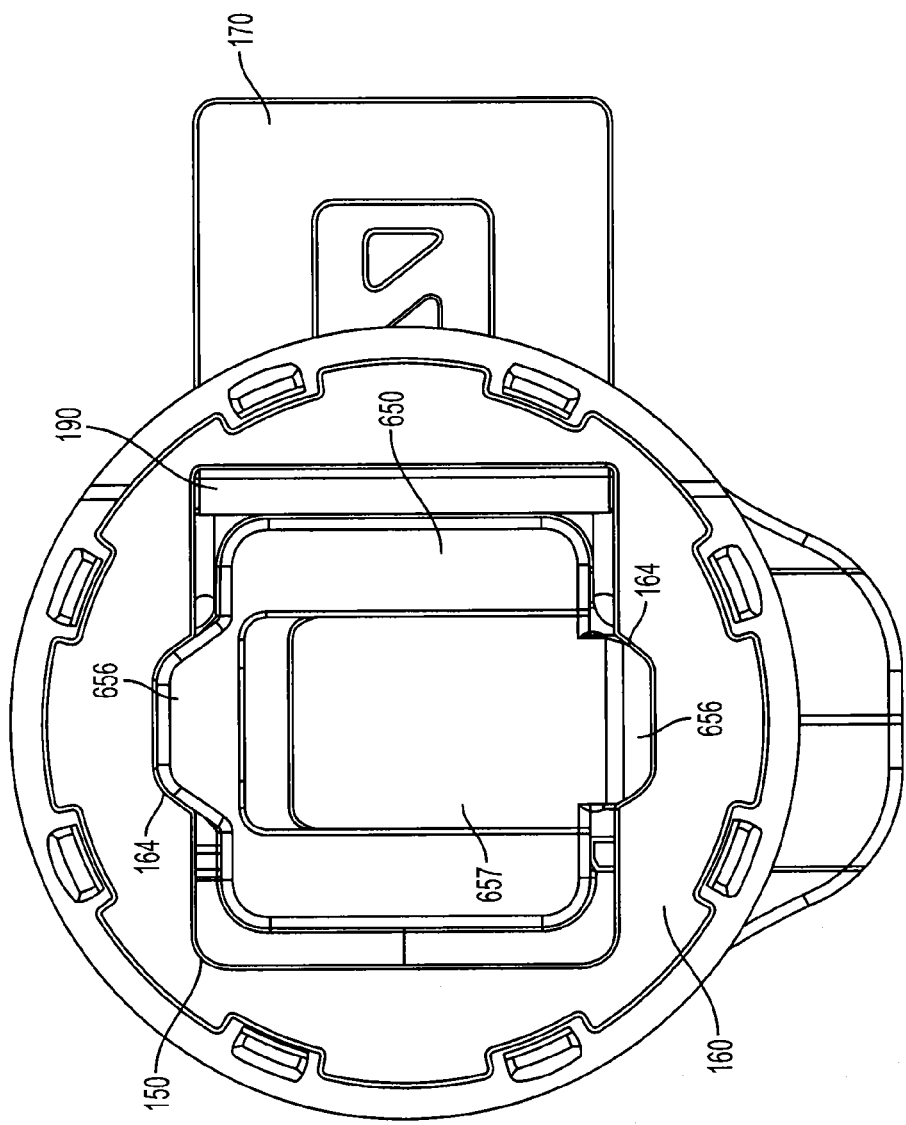

ELECTRONIC DEVICE HOLDER WITH REPOSITIONABLE STAND AND SYSTEMS AND METHODS THEREOF

SUMMARY

The present invention relates to electronic device holders, cases, enclosures, or respective portions thereof, including portions that are integrated in or are part of the electronic device encasing itself and those that are removably coupled to the electronic device casing (hereinafter "holders") having repositionable stands and systems and methods thereof. Non-limiting examples of electronic devices "supportable" by embodiments of the present invention include cell phones, smartphones, personal digital assistants (PDAs), portable video/music players, electronic tablets, GPS displays, and other portable or handheld electronic devices. Further, the electronic devices may have a frontal LCD, OLED, touch screen, or other display, and the electronic device holders according to one or more embodiments of the present invention can provide unobstructed access to the entire frontal screen or display. Optionally, one or more embodiments of the present invention can provide unobstructed access to a portion or portions (e.g., portions separated by a portion of the holder) of a back side, sides, a top, and/or a bottom of electronic devices. The present invention also relates to mounting apparatuses to mount holders and held electronic devices, for example, an armband mounting apparatus for mounting a holder and corresponding electronic device.

In one or more embodiments of the present invention an electronic device holder has a movable stand portion, which may be moveable in more than one way or direction, such as extendable and/or rotatable. Optionally, a portion or portions of the electronic device holders according to embodiments of the present invention may be coupled to a corresponding mounting apparatus or system, with the movable stand portion retracted (partially or fully) and/or extended (partially or fully), such as disclosed and illustrated in U.S. patent application Ser. No. 13/735,702 filed Jan. 7, 2013, the entire content of which is hereby incorporated by reference. Optionally or alternatively, a portion or portions of the electronic device holders according to embodiments of the present invention may be coupled to a corresponding mounting apparatus or system, such as illustrated herein in FIGS. 6A-6U and discussed in more detail below. Further, a portion or portions of the electronic device holder can be movable relative to the mounting apparatus and stand portion, while the portion or portions of the electronic device holder coupled to the mounting apparatus remain stationary. Optionally, an orientation of the electronic device holder relative to the mounting apparatus may be changed. Additionally, an electronic device can be removably attached or coupled to the electronic device holder with or without the electronic device holder being coupled to a mounting apparatus. The mounting apparatus can be fixed to an object (e.g., dashboard of an automobile or airplane or handle bars of a bicycle), used, worn, carried, or otherwise transported, along with a corresponding electronic device held or encased by the electronic device holder mounted to the mounting apparatus.

According to one or more embodiments of the present invention, a support mechanism for a portable device comprises: a body including a coupling portion configured to couple a portable device to the body via a front face of the body; and a support rotatably coupled to the body such that the orientation of the support relative to the body is changeable to support the body and the portable device in a plurality of different orientations relative to a support surface, the support being movable between a retracted position and a fully extended position relative to the body, the support being fixable at the fully extended position and a plurality of positions between the retracted position and the fully extended position, the support being engageable with the support surface in any of its extended positions in any of its orientations, wherein the support includes a base, a coupler, and a stand, the coupler being coupled to the base and the stand, and the stand being coupled to the base and the coupler.

Optionally, the coupler is slidably and friction-fit coupled to the stand and rotatably coupled to the base, and the stand is rotatably coupled to the base. The plurality of positions between the retracted position and the fully extended position include any number of undefined fixable positions. Optionally, the coupler is slidably and friction-fit coupled to the stand so as to be movable between the fully extended position and the retracted position, the friction-fit coupling being provided by a friction sleeve of the stand through which a portion of the coupler traverses. In one or more embodiments, the coupler is a U-shaped pin, wire, or rod. Further, in one or more embodiments, the body includes a backside portion that is cut-out or clear over fifty percent of the backside. Optionally, the body includes a backside portion that is cut-out or clear over seventy-five percent of the backside. Additionally, optionally, the fully extended position of the stand is greater than ninety degrees, and the support is rotatable relative to the body by more than 270 degrees. Optionally, the holder consists of three distinct plastic or rubber components and a metal component, the plastic or rubber components being the body, the base, and the stand, and the metal component being the coupler. In one or more embodiments, the stand is flush or substantially flush with an uppermost portion of the base in side, end, or cross-sectional view.

Additionally, in one or more embodiments, a method comprises: providing a plastic holder for a portable electronic device, the holder including: a body having a coupling portion configured to couple the portable electronic device to the body via a front side of the body; and a support rotatably coupled to the body such that an orientation of the support relative to the body is changeable to support the body and the portable electronic device in a plurality of different orientations, the support including a base, a coupling mechanism in the form of a generally U-shaped metallic pin, and a stand, the coupling mechanism being pivotably coupled to the base about a first axis, the stand being pivotably coupled to the base about a second axis different from the first axis, the coupling mechanism being slidably coupled to the stand such that a portion of the coupling mechanism is always frictionally slidable from a first end to a second end of a hollow sleeve portion formed in the stand such that the stand is fixable at a fully extended position and a plurality of positions between a fully retracted position and the fully extended position, the stand being engageable with a support surface in any of its extended positions in any of its orientations, the hollow sleeve portion being without surface features, and the plurality of positions between the fully retracted position and the fully extended position being a plurality (e.g., more than one, more than two, more than three, more than five, more than ten, more than twenty, etc.) number of undefined fixable positions.

Further, in one or more embodiments, the body includes a backside with at least two separate cut-out or clear portions. Optionally, the method further comprises coupling the portable electronic device to the body via the front side of the body. In one or more embodiments, optionally, the hollow sleeve portion includes two separate sleeves. Alternatively, the hollow sleeve portion consists of a single sleeve. Further, optionally, of plastic components, the holder consists of three distinct plastic components, the three plastic components being the body, the base, and the stand. In one or more embodiments, a middle portion of the coupling mechanism in the form of the generally U-shaped metallic pin is slidably coupled to the stand such that the middle portion of the coupling mechanism is always frictionally slidable from the first end to the second end of the hollow sleeve portion formed in the stand such that the stand is fixable at the fully extended position and the plurality of positions between the fully retracted position and the fully extended position, and ends of the coupling mechanism in the form of the generally U-shaped metallic pin are pivotably coupled to the base about the first axis. Alternatively, a middle portion of the coupling mechanism in the form of the generally U-shaped metallic pin is pivotably coupled to the base about the first axis, and ends of the coupling mechanism in the form of the generally U-shaped metallic pin are slidably coupled to the stand such that the ends of the coupling mechanism is always frictionally slidable from the first end to the second end of the hollow sleeve portion formed in the stand such that the stand is fixable at the fully extended position and the plurality of positions between the fully retracted position and the fully extended position.

One or more embodiments of the present invention include a method of making a holder for an electronic device comprising only three plastic or rubber components and no more than two metallic components, the method of making comprising: providing a body portion that includes a coupling portion configured to couple a portable device to the body portion; providing a support portion adapted to be rotatably coupled to the body; providing a stand portion adapted to be pivotably coupled to the support; providing a coupling portion adapted to be pivotably coupled to the support portion and slidably coupled to the stand portion; coupling the support portion to the body portion; coupling the coupling portion to the stand portion; coupling the coupling portion to the support portion; and coupling the stand portion to the support portion.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 2A is a rear view of a device holder according to another embodiment of the present invention, where a movable stand of the device holder is in a retracted position.

FIG. 2B is a front view of the device holder of FIG. 2A, not holding an electronic device, where the movable stand of the device holder is in a retracted position.

FIG. 2C is a left side view of the device holder of FIG. 2A, where the movable stand of the device holder is in a retracted position.

FIG. 2D is a right side view of the device holder of FIG. 2A, where the movable stand of the device holder is in a retracted position.

FIG. 2E is a first end view of the device holder of FIG. 2A, where the movable stand of the device holder is in a retracted position.

FIG. 2F is a second end view (rotated 180 degrees from FIG. 2E) of the device holder of FIG. 2A, where the movable stand of the device holder is in a retracted position.

FIG. 2I is a rear view of the device holder of FIG. 2A, where the movable stand of the device holder is in an extended position.

FIG. 2K is a left side view of the device holder of FIG. 2A, where the movable stand of the device holder is in an extended position.

FIG. 2L is a right side view of the device holder of FIG. 2A, where the movable stand of the device holder is in an extended position.

FIG. 2M is a first end view of the device holder of FIG. 2A, where the movable stand of the device holder is in an extended position.

FIG. 2N is a second end view (rotated 180 degrees from FIG. 2M) of the device holder of FIG. 2A, where the movable stand of the device holder is in an extended position.

FIG. 2O is a rear perspective view of the device holder of FIG. 2A, where the movable stand of the device holder is in an extended position.

FIG. 2P is a rear cross-sectional perspective view of the device holder of FIG. 2A, where the movable stand of the device holder is in an extended position.

FIG. 3A is a rear view of a device holder according to another embodiment of the present invention, where a movable stand of the device holder is in a retracted position.

FIG. 3C is a left side view of the device holder of FIG. 3A, where the movable stand of the device holder is in a retracted position.

FIG. 3D is a right side view of the device holder of FIG. 3A, where the movable stand of the device holder is in a retracted position.

FIG. 3E is a first end view of the device holder of FIG. 3A, where the movable stand of the device holder is in a retracted position.

FIG. 3F is a second end view (rotated 180 degrees from FIG. 3E) of the device holder of FIG. 3A, where the movable stand of the device holder is in a retracted position.

FIG. 3I is a rear view of the device holder of FIG. 3A, where the movable stand of the device holder is in an extended position.

FIG. 3L is a right side view of the device holder of FIG. 3A, where the movable stand of the device holder is in an extended position.

FIG. 3M is a first end view of the device holder of FIG. 3A, where the movable stand of the device holder is in an extended position.

FIG. 3N is a second end view (rotated 180 degrees from FIG. 3M) of the device holder of FIG. 3A, where the movable stand of the device holder is in an extended position.

FIG. 3O is a rear perspective view of the device holder of FIG. 3A, where the movable stand of the device holder is in an extended position.

FIG. 3Q is a rear perspective view of the device holder of FIG. 3A, where the movable stand of the device holder is in a retracted position.

FIG. 4A is a rear view of a device holder according to another embodiment of the present invention, where a movable stand of the device holder is in a retracted position.

FIG. 4B is a front view of the device holder of FIG. 4A, not holding an electronic device, where the movable stand of the device holder is in a retracted position.

FIG. 4D is a left side view of the device holder of FIG. 4A, where the movable stand of the device holder is in a retracted position.

FIG. 4E is a right side view of the device holder of FIG. 4A, where the movable stand of the device holder is in a retracted position.

FIG. 4I is a cross-sectional view of the device holder of FIG. 4A with the movable stand in an extended position.

FIG. 4J is a rear view of the device holder of FIG. 4A, where the movable stand of the device holder is in an extended position.

FIG. 4K is a front view of the device holder of FIG. 4A, where the movable stand of the device holder is in an extended position.

FIG. 4M is a left side view of the device holder of FIG. 4A, where the movable stand of the device holder is in an extended position.

FIG. 4O is a first end view of the device holder of FIG. 4A, where the movable stand of the device holder is in an extended position.

FIG. 4P is a second end view (rotated 180 degrees from FIG. 4O) of the device holder of FIG. 4A, where the movable stand of the device holder is in an extended position.

FIG. 5A is a rear view of a device holder according to another embodiment of the present invention, where a movable stand of the device holder is in a retracted position.

FIG. 5B is a front view of the device holder of FIG. 5A, not holding an electronic device, where the movable stand of the device holder is in a retracted position.

FIG. 5C is a left side view of the device holder of FIG. 5A, where the movable stand of the device holder is in a retracted position.

FIG. 5D is a right side view of the device holder of FIG. 5A, where the movable stand of the device holder is in a retracted position.

FIG. 5E is a first end view of the device holder of FIG. 5A, where the movable stand of the device holder is in a retracted position.

FIG. 5F is a second end view (rotated 180 degrees from FIG. 5E) of the device holder of FIG. 5A, where the movable stand of the device holder is in a retracted position.

FIG. 5I is a rear view of the device holder of FIG. 5A, where the movable stand of the device holder is in an extended position.

FIG. 5J is a front view of the device holder of FIG. 5A, where the movable stand of the device holder is in an extended position.

FIG. 5K is a left side view of the device holder of FIG. 5A, where the movable stand of the device holder is in an extended position.

FIG. 5L is a right side view of the device holder of FIG. 5A, where the movable stand of the device holder is in an extended position.

FIG. 5M is a first end view of the device holder of FIG. 5A, where the movable stand of the device holder is in an extended position.

FIG. 5N is a second end view (rotated 180 degrees from FIG. 5M) of the device holder of FIG. 5A, where the movable stand of the device holder is in an extended position.

FIG. 5O is a rear perspective view of the device holder of FIG. 5A, where the movable stand of the device holder is in an extended position.

FIG. 5P is a rear cross-sectional perspective view of the device holder of FIG. 5A, where the movable stand of the device holder is in an extended position.

FIG. 6D is a front view of a portion of the mounting apparatus or system of FIG. 6A.

DETAILED DESCRIPTION OF THE INVENTION

Figure 1A:
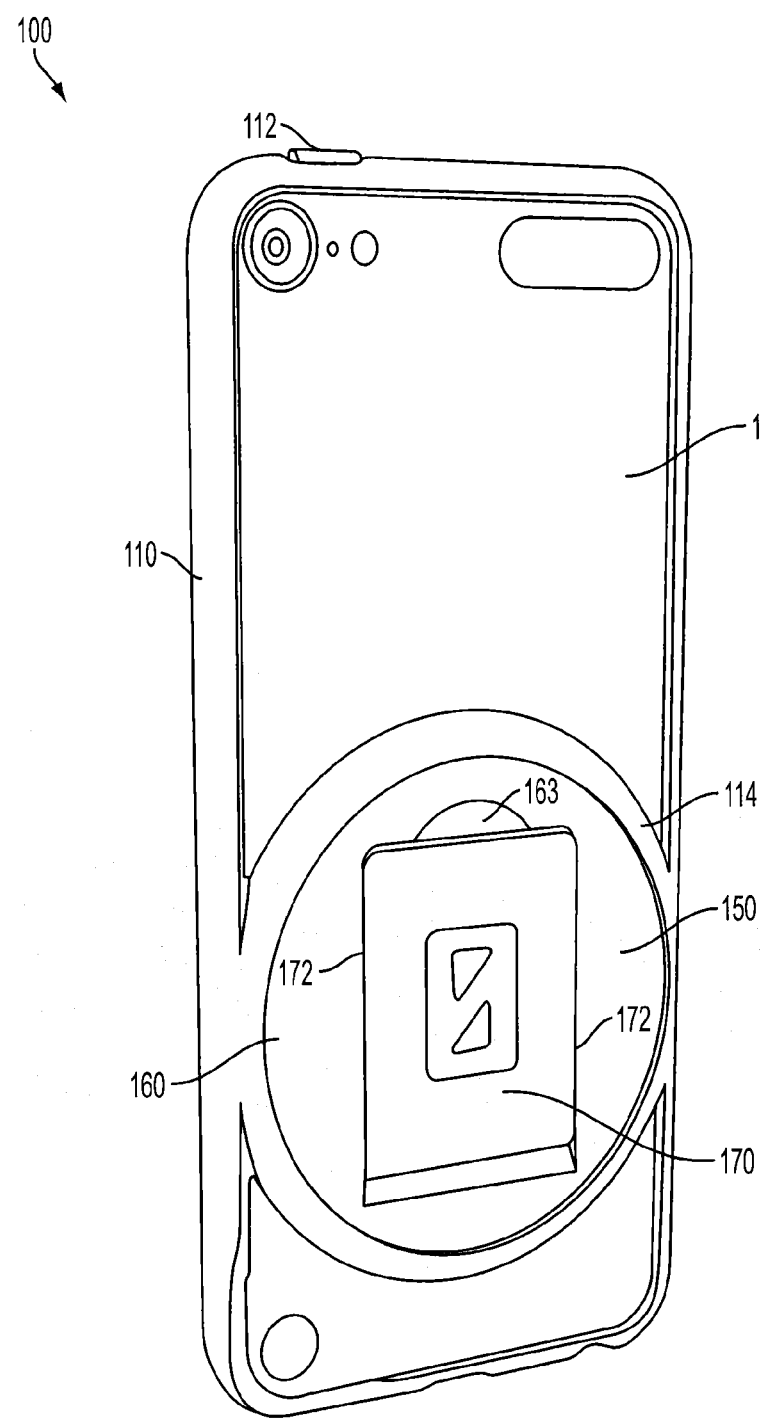
FIG. 1A is a rear perspective view of a device holder according to an embodiment of the present invention, holding an exemplary electronic device, where a movable stand of the device holder is in a retracted position.

The description set forth below in connection with the appended drawings is intended as a description of various embodiments of the invention and is not necessarily intended to represent the only embodiments in which the invention may be practiced. In certain instances, the description includes specific details for the purpose of providing an understanding of the invention. However, it will be apparent to those skilled in the art that the invention may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Additionally, it must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Further, it is intended that the present invention and embodiments thereof cover the modifications and variations. For example, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not limit the present invention to any particular orientation or configuration. Furthermore, terms such as "first," "second," "third," etc., merely identify one of a number of portions, components and/or points of reference as disclosed herein, and likewise do not limit the present invention to any particular configuration or orientation.

As noted above, embodiments of the present invention are directed to electronic device holders with repositionable stands and systems and methods thereof.

Generally speaking, electronic device holders according to embodiments of the present invention can allow or facilitate, by way of their respective movable stands, placement of the electronic device holders on a surface or a support for hands-free support of a corresponding electronic device coupled to a front face or side of the electronic device holder, and with adjustment of viewing angle in both landscape and portrait orientations. Of course other orientations are possible, and the viewing angle can be adjusted or changed to other orientations. Optionally, the movable stand may be used as a hand grip to hold the electronic device holder and corresponding electronic device in a particular orientation and/or angle. Further, a viewing angle of the electronic device holder may be adjusted according to the state of the stand, that is, based on the position the stand is in (e.g., fully extended, fully retracted, or somewhere in between).

In embodiments of the present invention, the extended/retracted positions of the stand are not predefined (other than their minimum and maximum limits, i.e., fully retracted and fully extended). Incidentally, as used herein, fully extended means that the stand is rotated outwardly from a base portion of a rotatable support to a maximum limit, and fully retracted means that the stand is not rotated outwardly at all and resides or rests in a stow position in the base portion of the rotatable support. Thus, the stand can be extended or retracted to any number of positions between the fully retracted and fully extended positions and fixed thereat at any of these positions such that the stand can support the holder with or without the electronic device therein. Further, rotation positions of the stand can be defined or undefined. Thus the stand can be rotated in a same plane (versus outwardly or inwardly) clockwise and/or counterclockwise, to any orientation, including 0 degrees from any starting point, 90 degrees from the starting point, 180 degrees from the starting point, 270 degrees from the starting point, 360 degrees or greater from the starting point, or anywhere in between.

Alternatively, the stand can be extended or retracted, between fully retracted and extended positions, to preset or predefined positions via pin and slot/groove/recess, for example, based on the description and illustrations in U.S. Provisional App. No. 61/191,454 filed Sep. 9, 2008; U.S. patent application Ser. No. 12/556,182 filed Sep. 9, 2008; U.S. patent application Ser. No. 12/758,377 filed Apr. 12, 2010 (now U.S. Pat. No. 8,382,059); U.S. patent application Ser. No. 13/345,345 filed Jan. 6, 2012; and/or U.S. patent application Ser. No. 13/745,693 filed Jan. 18, 2013. The entire content of each of the foregoing applications is hereby incorporated by reference into the present application. Likewise, the stand can be rotated to preset or predefined positions, for example, as set forth in any of the aforementioned applications. Optionally, portions of undefined positions and defined stand extension/retraction positions and/or orientations can be implemented together.

Turning to FIGS. 1A-1E, these figures illustrate various views of an electronic device holder 100 according to one, non-limiting embodiment of the present invention. FIGS. 1A-1E illustrate the electronic device holder 100 holding a particular electronic device 1, but the electronic device holder 100 can hold electronic devices other than the one shown in FIGS. 1A-1E. Further, electronic device holder 100 can be sized and/or shaped, without departing from the essence, spirit, or scope of the present invention, to hold electronic devices other than the one shown in FIGS. 1A-1E.

Electronic device holder 100 can include a body portion 110 and a base or support portion 150.

An electronic device 1 can be removably coupled to the electronic device holder 100 by way of a front face 102 of the electronic device holder 100. More specifically, the electronic device 1 can be inserted into the electronic device holder 100, via the front face 102, such that the edges or sides of the electronic device 1 are completely or partially surrounded or covered by the body portion 110 (e.g., a frame portion) of the electronic device holder 100 and held by friction fit and/or snap fit, for example. Portions of the body 110 can cover or surround a front face portion of the electronic device 1 (not expressly shown) and, optionally, such portions do not cover an access or operation portion of the electronic device 1, such as a touch screen, display, or keypad area of the electronic device 1, so a user may access or operate these portions. Optionally, body portion 110 can have access portions 112 to access or provide access to portions, buttons, etc. on the edges or sides of the electronic device 1. The access portions 112 can include, but are not limited to, parts with no material or holes, clear portions, preformed "buttons," or the like.

In this or other embodiments of the present invention, body portion 110 can have a portion or portions arranged on a back side of the electronic device holder 100 that are clear or cut away (i.e., removed). Optionally, one or more portions can be clear and one or more portions can be cut-away. For example, the embodiment shown in FIGS. 1A-1E includes body portion 110 having two cut-away portions, one above the support portion 150 and another below the support portion 150. In this way, backside portions of the electronic device 1 may be viewable in both clear and cut-away cases, and in the case of cut-away portions, removal of the material for the cut-away portions can reduce the weight of the electronic device holder 100 as compared to an electronic device holder where such portions are not cut away. Further, one or more cut-away or clear portions may provide access to a logo, information, or trademark associated with the electronic device 1, and alternatively or optionally, may provide access to an operational portion of the electronic device, such as an image or video detection or capturing portion.

Body portion 110 also includes a mounting portion 114 constructed to rotatably connect to and house a base portion 160 of support portion 150, for example, as shown and illustrated in FIGS. 1A-1E. Mounting portion 114 can have a thickness to allow stand 170 (to be discussed in more detail below) to be fully recessed within an opening 161 formed in a base portion 160 such that the stand 170 is flush or substantially flush with the top of the mounting portion 114 and the base portion 160. Optionally, the top of the mounting portion (e.g., by one millimeter in the thickness direction of the mounting portion 114) may exceed in height slightly the base portion 160 and the stand 170 when the stand is fully retracted in opening 161, with the base portion 160 and the stand 170 being flush or substantially flush with each other and with the top of the mounting portion 114. The rotatable connection and housing of the base portion 160 by the mounting portion 114 can be based on or as set forth in U.S. patent application Ser. No. 12/758,377 filed Apr. 12, 2010 (now U.S. Pat. No. 8,382,059); U.S. patent application Ser. No. 13/345,345 filed Jan. 6, 2012; U.S. patent application Ser. No. 13/745,693 filed Jan. 18, 2013; or U.S. patent application Ser. No. 13/735,702 filed Jan. 7, 2013, the entire contents of which all having been previously incorporated by reference herein.

As alluded to above, rotation positions of the support portion 150 around its central axis (i.e., center portion of the circle defined by the support portion 150) relative to mounting portion 114 can be undefined, and thus the support portion 150 can be rotated, clockwise and/or counterclockwise, to any orientation, including 0 degrees from any starting point, 90 degrees from the starting point, 180 degrees from the starting point, 270 degrees from the starting point, 360 degrees or greater from the starting point, or anywhere in between. Alternatively, support portion 150 can be rotated to preset or predefined positions, such as some or all of those expressly set forth above. Optionally, portions of undefined positions and defined support portion 150 orientations can be implemented. FIGS. 1A-1D, for example, illustrate the support portion 150 being in a first orientation (e.g., portrait orientation), and FIG. 1E illustrates the support portion 150 being in a second orientation (e.g., landscape orientation), 90 degrees offset from the first orientation. Of course, as noted above, other rotatable orientations for the support portion 150 are also possible, such as orientations non-orthogonal or non-parallel to landscape or portrait orientations.

Support portion 150 can include a base portion 160, a stand or leg portion 170, a first coupler, coupling mechanism, or fastener 180, and a second coupler, coupling mechanism, or fastener 190 (not expressly shown in FIGS. 1A-1E) that rotatably couples the stand 170 to base portion 160 such that the stand 170 can be rotatably retracted and extended inwardly and outwardly, respectively, about a rotational axis of the second coupler 190. First coupler 180 can be rotatably coupled to base portion 160 such that first coupler 180 can be rotatably retracted and extended inwardly and outwardly, respectively, about a rotational axis at which the first coupler 180 is rotatably coupled to base portion 160. Further, first coupler 180 can be frictionally and slidably coupled to stand 170 such that the stand 170 can be fixed in a plurality of different positions, including fully extended, fully retracted, or anywhere in between. Base portion 160 can also include notches 164 on opposite sides of the stand 170 (not expressly shown in FIGS. 1A-1E, but illustrated in FIGS. 6A and 6D). Thus, the electronic device 1 may be mounted, by way of the electronic holder 100 and a corresponding mounting apparatus, to one or more of an arm, a torso or waist, a bicycle, a car, a dashboard, a stroller, or the like.

First coupler 180 can be a U-shaped or generally U-shaped pin or wire (e.g., metallic) having ends 181, for example bent ends, that can be coupled to respective inner sides 162 of base portion 160 such that the pin 180 can rotate about an axis running between the two points at which the ends 181 are coupled to respective retaining mechanisms of inner sides 162 of base portion 160. For example, ends 181 may be rotatably coupled to the inner sides 162 of base portion 160 via respective holes (not expressly shown in FIGS. 1A-1E). Optionally, the ends 181 may be removably coupled to the respective holes in the inner sides 162 of base portion, for example, by forcing the ends 181 inwardly toward each other such that they become free of their respective retaining mechanisms (e.g., the respective holes).

Figure 1B:
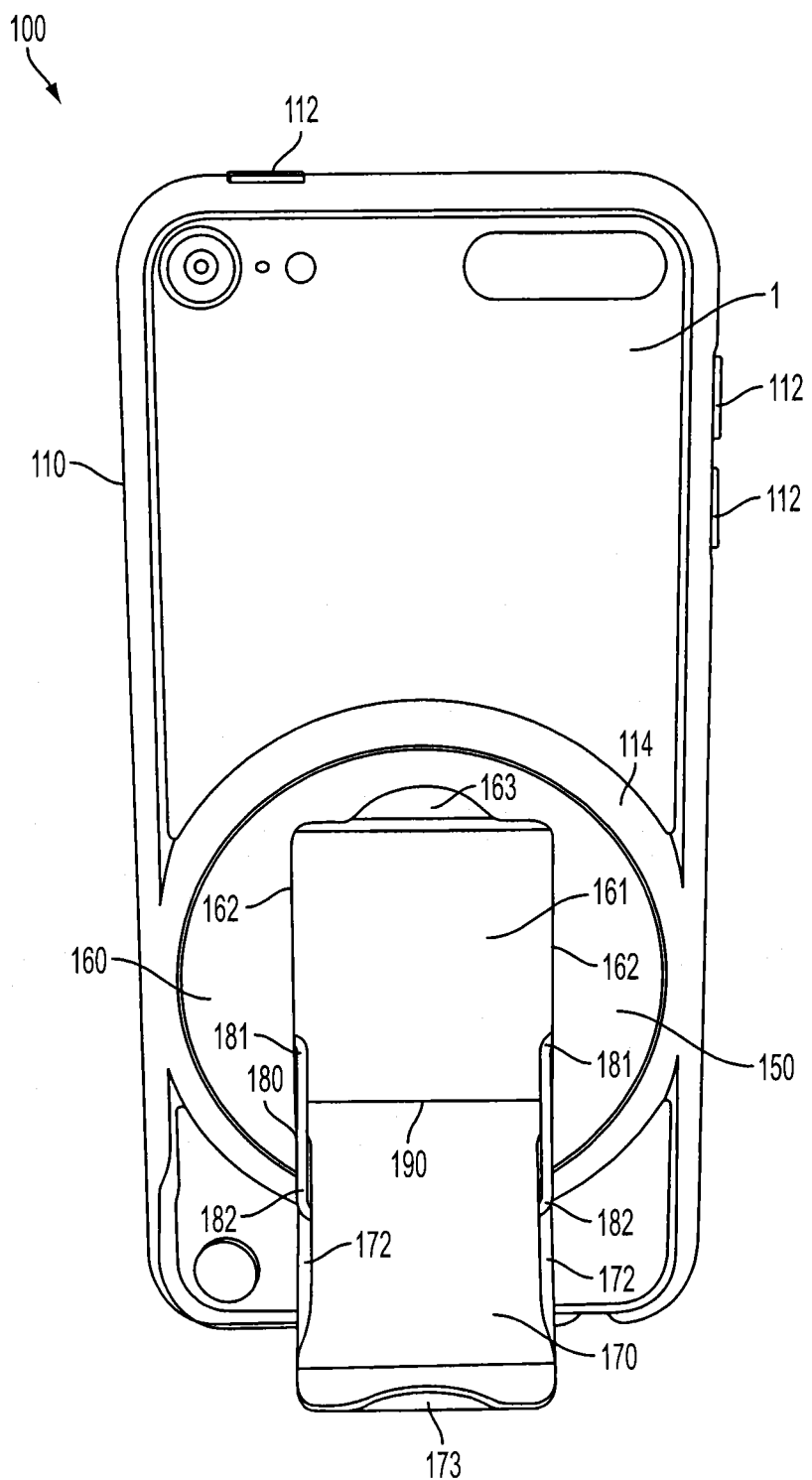
FIG. 1B is a rear view of the device holder of FIG. 1A holding the exemplary electronic device, where the movable stand is in an extended position to support the device holder in portrait orientation.
Figure 1C:
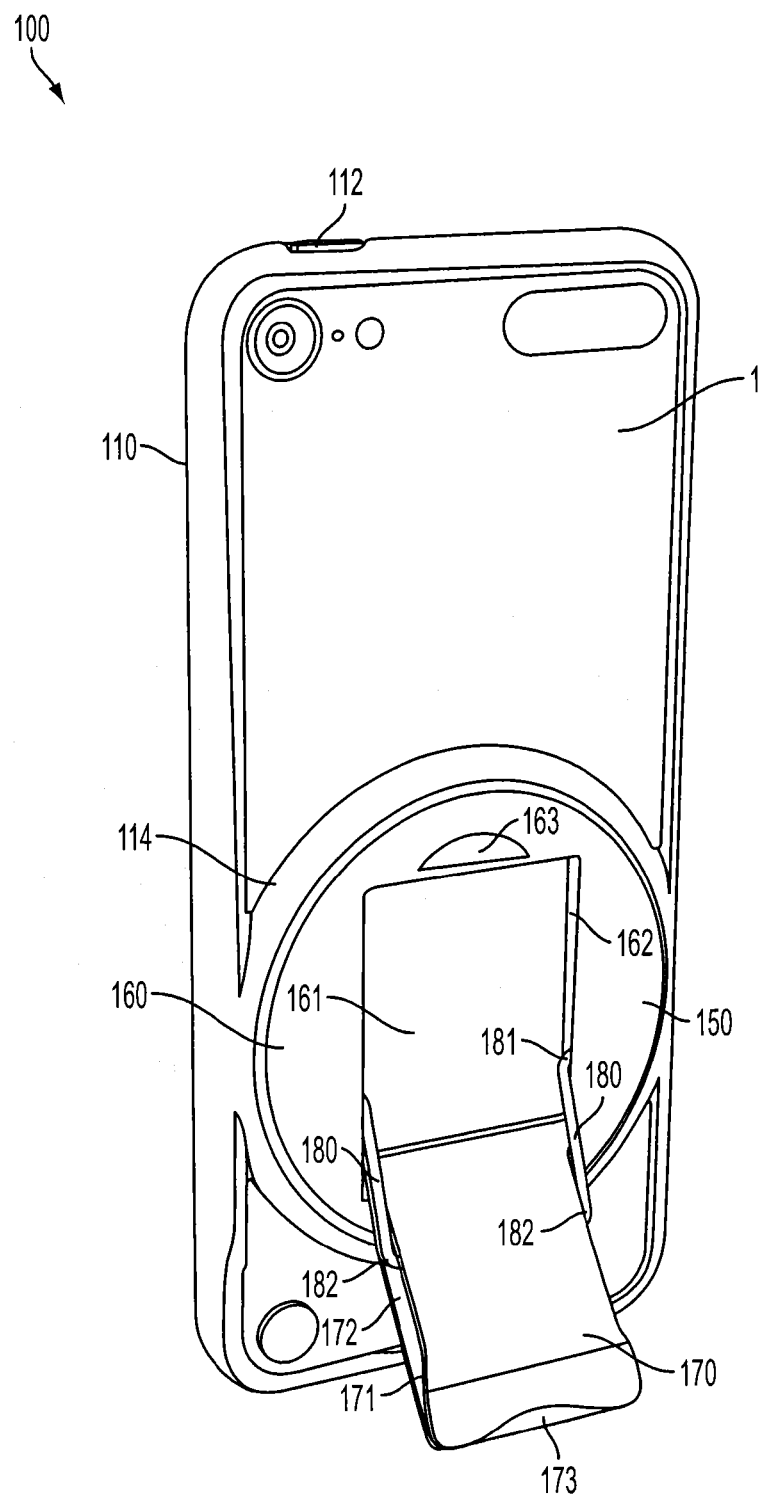
FIG. 1C is a rear perspective view of the device holder of FIG. 1A holding the exemplary electronic device, where the movable stand is in an extended position to support the device holder in portrait orientation.
Figure 1D:
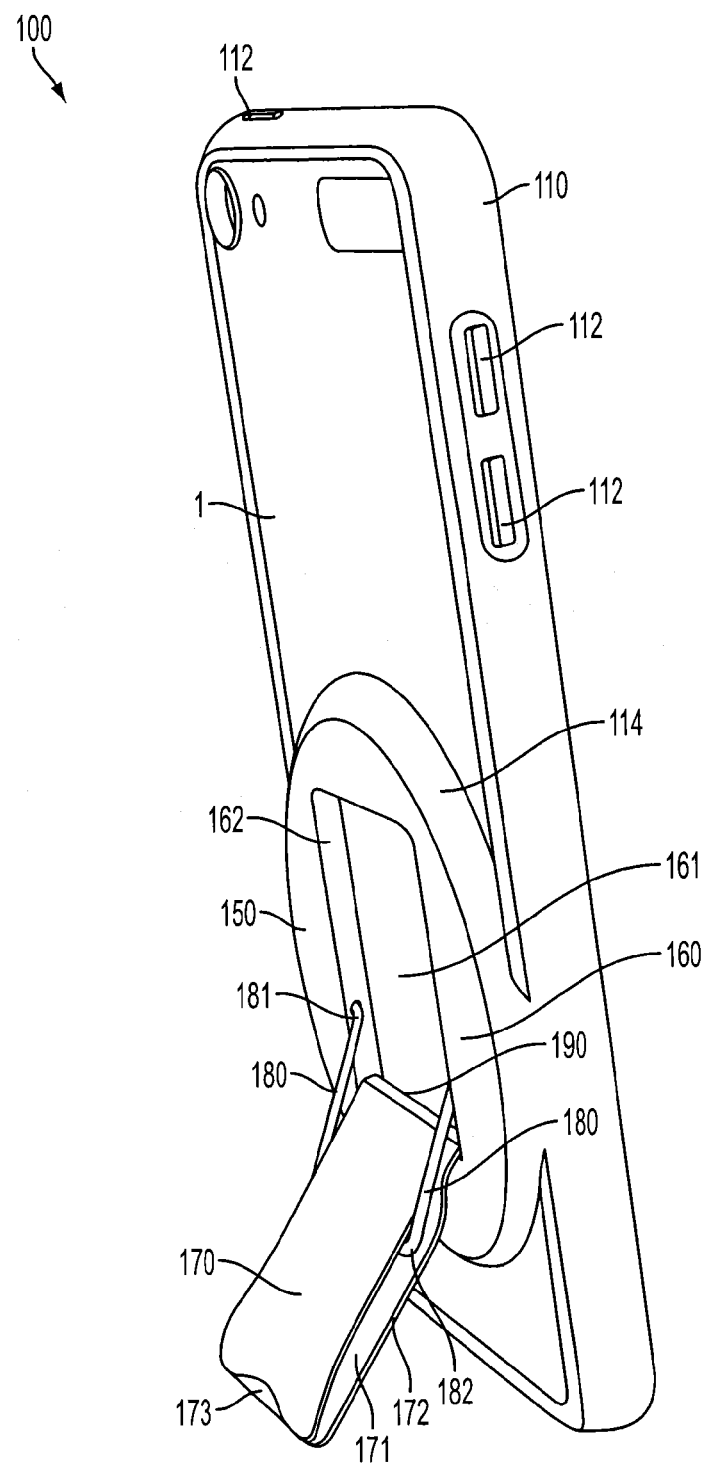
FIG. 1D is a left side perspective view of the device holder of FIG. 1A holding the exemplary electronic device, where the movable stand is in an extended position to support the device holder in portrait orientation.
Figure 1E:
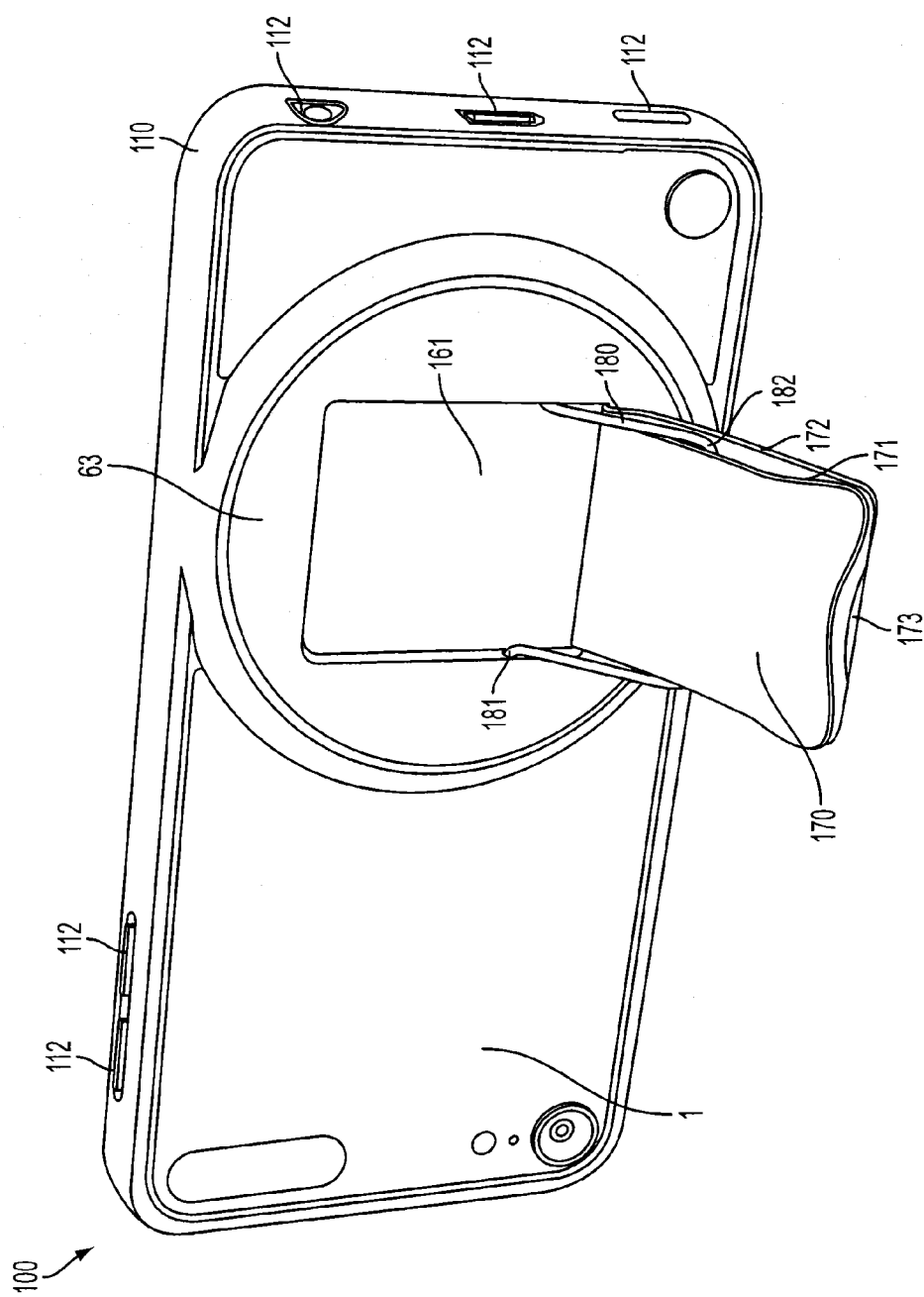
FIG. 1E is a rear perspective view of the device holder of FIG. 1A holding the exemplary electronic device, where the movable stand is in an extended position to support the device holder in landscape orientation.

A middle portion 182 of the pin 180 can extend through an elongate sleeve 171 formed in stand 170, from one side of the stand 170 to another side of the stand 170, as illustrated in FIGS. 1B-1E, for example. The sleeve 171 is elongate in both width- and length-wise directions of the stand 170. The elongate sleeve 171 can be a tight sleeve and can act on the middle portion 182 of pin 180 in a sliding friction fit manner, without the use of notches, grooves, or some other recessed or protruding members, for example, such that the pin 180 and thus the stand 170 can be held or fixed in any of a plurality of positions, for example, from a fully extended position of the stand 170 to anywhere in between the fully extended position and a fully retracted position of the stand 170. Thus, middle portion 182 of pin 180 can move from one end of the sleeve 171 to the other end of sleeve 171 (in a length-wise direction of the stand 170) such that the stand 170 can be frictionally held in a fully retracted position (e.g., such as shown in FIG. 1A), a fully extended position (e.g., such as shown in FIGS. 1B and 1C), or any number of positions between the fully extended position and the fully retracted position. Put another way, other than the fully extended position and the fully retracted position, one or more embodiments of the present invention do not include predetermined or predefined set positions to which the stand 170 can be extended or retracted, because the sleeve 171 may not include notches, grooves, or some other recessed or protruding members. When the stand 170 is fully retracted (i.e., fully seated in opening 161), the pin 180 is not exposed to view from a back side of the electronic device holder 100 and is hidden beneath ledges 172 of stand 170.

Optionally, the interior of the sleeve 171 may taper in one or both directions (in a length-wise direction of the stand 170) such that the friction force applied to the middle portion 182 of pin 180 varies. One advantage of implementing a tight sleeve without notches, grooves, etc., is because any position or positions between the fully extended position and the fully retracted position can be realized. Another advantage of implementing a tight sleeve without notches, grooves, etc., is because such sleeve can be relatively easier to manufacture without defects in the sleeve that might preclude any number of retracted/extended positions. Alternatively, notches, grooves, some other recessed or protruding members, or the like may be implemented to hold the stand 170 in particular, predefined or predetermined positions.

The middle portion 182 of pin 180 can run in a straight line from one side of the stand 170 to the other side of the stand 170 parallel to a width-wise direction of the stand 170, hence the aforementioned U-shape nomenclature. However, the middle portion 182 is not limited to such a configuration and may take other forms, such as a zig-zag, sinusoidal, "on-off" pattern, or arced in the width-wise and/or thickness direction of the stand 170 or sleeve 171.

Second coupler 190, as noted above, can rotatably couple the stand 170 to base portion 160 such that the stand 170 can be rotatably retracted and extended inwardly and outwardly, respectively, from and between the fully retracted and extended positions, about a rotational axis of the second coupler 190. In one or more embodiments, second coupler 190 is a straight pin or wire that extends through a pin hole from one side of the stand 170 to the other side (in a width-wise direction of the stand 170), with ends of the pin 190 being rotatably coupled to respective retaining mechanisms (e.g., respective pin holes) in the inner sides 162 of base portion 160. Alternatively, the second coupler 190 can include individual pins or projections from the stand 170 that are rotatably coupled to respective retaining mechanisms (e.g., respective pin or projection holes) in the inner sides 162 of base portion 160. Optionally, the projections to be rotatably coupled to respective retaining mechanisms (e.g., projection holes) in the inner sides 162 of base portion 160 may be formed in one piece with the stand 170, of the same material as the stand 170 and in a same manufacturing process as the stand 170 (e.g., injection molding).

Stand 170 and base portion 160 include recess portions 173, 163, respectively, that can facilitate seating of the stand 170 in opening 161 and/or rotatable extension of the stand 170 from its fully retracted position to an extended position, for example, by a user finger, thumb, or some other object that fits within the recess portions to pry or lift up the stand 170 from opening 161. Optionally, in one or more embodiments, stand 170 may include a grip portion or handle that a user may grab or grip to pull out the stand 170 from its fully retracted position and/or to move the stand 170 to other positions, including back to the fully retracted position, seated within opening 161.

Body portion 110 and support portion 150 can be made of the same material, for example, thermoplastic or rubber, or alternatively some portions of may be made of different materials. Further, body portion 110 and support portion 150

(and respective components thereof) can be formed by molded, for example, injection molding. Thus, electronic device holders 100 according to embodiments of the present invention may be comprised of only two or three separate plastic or rubber parts, for example, the body portion 110, the base portion 160, and the stand 170 in the case of three plastic or rubber parts.

FIGS. 2A-2Q, FIGS. 3A-3Q, FIGS. 4A-4S, and FIG. 5A-5Q illustrate additional, non-limiting embodiments of electronic device holders 200, 300, 400, and 500 of the present invention. In certain instances, like features have merely been relabeled by adding one hundred.

Figure 2G:
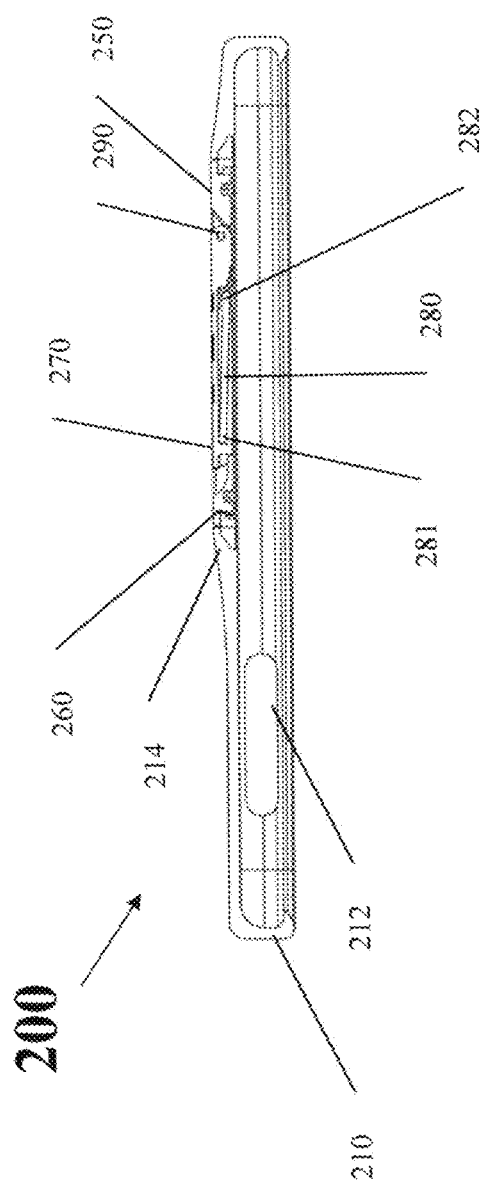
FIG. 2G is a cross-sectional view of the device holder of FIG. 2A with the movable stand in a fully retracted position.
Figure 2H:
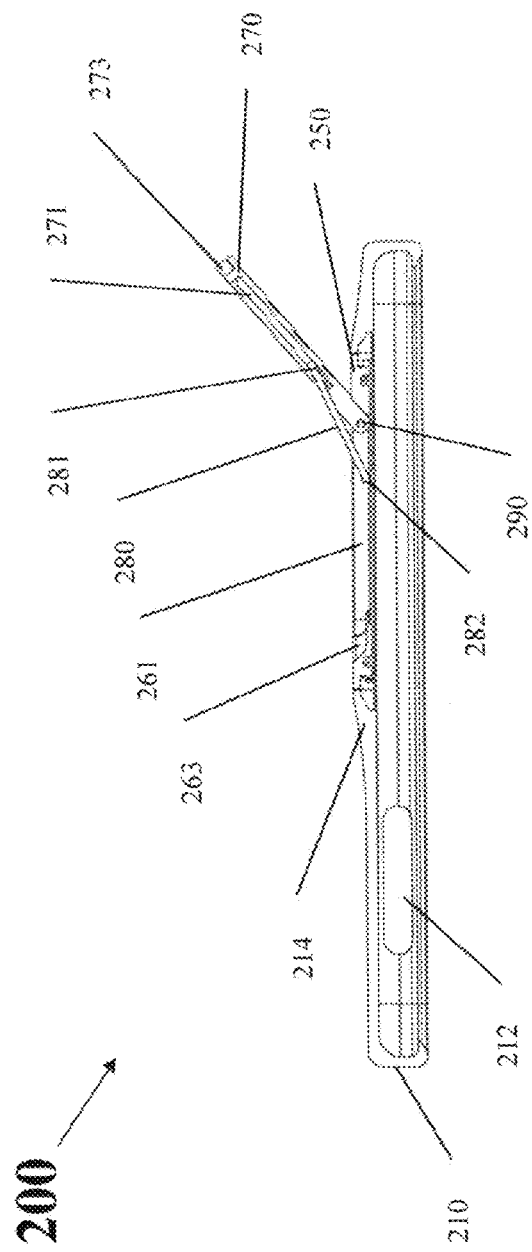
FIG. 2H is a cross-sectional view of the device holder of FIG. 2A with the movable stand in an extended position.
Figure 21:
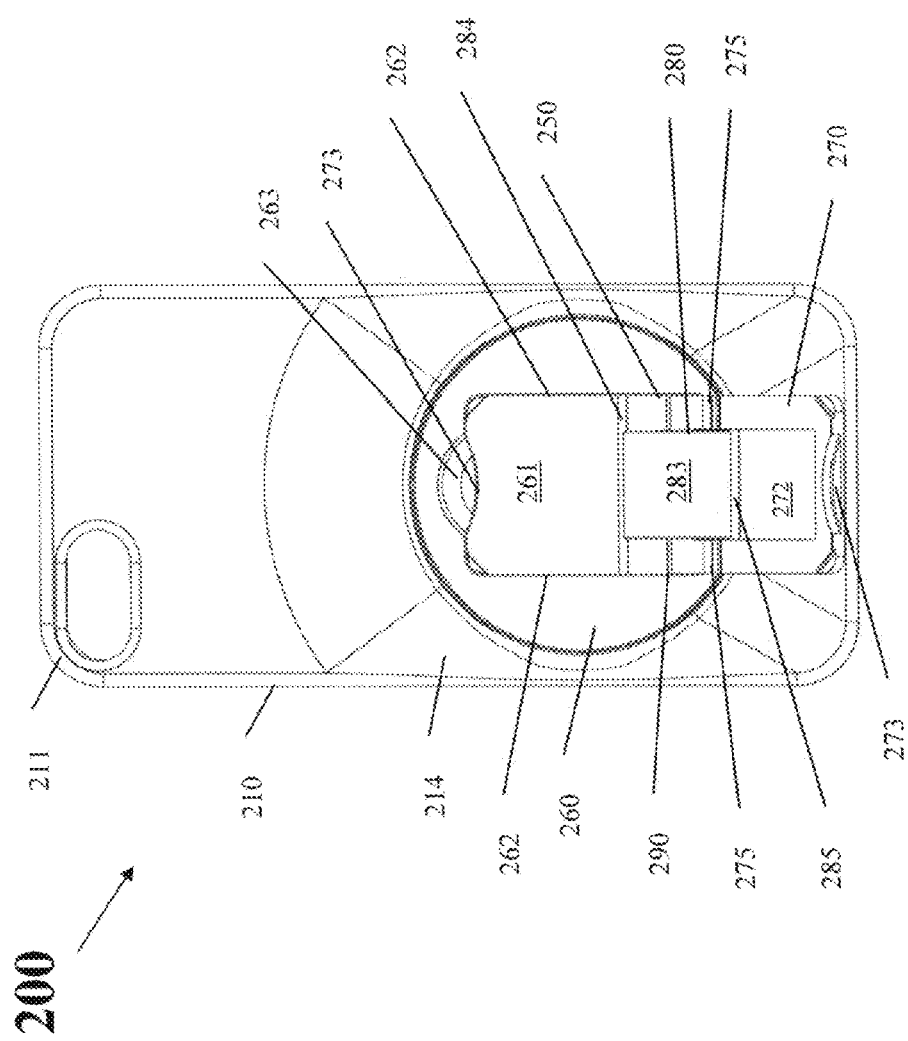
Figure 2J:
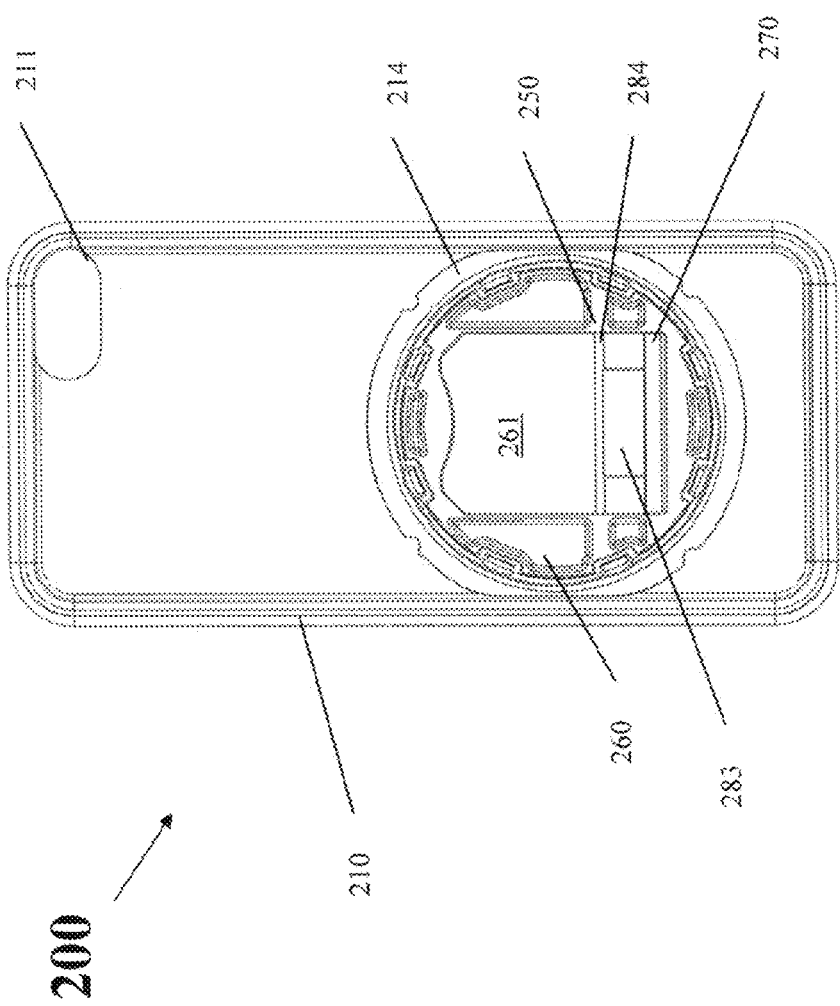
FIG. 2J is a front view of the device holder of FIG. 2A, where the movable stand of the device holder is in an extended position.
Figure 2Q:
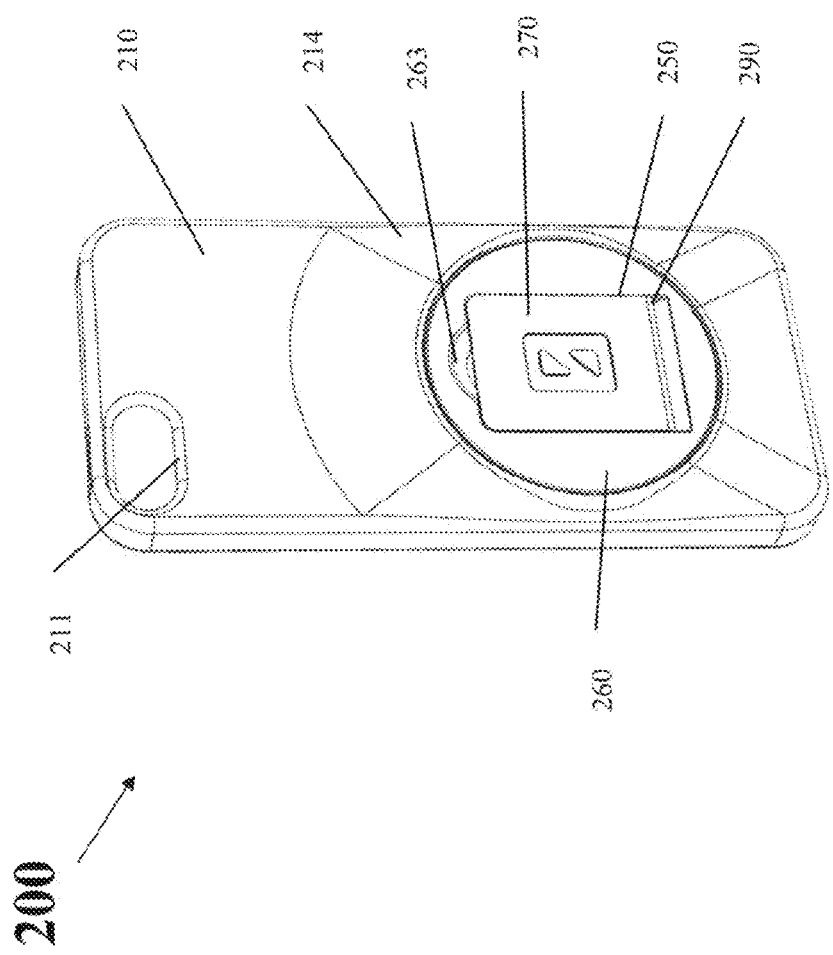
FIG. 2Q is a rear perspective view of the device holder of FIG. 2A, where the movable stand of the device holder is in a retracted position.

FIGS. 2A-2Q illustrate various views of an electronic device holder 200 according to another, non-limiting embodiment of the present invention. In certain views, electronic device holder 200 is illustrated without an electronic device held therein. However, electronic device holder 200 can hold the electronic device 1 shown in FIGS. 1A-1E or other electronic devices. Further, electronic device holder 200 can be sized and/or shaped, without departing from the essence, spirit, or scope of the present invention, to hold electronic devices other than the one shown in FIGS. 1A-1E.

The electronic device holder 200 illustrated in FIGS. 2A-2Q can include a body portion 210 and a base or support portion 250.

An electronic device can be removably coupled to the electronic device holder 200 by way of a front face 202 of the electronic device holder 200. More specifically, an electronic device can be inserted into the electronic device holder 200, via the front face 202, such that the edges or sides of the electronic device are completely or partially surrounded or covered by the body portion 210 (e.g., a frame portion of the body portion 210) of the electronic device holder 200 and held by friction fit and/or snap fit. Portions of the body 210 can cover or surround a front face portion of the electronic device and, optionally, such portions do not cover an access or operation portion of the electronic device, such as a touch screen, display, or keypad area of the electronic device, so a user may access or operate these portions. Optionally, body portion 210 can have access portions 212 to access or provide access to portions, buttons, etc. on the edges or sides of the electronic device. The access portions 212 can include, but are not limited to, parts with no material or holes, clear portions, preformed "buttons," or the like.

In this or other embodiments of the present invention, body portion 210 can have a portion or portions arranged on a back side of the electronic device holder 200 that are clear or cut away (i.e., removed). Different from the embodiment shown in FIGS. 1A-1E, body portion 210 includes a backside with only one, smaller cut-out or clear portion 211, which may provide access to an operational portion of the electronic device, such as an image or video detection or capturing portion. Of course body portion 210 can have a backside the same as or similar to the backside of body portion 110 of electronic device holder 100, with multiple clear or cut-away portions.

Body portion 210 also includes a mounting portion 214 constructed to rotatably connect to and house a base portion 260 of support portion 250, for example, as shown and illustrated in FIGS. 2A-2Q. Mounting portion 214 can have a thickness to allow stand 270 (to be discussed in more detail below) to be fully recessed within an opening 261 formed in a base portion 260 such that the stand 270 is flush or substantially flush with the top of the mounting portion 214 and the base portion 260. Optionally, the top of the mounting portion 214 may exceed in height slightly (e.g., by one millimeter in the thickness direction of the mounting portion 214) the base portion 260 and the stand 270 when the stand is fully retracted in opening 261, with the base portion 260 and the stand 270 being flush or substantially flush with each other and/or with the top of the mounting portion 214. The rotatable connection and housing of the base portion 260 by the mounting portion 214 can be based on or as set forth as described and illustrated above for electronic device holder 100.

Rotation positions of the support portion 250 around its central axis (i.e., center portion of the circle defined by the support portion 250) relative to mounting portion 214 can be undefined, and thus the support portion 250 can be rotated, clockwise and/or counterclockwise, to any orientation, including 0 degrees from any starting point, 90 degrees from the starting point, 180 degrees from the starting point, 270 degrees from the starting point, 360 degrees or greater from the starting point, or anywhere in between. Alternatively, support portion 250 can be rotated to preset or predefined positions, such as some or all of those expressly set forth above. Optionally, portions of undefined positions and defined support portion 250 orientations can be implemented. Of course, as noted above, other rotatable orientations for the support portion 250 are also possible, such as orientations non-orthogonal or non-parallel to landscape or portrait orientations.

Support portion 250 can include a base portion 260, a stand or leg portion 270, a first coupler, coupling mechanism, or fastener 280, and a second coupler, coupling mechanism, or fastener 290 (expressly shown in FIG. 2P) that rotatably couples the stand 270 to base portion 260 such that the stand 270 can be rotatably retracted and extended inwardly and outwardly, respectively, about a rotational axis of the second coupler 290. First coupler 280 can be rotatably coupled to base portion 260 such that first coupler 280 can be rotatably retracted and extended inwardly and outwardly, respectively, about a rotational axis at which the first coupler 280 is rotatably coupled to base portion 260. Further, first coupler 280 can be frictionally and slidably coupled to stand 270 such that the stand 270 can be fixed in a plurality of different positions, including fully extended, fully retracted, or anywhere in between. The holder 200 may be coupled to a mounting apparatus in an extended position (fully or partially) of the stand 270. Thus, an electronic device coupled to the holder 200 may be mounted, by way of the electronic holder 200 and a corresponding mounting apparatus, to one or more of an arm, a torso or waist, a bicycle, a car, a dashboard, a stroller, or the like.

First coupler 280 can be an I-shaped or generally I-shaped mechanism that includes a body 283, a first rod portion 284, and a second rod portion 285. Optionally, body and the rod portions may be formed in one piece, for example, of thermoplastic or rubber, with metallic pins or rods running through a hollow cavity in each of the rod portions 284, 285.

Ends of first rod portion 284 can be coupled to respective inner sides 262 of base portion 260 such that a pin or pivot portion of first rod portion 284 can rotate about an axis running between the two points at which the pins or pivot points are coupled to respective retaining mechanisms of inner sides 262 of base portion 260. For example, ends of first rod portion 284 may be rotatably coupled to the inner sides 262 of base portion 260 via respective holes (not expressly shown). Optionally, the ends and thus the first rod portion 284 may be removably coupled to the respective holes in the inner sides 262 of base portion, for example, by bending the ends to shorten the length of the first rod portion such that the ends of the first rod portion 284 become free of their respective retaining mechanisms (e.g., the respective holes).

Ends of second rod portion 285, for example, which include pins or other elongate members, can be coupled to respective separate elongate sleeve portions 271 of the stand 270, via a recessed portion 272 of the stand 270. Incidentally, the sleeve portions 271 are elongate in both width- and length-wise directions of the stand 270. The elongate sleeve portions 271 can be tight sleeves and can act on respective ends of the second rod portion 285 in sliding friction fit manner, without the use of notches, grooves, or some other recessed or protruding members, for example, such that respective ends of the second rod portion 285 and thus the stand 270 can be held or fixed in any of a plurality of positions, for example, from a fully extended position of the stand 270 to anywhere in between the fully extended position and a fully retracted position of the stand 270. Thus, second rod portion 285 can move from one end of the sleeve portions 271 to the other end of sleeve portions 271 (in a length-wise direction of the stand 270) such that the stand 270 can be frictionally held in a fully retracted position, a fully extended position, or any number of positions between the fully extended position and the fully retracted position. Put another way, other than the fully extended position and the fully retracted position, one or more embodiments of the present invention do not include predetermined or pre-defined set positions to which the stand 270 can be extended or retracted, because the sleeve portions 271 may not include notches, grooves, or some other recessed or protruding members. When the stand 270 is fully retracted (i.e., fully seated in opening 261), no portion of the first coupler 280 is exposed to view from a back side of the electronic device holder 200.

Optionally, the interior of the sleeve portions 271 may taper in one or both directions (in a length-wise direction of the stand 270) such that the friction force applied to respective ends of the second rod portion 285 varies. Alternatively, notches, grooves, some other recessed or protruding members, or the like may be implemented in the sleeve portions 271 to hold the stand 270 in particular, predefined or predetermined positions.

Second coupler 290, as noted above, can rotatably couple the stand 270 to base portion 260 such that the stand 270 can be rotatably retracted and extended inwardly and outwardly, respectively, from and between the fully retracted and extended positions, about a rotational axis of the second coupler 290. In one or more embodiments, second coupler 290 is a straight pin, rod, or wire that extends through a pin hole from one side of the stand 270 to the other side (in a width-wise direction of the stand 270), with ends of the pin 290 being rotatably coupled to respective retaining mechanisms (e.g., respective pin holes) in the inner sides 262 of base portion 260. Alternatively, the second coupler 290 can include individual pins or projections from the stand 270 that are rotatably coupled to respective retaining mechanisms (e.g., respective pin or projection holes) in the inner sides 262 of base portion 260. Optionally, the projections to be rotatably coupled to respective retaining mechanisms (e.g., projection holes) in the inner sides 262 of base portion 260 may be formed in one piece with the stand 270, of the same material as the stand 270 and in a same manufacturing process as the stand 270 (e.g., injection molding).

Stand 270 and base portion 260 include recess portions 273, 263, respectively, that can facilitate seating of the stand 270 in opening 261 and/or rotatable extension of the stand 270 from its fully retracted position to an extended position, for example, by a user finger, thumb, or some other object that fits within the recess portions to pry or lift up the stand 270 from opening 261. Optionally, in one or more embodiments, stand 270 may include a grip portion or handle that a user may grab or grip to pull out the stand 270 from its fully retracted position and/or to move the stand 270 to other positions, including back to the fully retracted position, seated within opening 261. Further, stand 270 can include channel portions 275 which are sized and shaped to accommodate corresponding ends of first rod portion 284 when the stand 270 is fully retracted and recessed within opening 261.

Body portion 210 and support portion 250 can be made of the same material, for example, thermoplastic or rubber, or alternatively some portions of may be made of different materials. Further, body portion 210 and support portion 250 (and respective components thereof) can be formed by molded, for example, injection molding. Thus, electronic device holder 200 according to embodiments of the present invention may be comprised of only three or four separate plastic or rubber parts, for example, the body portion 210, the base portion 260, the stand 270, and the first coupler 280 in the case of four plastic or rubber parts.

Figure 3B:
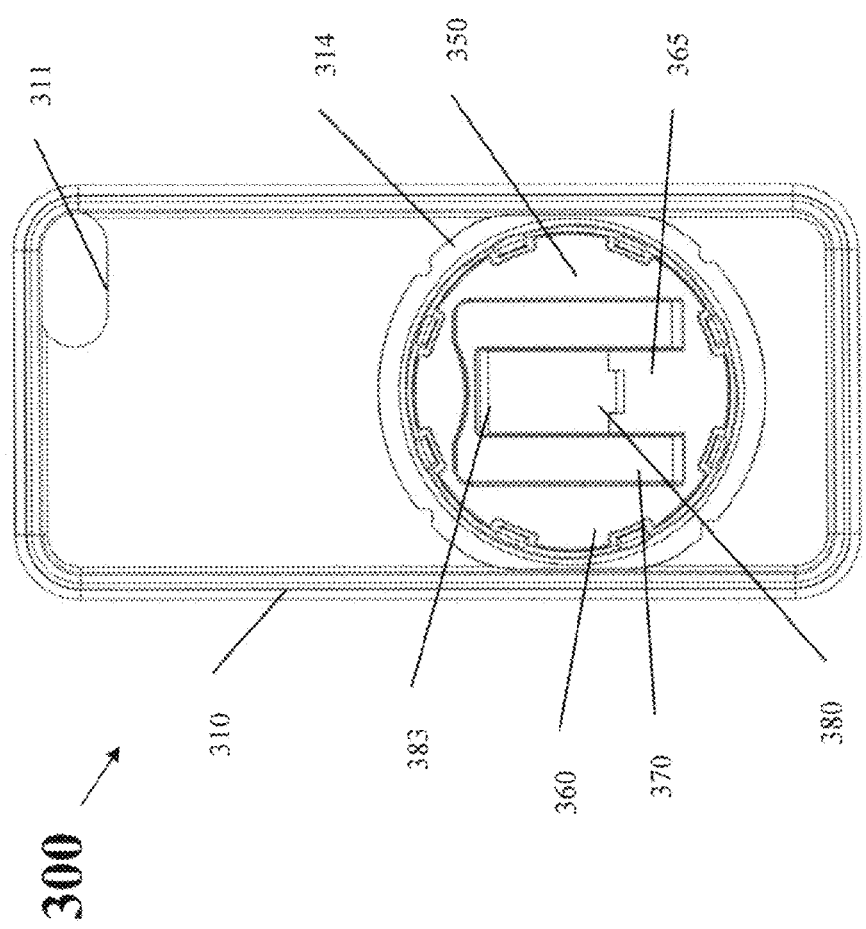
FIG. 3B is a front view of the device holder of FIG. 3A, not holding an electronic device, where the movable stand of the device holder is in a retracted position.
Figure 3G:
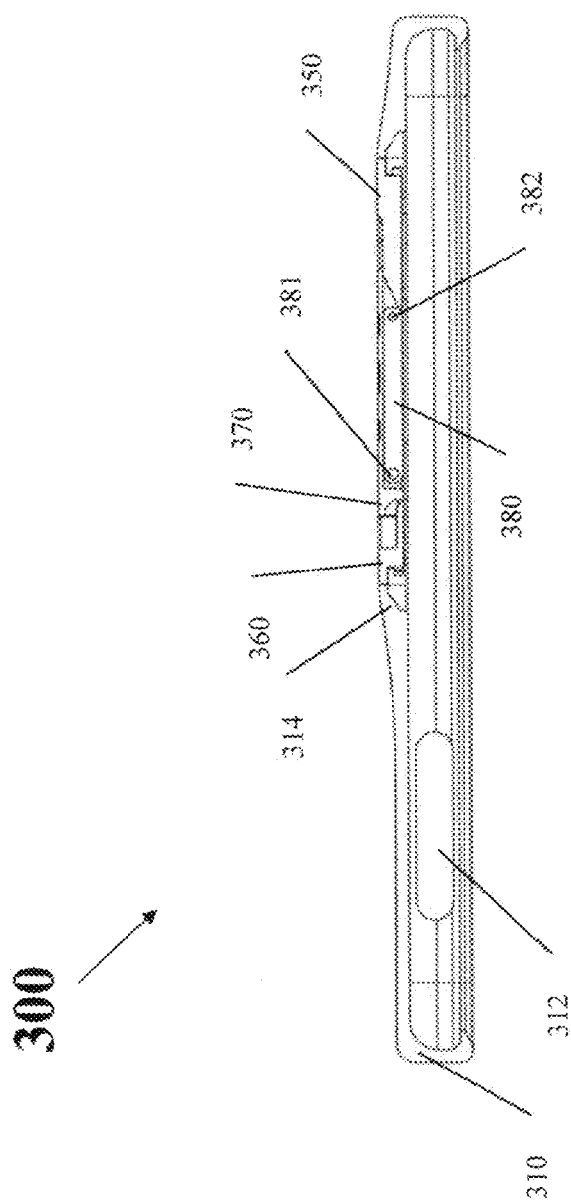
FIG. 3G is a cross-sectional view of the device holder of FIG. 3A with the movable stand in a fully retracted position.
Figure 3H:
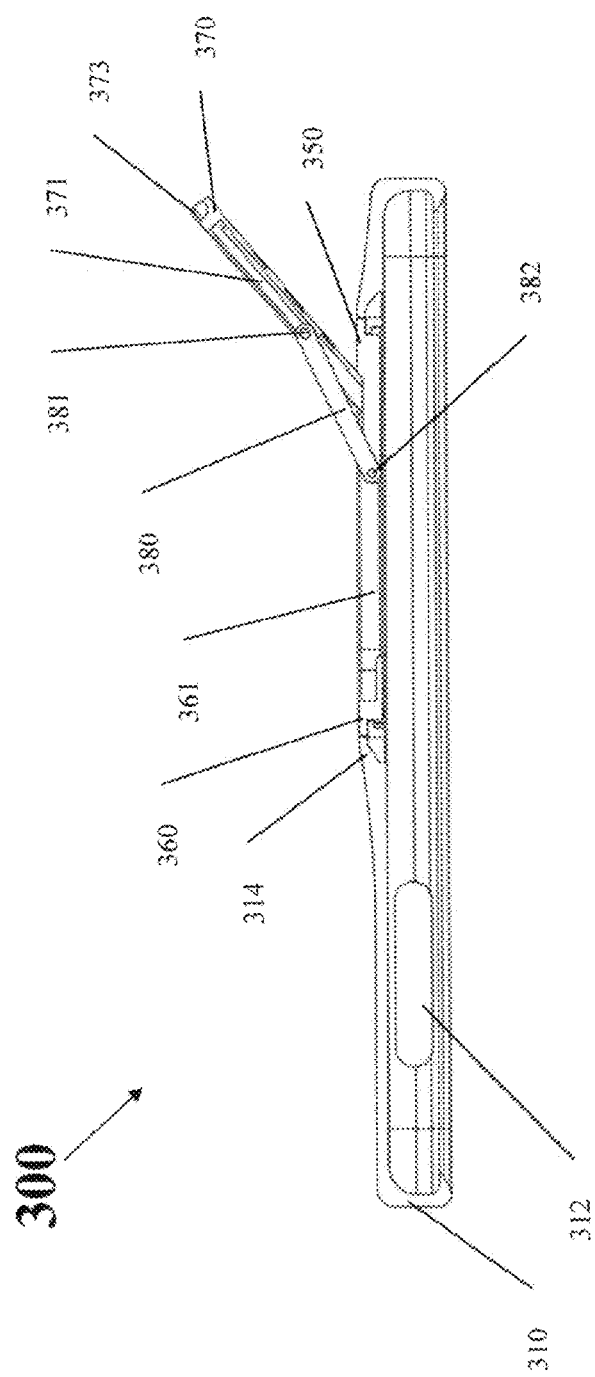
FIG. 3H is a cross-sectional view of the device holder of FIG. 3A with the movable stand in an extended position.
Figure 3J:
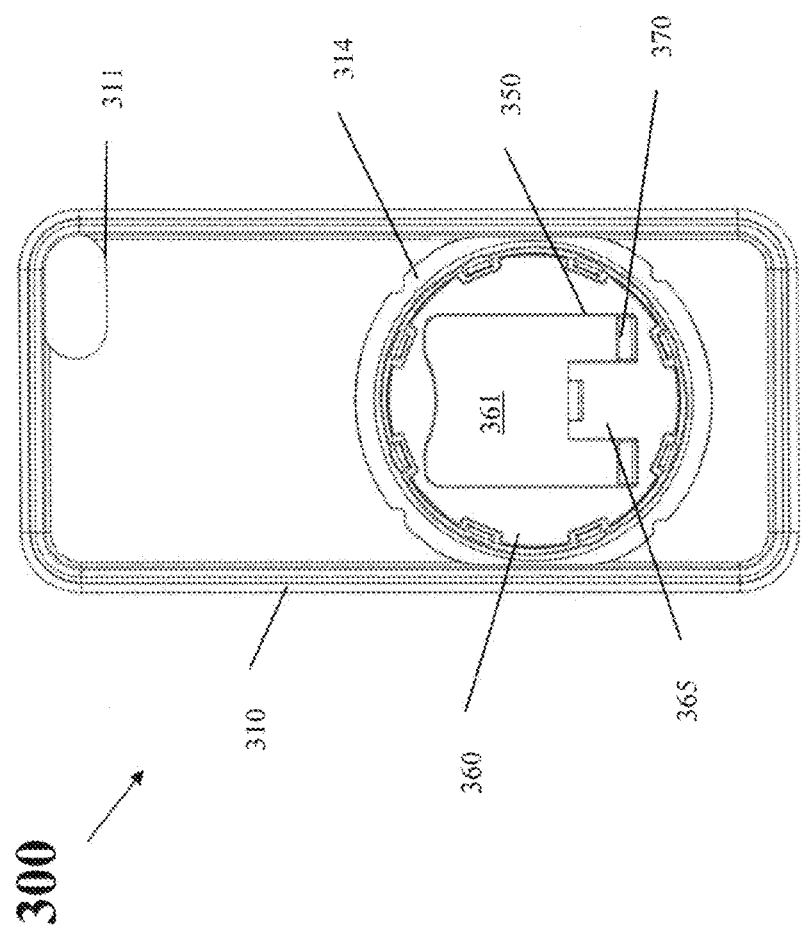
FIG. 3J is a front view of the device holder of FIG. 3A, where the movable stand of the device holder is in an extended position.
Figure 3K:
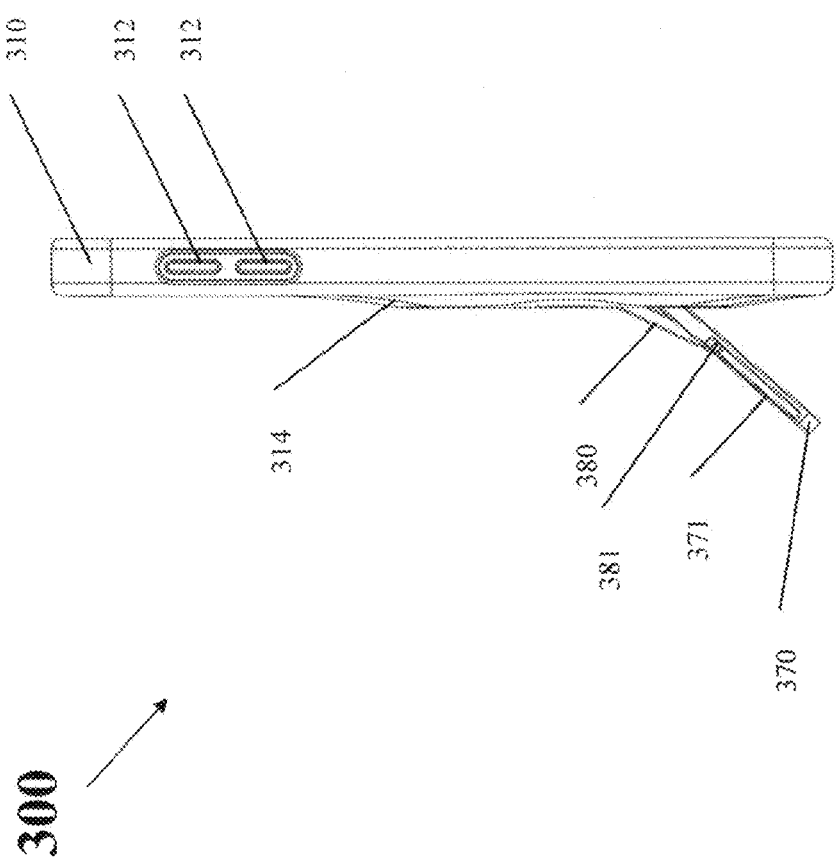
FIG. 3K is a left side view of the device holder of FIG. 3A, where the movable stand of the device holder is in an extended position.
Figure 30:
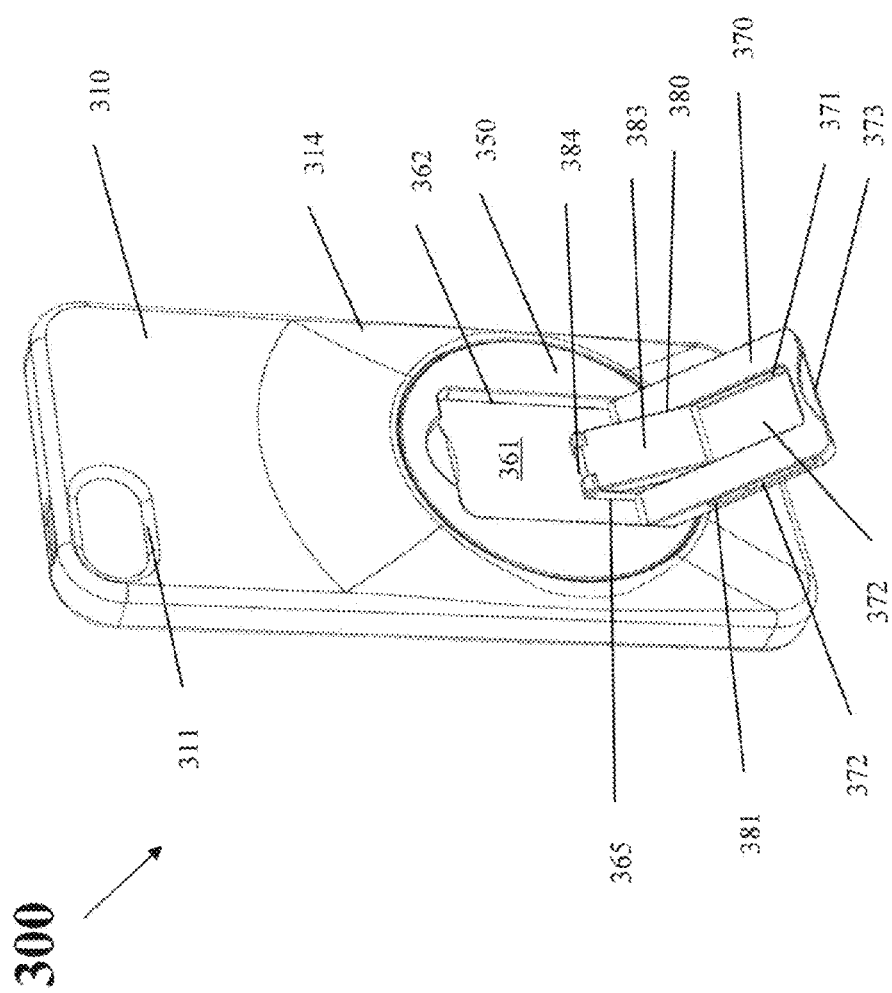

FIGS. 3A-3Q illustrate various views of an electronic device holder 300 according to another, non-limiting embodiment of the present invention. In certain views, electronic device holder 300 is illustrated without an electronic device held therein. However, electronic device holder 300 can hold the electronic device 1 shown in FIGS. 1A-1E or other electronic devices. Further, electronic device holder 300 can be sized and/or shaped, without departing from the essence, spirit, or scope of the present invention, to hold electronic devices other than the one shown in FIGS. 1A-1E.

The electronic device holder 300 illustrated in FIGS. 3A-3Q can include a body portion 310 and a base or support portion 350.

An electronic device can be removably coupled to the electronic device holder 300 by way of a front face 302 of the electronic device holder 300. More specifically, an electronic device can be inserted into the electronic device holder 300, via the front face 302, such that the edges or sides of the electronic device are completely or partially surrounded or covered by the body portion 310 (e.g., a frame portion of the body portion 310) of the electronic device holder 300 and held by friction fit and/or snap fit. Portions of the body 310 can cover or surround a front face portion of the electronic device and, optionally, such portions do not cover an access or operation portion of the electronic device, such as a touch screen, display, or keypad area of the electronic device, so a user may access or operate these portions. Optionally, body portion 310 can have access portions 312 to access or provide access to portions, buttons, etc. on the edges or sides of the electronic device. The access portions 312 can include, but are not limited to, parts with no material or holes, clear portions, preformed "buttons," or the like.

In this or other embodiments of the present invention, body portion 310 can have a portion or portions arranged on a back side of the electronic device holder 300 that are clear or cut away (i.e., removed). Notably different from the embodiment shown in FIGS. 1A-1E, body portion 310 includes a backside with only one, smaller cut-out or clear portion 311, which may provide access to an operational portion of the electronic device, such as an image or video detection or capturing portion. Of course body portion 310 can have a backside the same as or similar to the backside of body portion 110 of electronic device holder 100, with multiple clear or cut-away portions.

Body portion 310 also includes a mounting portion 314 constructed to rotatably connect to and house a base portion 360 of support portion 350, for example, as shown and illustrated in FIGS. 3A-3Q. Mounting portion 314 can have a thickness to allow stand 370 (to be discussed in more detail below) to be fully recessed within an opening 361 formed in a base portion 360 such that the stand 370 is flush or substantially flush with the top of the mounting portion 314 and the base portion 360. Optionally, the top of the mounting portion 314 may exceed in height slightly (e.g., by one millimeter in the thickness direction of the mounting portion 314) the base portion 360 and the stand 370 when the stand is fully retracted in opening 361, with the base portion 360 and the stand 370 being flush or substantially flush with each other and/or the mounting portion 314. The rotatable connection and housing of the base portion 360 by the mounting portion 314 can be based on or as set forth as described and illustrated above for electronic device holder 100.

Rotation positions of the support portion 350 around its central axis (i.e., center portion of the circle defined by the support portion 350) relative to mounting portion 314 can be undefined, and thus the support portion 350 can be rotated, clockwise and/or counterclockwise, to any orientation, including 0 degrees from any starting point, 90 degrees from the starting point, 180 degrees from the starting point, 270 degrees from the starting point, or 360 degrees or greater from the starting point, or anywhere in between. Alternatively, support portion 350 can be rotated to preset or predefined positions, such as some or all of those expressly set forth above. Optionally, portions of undefined positions and defined support portion 350 orientations can be implemented. Of course, as noted above, other rotatable orientations for the support portion 350 are also possible, such as orientations non-orthogonal or non-parallel to landscape or portrait orientations.

Figure 3P:
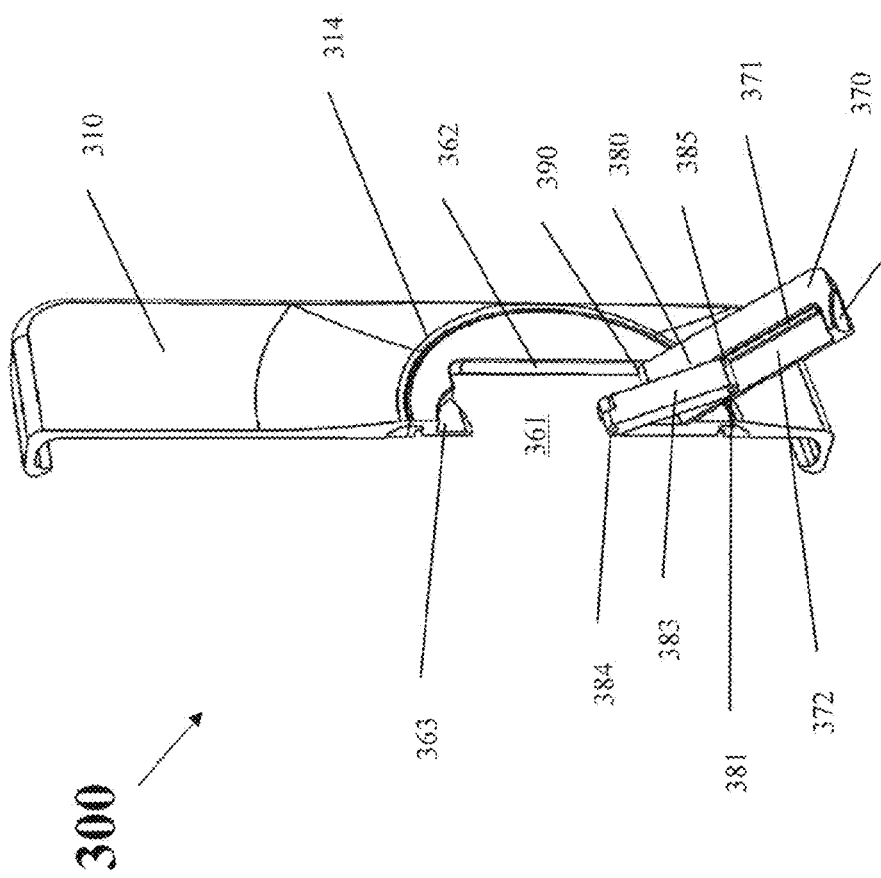
FIG. 3P is a rear cross-sectional perspective view of the device holder of FIG. 3A, where the movable stand of the device holder is in an extended position.

Support portion 350 can include a base portion 360, a stand or leg portion 370, a first coupler, coupling mechanism, or fastener 380, and a second coupler, coupling mechanism, or fastener 390 (shown in FIG. 3P) that rotatably couples the stand 370 to base portion 360 such that the stand 370 can be rotatably retracted and extended inwardly and outwardly, respectively, about a rotational axis of the second coupler 390. First coupler 380 can be rotatably coupled to a projecting portion 365 of base portion 360 such that first coupler 380 can be rotatably retracted and extended inwardly and outwardly, respectively, about a rotational axis at which the first coupler 380 is rotatably coupled to projecting portion 365. Further, first coupler 380 can be frictionally and slidably coupled to stand 370 such that the stand 370 can be fixed in a plurality of different positions, including fully extended, fully retracted, or anywhere in between. The holder 300 may be coupled to a mounting apparatus in an extended position (fully or partially) of the stand 370. Thus, an electronic device coupled to the holder 300 may be mounted, by way of the holder 300 and a corresponding mounting apparatus, to one or more of an arm, a torso or waist, a bicycle, a car, a dashboard, a stroller, or the like.

First coupler 380 can include a body 383 with a first end 384, and a second end 385. First and second ends 384, 385 can have respective metallic pins, rods, or wires running through corresponding pin holes and extending therefrom. Alternatively, first and second ends 384, 385 can have formed in one piece therewith pins or other elongate members. First end 384 can be rotatably coupled to projecting portion 365 such that the first coupler 380 can rotate about this coupling axis, and second end 385 can be coupled to respective separate elongate sleeve portions 371 of the stand 370, via a recessed portion 372 of the stand 370. Incidentally, the sleeve portions 371 are elongate in both width- and length-wise directions of the stand 370. The elongate sleeve portions 371 can be tight sleeves and can respectively act on the pin (or pins) of the second end 385 of the first coupler 380 in sliding friction fit manner, without the use of notches, grooves, or some other recessed or protruding members, for example, such that the second end 385 and thus the stand 370 can be held or fixed in any of a plurality of positions, for example, from a fully extended position of the stand 370 to anywhere in between the fully extended position and a fully retracted position of the stand 370. Thus, second end 385 can move from one end of the sleeve portions 371 to the other end of sleeve portions 371 (in a length-wise direction of the stand 370) such that the stand 370 can be frictionally held in a fully retracted position, a fully extended position, or any position between the fully extended position and the fully retracted position. Put another way, other than the fully extended position and the fully retracted position, one or more embodiments of the present invention do not include predetermined or predefined set positions to which the stand 370 can be extended or retracted, because the sleeve portions 371 may not include notches, grooves, or some other recessed or protruding members. When the stand 370 is fully retracted (i.e., fully seated in opening 361), no portion of the first coupler 380 is exposed to view from a back side of the electronic device holder 300.

Optionally, the interior of the sleeve portions 371 may taper in one or both directions (in a length-wise direction of the stand 370) such that the friction force applied to respective ends of the second rod portion 285 varies. Alternatively, notches, grooves, some other recessed or protruding members, or the like may be implemented in the sleeve portions 371 to hold the stand 370 in particular, predefined or predetermined positions.

Second coupler 390, as noted above, can rotatably couple the stand 370 to base portion 360 such that the stand 370 can be rotatably retracted and extended inwardly and outwardly, respectively, from and between the fully retracted and extended positions, about a rotational axis of the second coupler 390. In one or more embodiments, second coupler 390 is a straight pin, rod, or wire that extends through a pin hole from one side of the stand 370 to the other side (in a width-wise direction of the stand 370), with ends of the pin 390 being rotatably coupled to respective retaining mechanisms (e.g., respective pin holes) in the inner sides 362 of base portion 360. Alternatively, the second coupler 390 can include individual pins or projections from the stand 370 that are rotatably coupled to respective retaining mechanisms (e.g., respective pin or projection holes) in the inner sides 362 of base portion 360. Optionally, the projections to be rotatably coupled to respective retaining mechanisms (e.g., projection holes) in the inner sides 362 of base portion 360 may be formed in one piece with the stand 370, of the same material as the stand 370 and in a same manufacturing process as the stand 370 (e.g., injection molding).

Stand 370 and base portion 360 may optionally include recess portions 373, 363, respectively, that can facilitate seating of the stand 370 in opening 361 and/or rotatable extension of the stand 370 from its fully retracted position to an extended position, for example, by a user finger, thumb, or some other object that fits within the recess portions to pry or lift up the stand 370 from opening 361. Optionally, in one or more embodiments, stand 370 may include a grip portion or handle that a user may grab or grip to pull out the stand 370 from its fully retracted position and/or to move the stand 370 to other positions, including back to the fully retracted position, seated within opening 361.

Body portion 310 and support portion 350 can be made of the same material, for example, thermoplastic or rubber, or alternatively some portions of may be made of different materials. Further, body portion 310 and support portion 350 (and respective components thereof) can be formed by molded, for example, injection molding. Thus, electronic device holder 300 according to embodiments of the present invention may be comprised of only three or four separate plastic or rubber parts, for example, the body portion 310, the base portion 360, the stand 370, and the first coupler 380 in the case of four plastic or rubber parts.

Figure 4C:
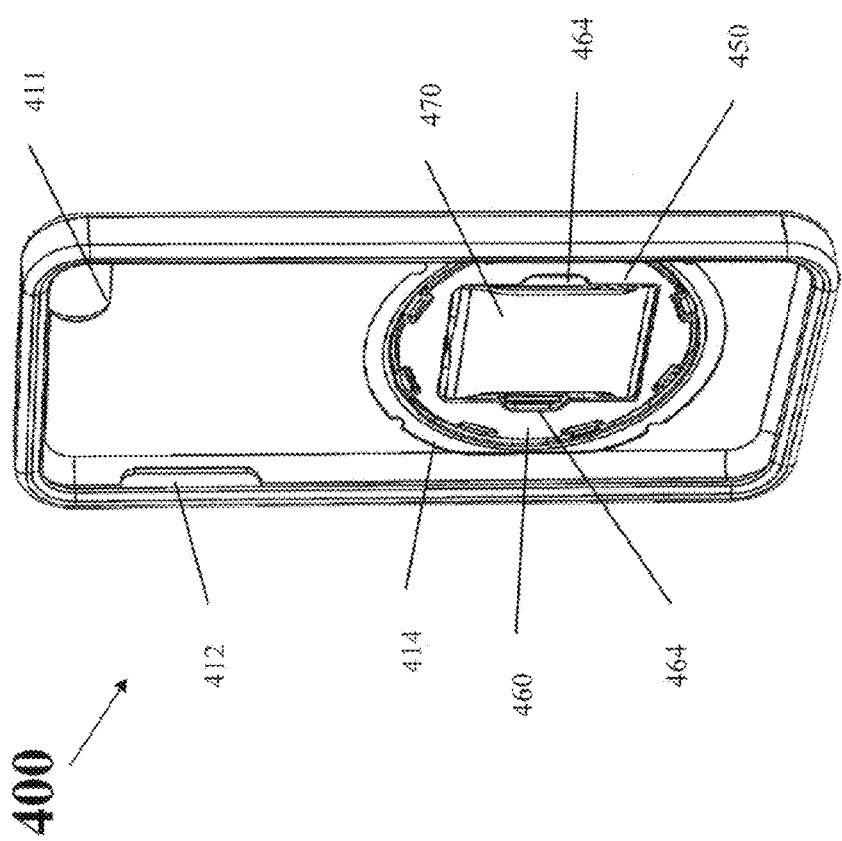
FIG. 4C is a front right perspective view of the device holder of FIG. 4A, where the movable stand of the device holder is in a retracted position.
Figures 4F, 4G:
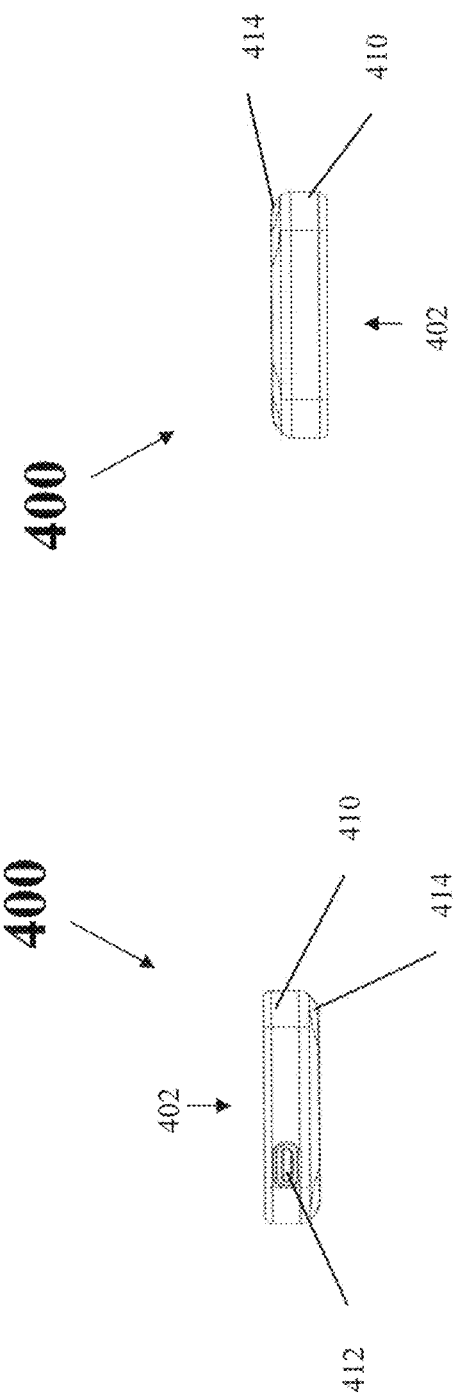
FIG. 4F is a first end view of the device holder of FIG. 4A, where the movable stand of the device holder is in a retracted position.
FIG. 4G is a second end view (rotated 180 degrees from FIG. 4F) of the device holder of FIG. 4A, where the movable stand of the device holder is in a retracted position.
Figure 4H:
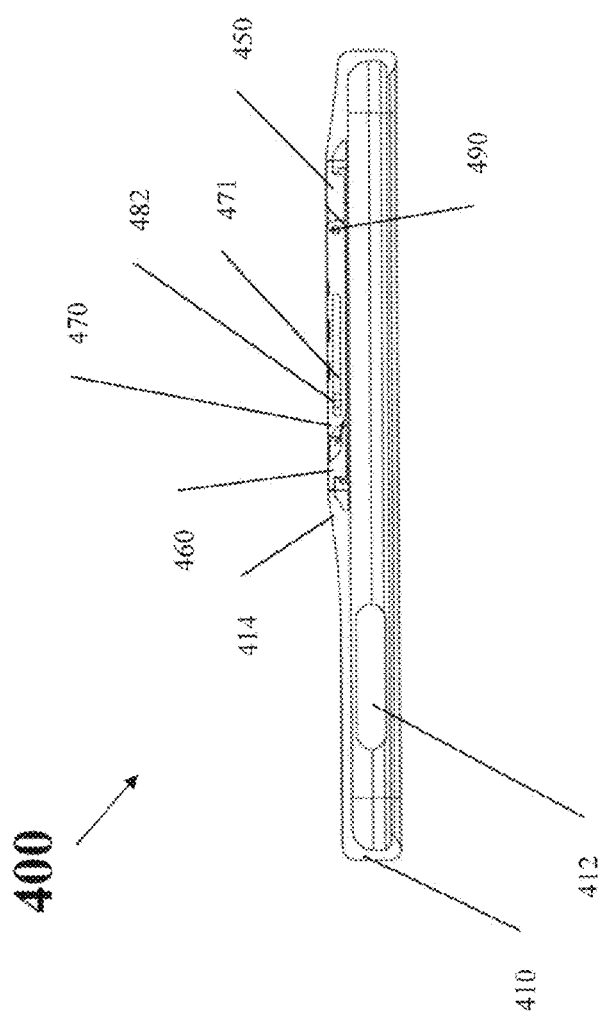
FIG. 4H is a cross-sectional view of the device holder of FIG. 4A with the movable stand in a fully retracted position.
Figure 41:
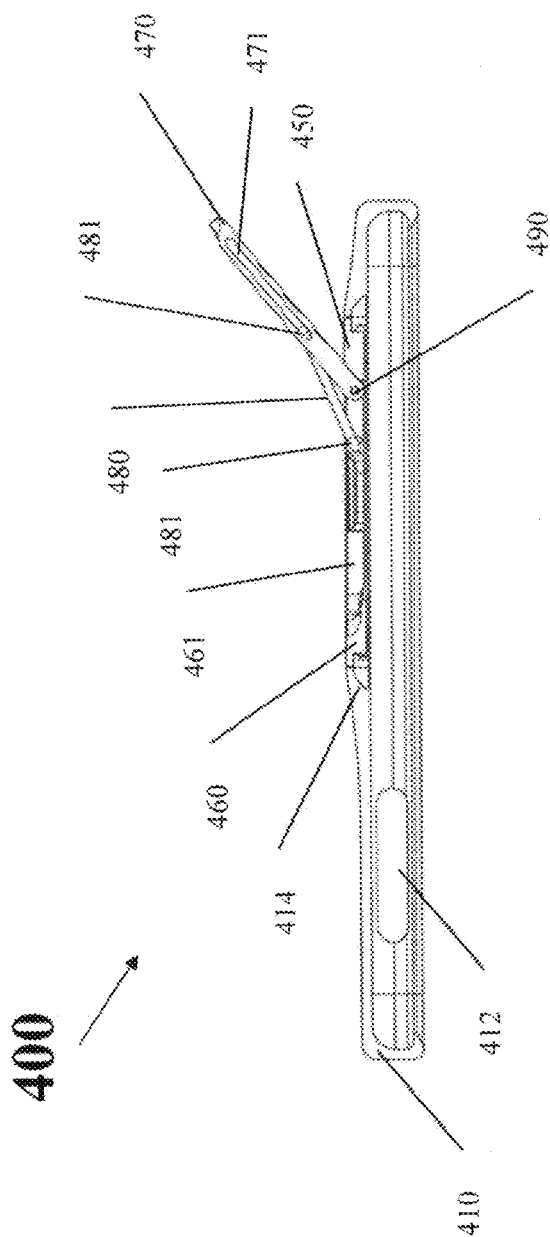
Figure 4L:
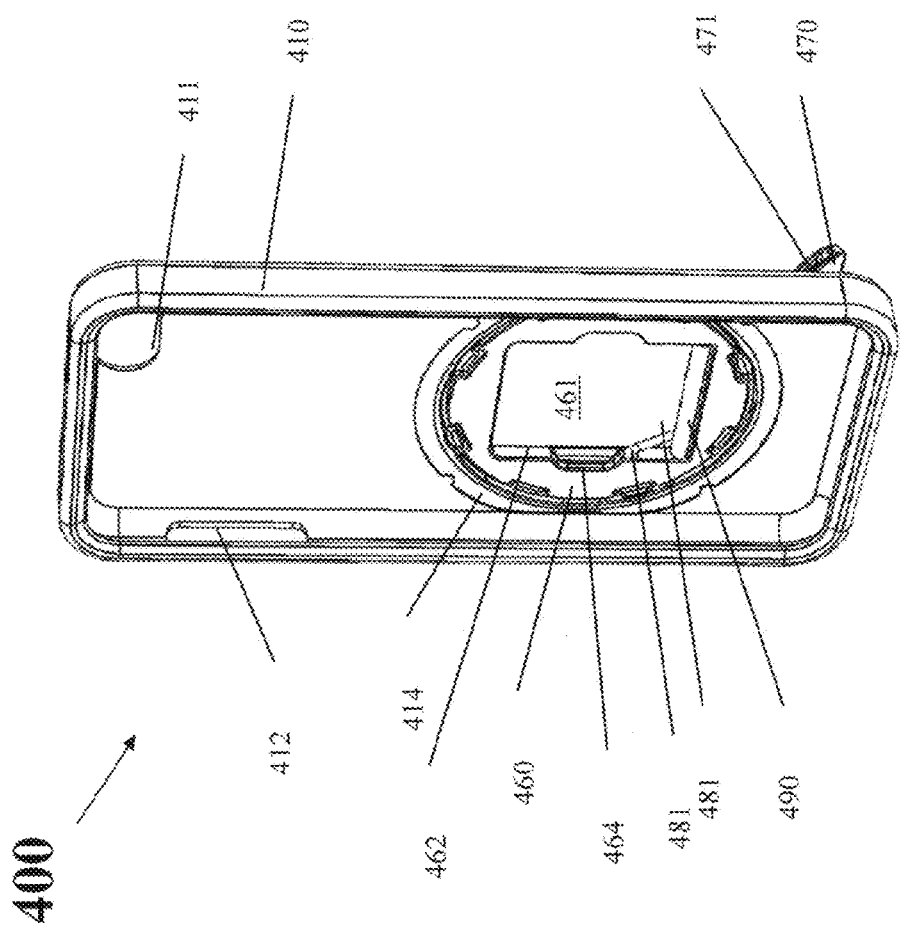
FIG. 4L is a front right perspective view of the device holder of FIG. 4A, where the movable stand of the device holder is in an position.
Figure 4N:
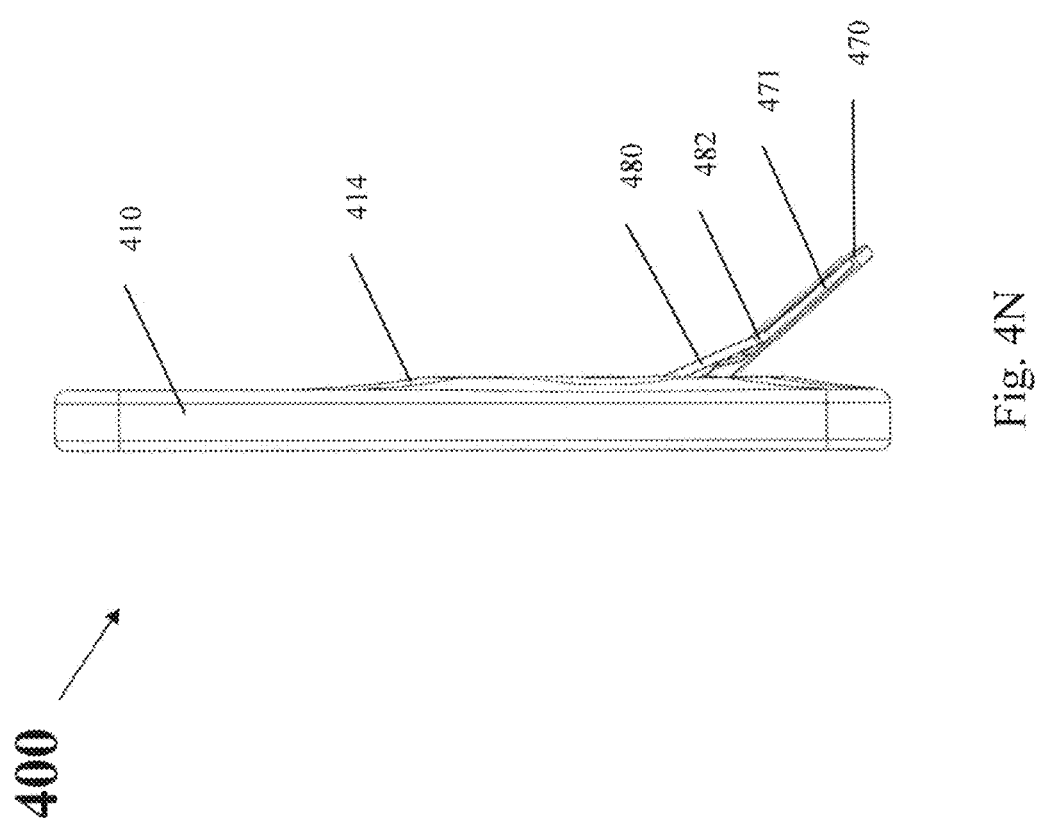
FIG. 4N is a right side view of the device holder of FIG. 4A, where the movable stand of the device holder is in an extended position.
Figure 4Q:
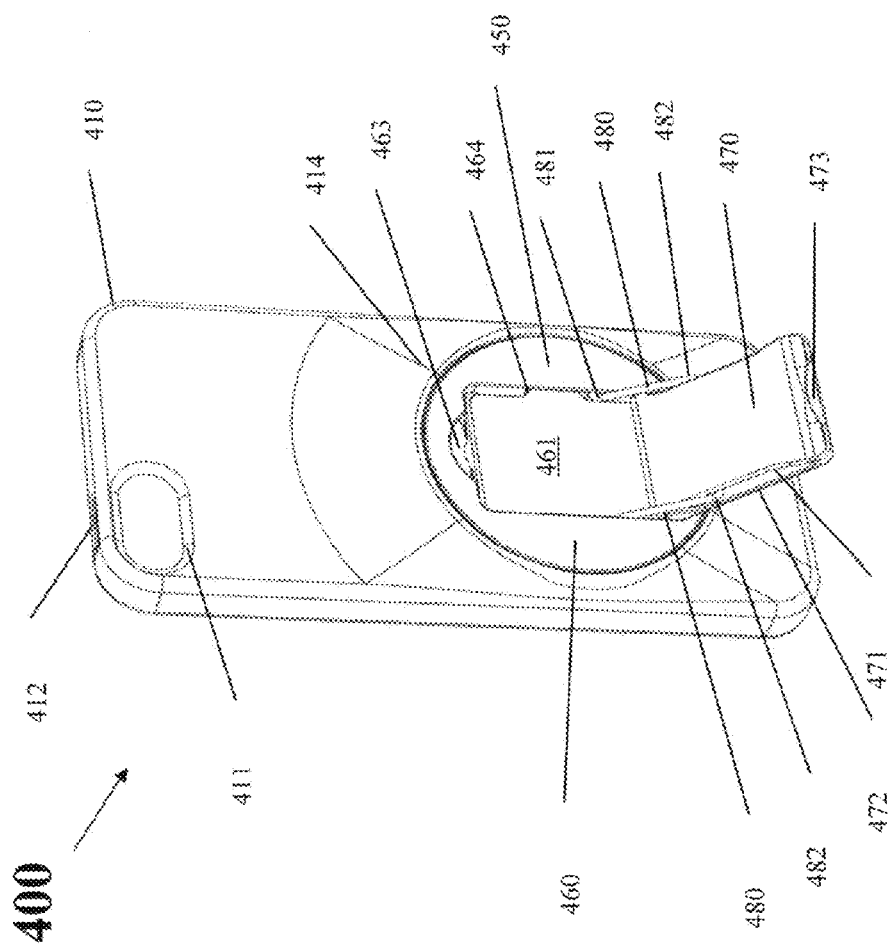
FIG. 4Q is a rear perspective view of the device holder of FIG. 4A, where the movable stand of the device holder is in an extended position.
Figure 4R:
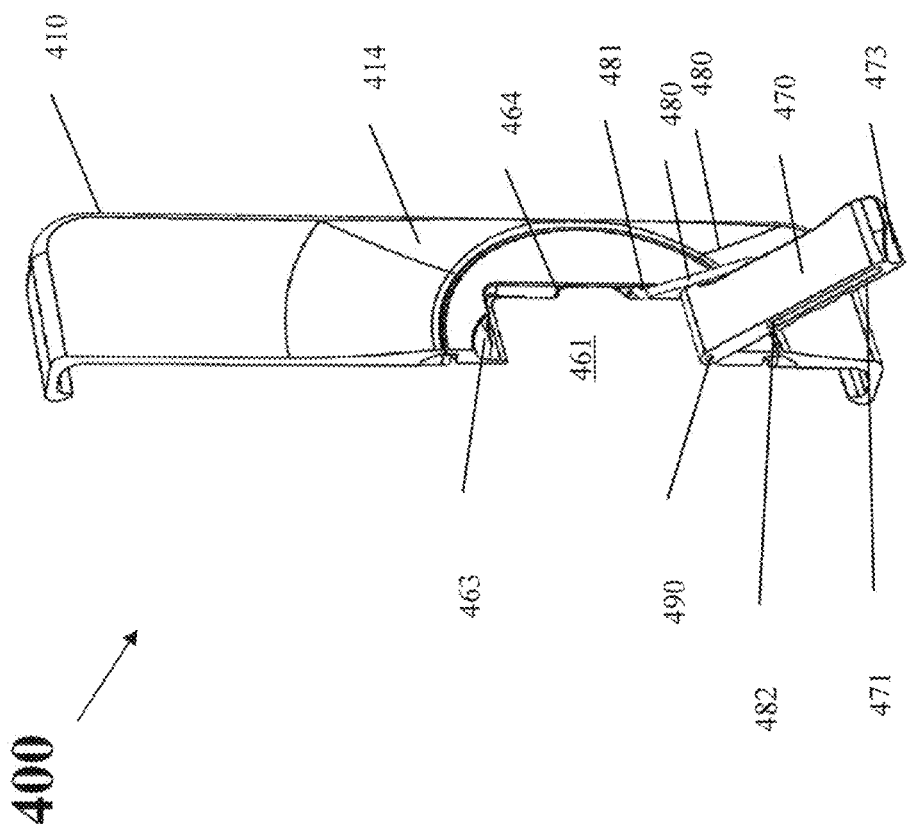
FIG. 4R is a rear cross-sectional perspective view of the device holder of FIG. 4A, where the movable stand of the device holder is in an extended position.
Figure 4S:
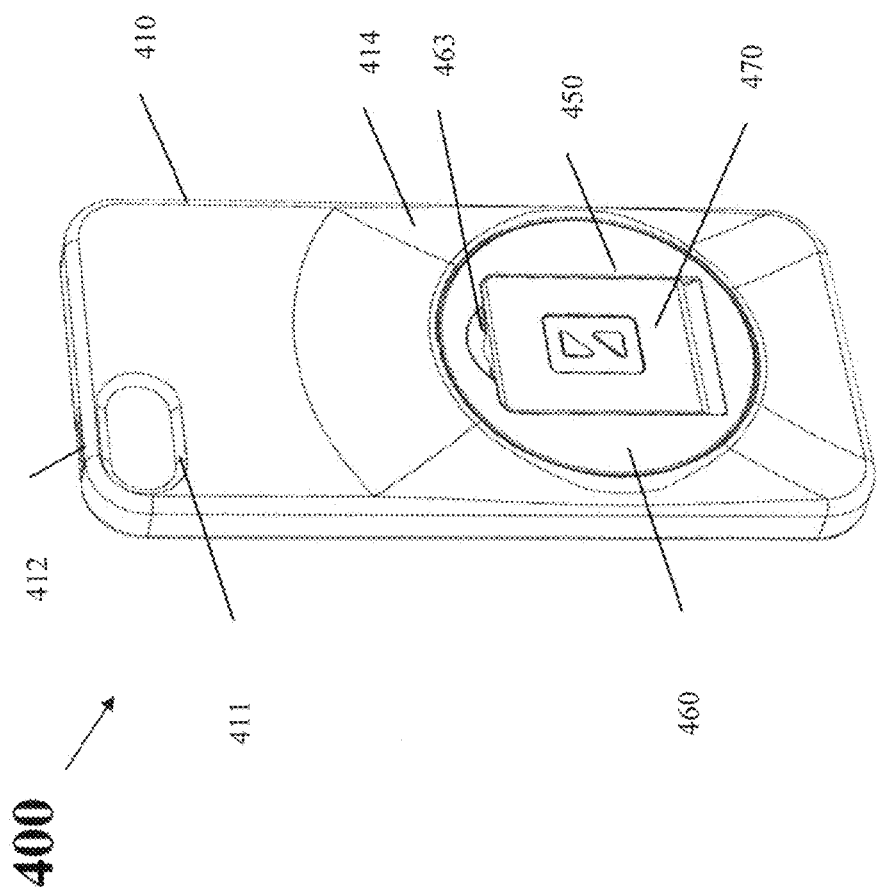
FIG. 4S is a rear perspective view of the device holder of FIG. 4A, where the movable stand of the device holder is in a retracted position.

FIGS. 4A-4S illustrate various views of an electronic device holder 400 according to another, non-limiting embodiment of the present invention. In certain views, electronic device holder 400 is illustrated without an electronic device held therein. However, electronic device holder 400 can hold the electronic device 1 shown in FIGS. 1A-1E or other electronic devices. Further, electronic device holder 400 can be sized and/or shaped, without departing from the essence, spirit, or scope of the present invention, to hold electronic devices other than the one shown in FIGS. 1A-1E.

The electronic device holder 400 illustrated in FIGS. 4A-4S can include a body portion 410 and a base or support portion 450.

An electronic device can be removably coupled to the electronic device holder 400 by way of a front face 402 of the electronic device holder 400. More specifically, an electronic device can be inserted into the electronic device holder 400, via the front face 402, such that the edges or sides of the electronic device are completely or partially surrounded or covered by the body portion 410 (e.g., a frame portion of the body portion 410) of the electronic device holder 400 and held by friction fit and/or snap fit. Portions of the body 410 can cover or surround a front face portion of the electronic device and, optionally, such portions do not cover an access or operation portion of the electronic device, such as a touch screen, display, or keypad area of the electronic device, so a user may access or operate these portions. Optionally, body portion 410 can have access portions 412 to access or provide access to portions, buttons, etc. on the edges or sides of the electronic device. The access portions 412 can include, but are not limited to, parts with no material or holes, clear portions, preformed "buttons," or the like.

In this or other embodiments of the present invention, body portion 410 can have a portion or portions arranged on a back side of the electronic device holder 400 that are clear or cut away (i.e., removed). Different from the embodiment shown in FIGS. 1A-1E, body portion 410 includes a backside with only one, relatively smaller cut-out or clear portion 411, which may provide access to an operational portion of the electronic device, such as an image or video detection or capturing portion. Of course body portion 410 can have a backside the same as or similar to the backside of body portion 110 of electronic device holder 100, with multiple clear or cut-away portions.

Body portion 410 also includes a mounting portion 414 constructed to rotatably connect to and house a base portion 460 of support portion 450, for example, as shown and illustrated in FIGS. 4A-4S. Mounting portion 414 can have a thickness to allow stand 470 (to be discussed in more detail below) to be fully recessed within an opening 461 formed in a base portion 460 such that the stand 470 is flush or substantially flush with the top of the mounting portion 414 and the base portion 460. Optionally, the top of the mounting portion 414 may exceed in height slightly (e.g., by one millimeter in the thickness direction of the mounting portion 414) the base portion 460 and the stand 470 when the stand is fully retracted in opening 461, with the base portion 460 and the stand 470 being flush or substantially flush. The rotatable connection and housing of the base portion 460 by the mounting portion 414 can be based on or as set forth as described and illustrated above for electronic device holder 100.

Rotation positions of the support portion 450 around its central axis (i.e., center portion of the circle defined by the support portion 450) relative to mounting portion 414 can be undefined, and thus the support portion 450 can be rotated, clockwise and/or counterclockwise, to a plurality of orientations, including 0 degrees from any starting point, 90 degrees from the starting point, 180 degrees from the starting point, 270 degrees from the starting point, 360 degrees or greater from the starting point, or anywhere in between. Alternatively, support portion 450 can be rotated to preset or predefined positions, such as some or all of those expressly set forth above. Optionally, portions of undefined positions and defined support portion 450 orientations can be implemented. Of course, as noted above, other rotatable orientations for the support portion 450 are also possible, such as orientations non-orthogonal or non-parallel to landscape or portrait orientations.

Support portion 450 can include a base portion 460, a stand or leg portion 470, a first coupler, coupling mechanism, or fastener 480, and a second coupler, coupling mechanism, or fastener 490 (expressly shown in FIGS. 4H, 4I, and 4R) that rotatably couples the stand 470 to base portion 460 such that the stand 470 can be rotatably retracted and extended inwardly and outwardly, respectively, about a rotational axis of the second coupler 490. First coupler 480 can be rotatably coupled to base portion 460 such that first coupler 480 can be rotatably retracted and extended inwardly and outwardly, respectively, about a rotational axis at which the first coupler 480 is rotatably coupled to base portion 460. Further, first coupler 480 can be frictionally and slidably coupled to stand 470 such that the stand 470 can be fixed in a plurality of different positions, including fully extended, fully retracted, or anywhere in between. Base portion 460 can also include notches 464 on opposite sides of the stand 470. Notches 464 can be used with a corresponding coupling member of a mounting apparatus, such as illustrated below in relation to FIGS. 6A-6U. Thus, as noted above, an electronic device may be mounted, by way of the holder 400 and corresponding mounting apparatus, to one or more of an arm, a torso or waist, a bicycle, a car, a dashboard, a stroller, or the like.

First coupler 480 can be a U-shaped or generally U-shaped pin or wire (e.g., metallic) having ends 481, for example bent ends, that can be coupled to respective inner sides 462 of base portion 460 such that the pin 480 can rotate about an axis running between the two points at which the ends 481 are coupled to respective retaining mechanisms of inner sides 462 of base portion 460. For example, ends 481 may be rotatably coupled to the inner sides 462 of base portion 460 via respective holes (not expressly shown). Optionally, the ends 481 may be removably coupled to the respective holes in the inner sides 462 of base portion, for example, by forcing the ends 481 inwardly toward each other such that they become free of their respective retaining mechanisms (e.g., the respective holes).

A middle portion 482 of the pin 480 can extend through an elongate sleeve 471 formed in stand 470, from one side of the stand 470 to another side of the stand 470. The sleeve 471 is elongate in both width- and length-wise directions of the stand 470. The elongate sleeve 471 can be a tight sleeve and can act on the middle portion 482 of pin 480 in a sliding friction fit manner, without the use of notches, grooves, or some other recessed or protruding members, for example, such that the pin 480 and thus the stand 470 can be held or fixed in any of a plurality of positions, for example, from a fully extended position of the stand 470 to anywhere in between the fully extended position and a fully retracted position of the stand 470. Thus, middle portion 482 of pin 480 can move from one end of the sleeve 471 to the other end of sleeve 471 (in a length-wise direction of the stand 470) such that the stand 470 can be frictionally held in a fully retracted position, a fully extended position, or an any position between the fully extended position and the fully retracted position. Put another way, other than the fully extended position and the fully retracted position, one or more embodiments of the present invention do not include predetermined or predefined set positions to which the stand 470 can be extended or retracted, because the sleeve 471 may not include notches, grooves, or some other recessed or protruding members. When the stand 470 is fully retracted (i.e., fully seated in opening 461), the pin 480 is not exposed to view from a back side of the electronic device holder 400 and is hidden beneath ledges 472 of stand 470. Optionally, the interior of the sleeve 471 may taper in one or both directions (in a length-wise direction of the stand 470) such that the friction force applied to the middle portion 482 of pin 480 varies. Alternatively, notches, grooves, some other recessed or protruding members, or the like may be implemented to hold the stand 470 in particular, predefined or predetermined positions.

The middle portion 482 of pin 480 can run in a straight line from one side of the stand 470 to the other side of the stand 470 parallel to a width-wise direction of the stand 470, hence the aforementioned U-shape nomenclature. However, the middle portion 482 is not limited to such a configuration and may take other forms, such as a zig-zag, on-off pattern, sinusoidal, or arced in the width-wise and/or thickness direction of the stand 470 or sleeve 471.

Second coupler 490, as noted above, can rotatably couple the stand 470 to base portion 460 such that the stand 470 can be rotatably retracted and extended inwardly and outwardly, respectively, from and between the fully retracted and extended positions, about a rotational axis of the second coupler 490. In one or more embodiments, second coupler 490 is a straight pin or wire that extends through a pin hole from one side of the stand 470 to the other side (in a width-wise direction of the stand 470), with ends of the pin 490 being rotatably coupled to respective retaining mechanisms (e.g., respective pin holes) in the inner sides 462 of base portion 460. Alternatively, the second coupler 490 can include individual pins or projections from the stand 470 that are rotatably coupled to respective retaining mechanisms (e.g., respective pin or projection holes) in the inner sides 462 of base portion 460. Optionally, the projections to be rotatably coupled to respective retaining mechanisms (e.g., projection holes) in the inner sides 462 of base portion 460 may be formed in one piece with the stand 470, of the same material as the stand 470 and in a same manufacturing process as the stand 470 (e.g., injection molding).

Stand 470 and base portion 460 include recess portions 473, 463, respectively, that can facilitate seating of the stand 470 in opening 461 and/or rotatable extension of the stand 470 from its fully retracted position to an extended position, for example, by a user finger, thumb, or some other object that fits within the recess portions to pry or lift up the stand 470 from opening 461. Optionally, in one or more embodiments, stand 470 may include a grip portion or handle that a user may grab or grip to pull out the stand 470 from its fully retracted position and/or to move the stand 470 to other positions, including back to the fully retracted position, seated within opening 461.

Body portion 410 and support portion 450 can be made of the same material, for example, thermoplastic or rubber, or alternatively some portions of may be made of different materials. Further, body portion 410 and support portion 450 (and respective components thereof) can be formed by molded, for example, injection molding. Thus, electronic device holders 400 according to embodiments of the present invention may be comprised of only two or three separate plastic or rubber parts, for example, the body portion 410, the base portion 460, and the stand 470 in the case of three plastic or rubber parts.

Figure 5G:
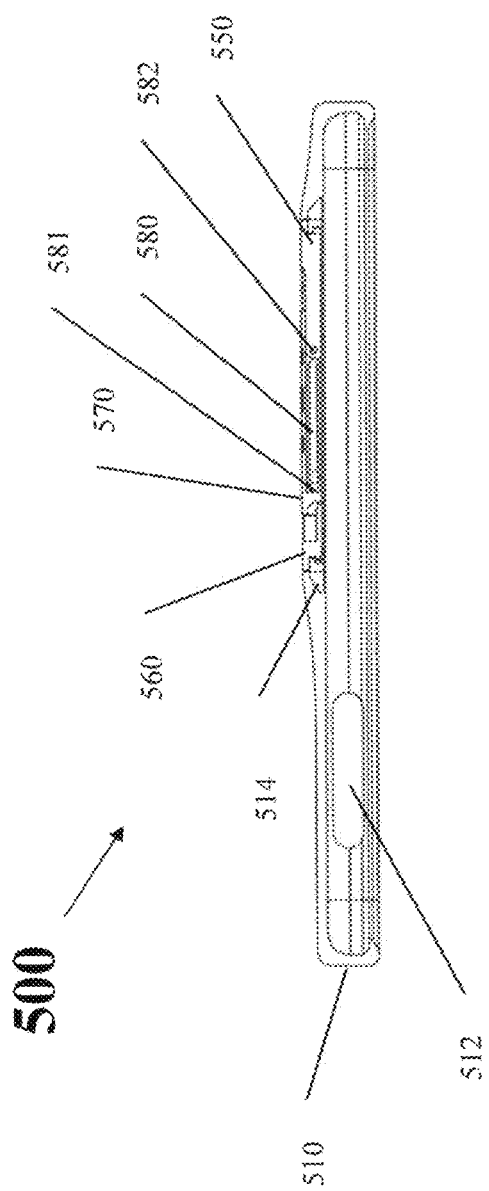
FIG. 5G is a cross-sectional view of the device holder of FIG. 5A with the movable stand in a fully retracted position.
Figure 5H:
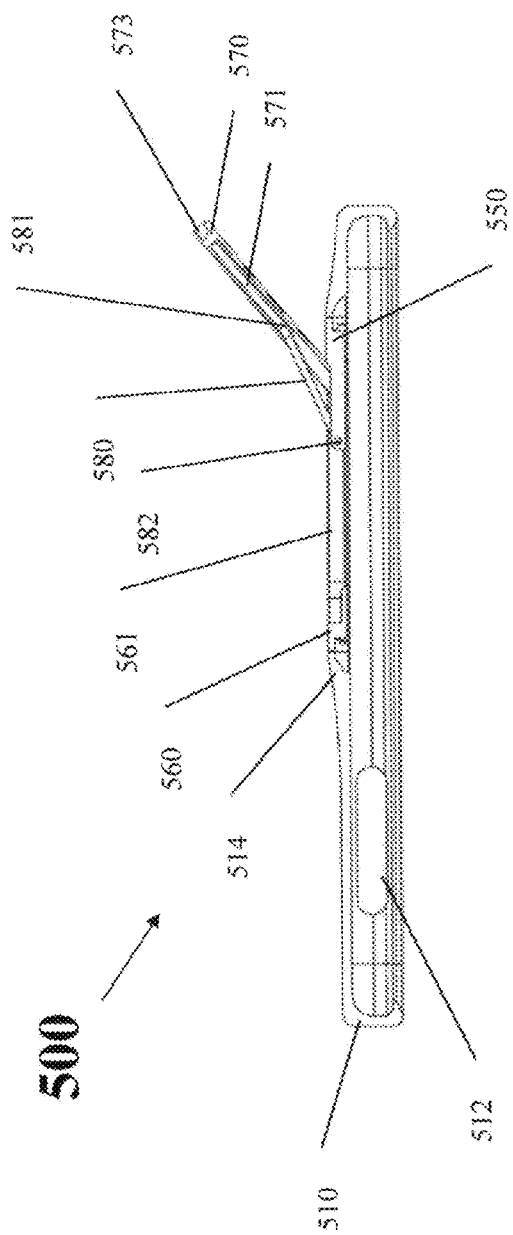
FIG. 5H is a cross-sectional view of the device holder of FIG. 5A with the movable stand in an extended position.
Figure 5Q:
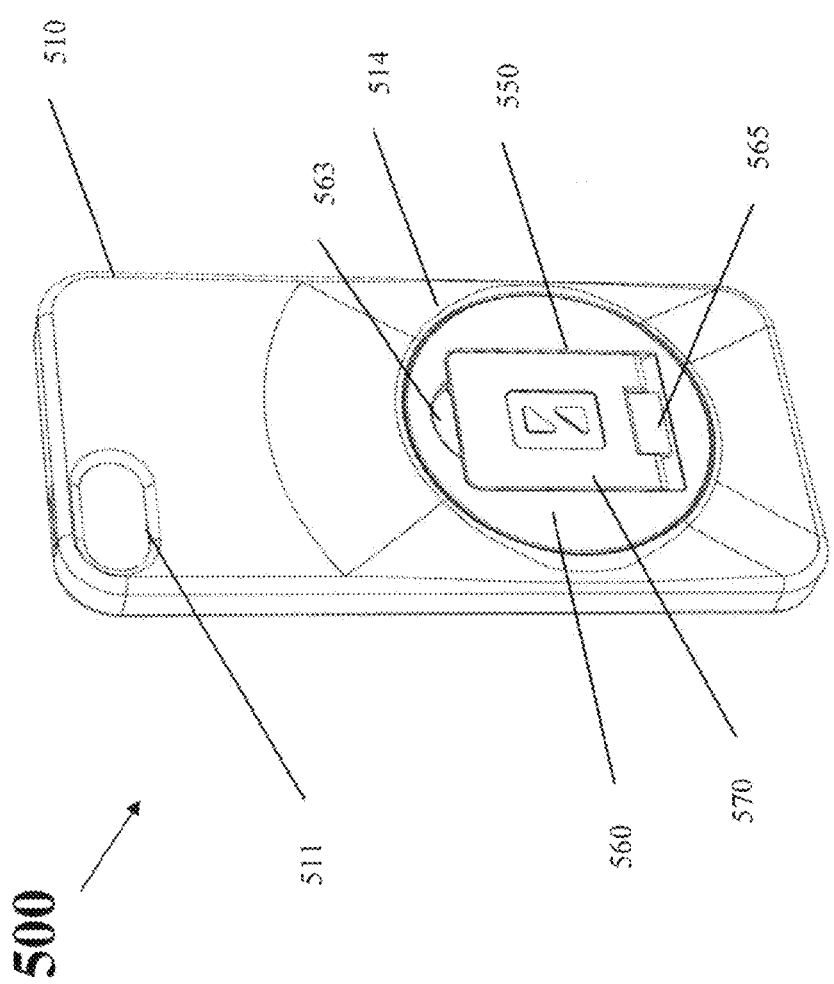
FIG. 5Q is a rear perspective view of the device holder of FIG. 5A, where the movable stand of the device holder is in a retracted position.

FIGS. 5A-5Q illustrate various views of an electronic device holder 500 according to another, non-limiting embodiment of the present invention. In certain views, electronic device holder 500 is illustrated without an electronic device held therein. However, electronic device holder 500 can hold the electronic device 1 shown in FIGS. 1A-1E or other electronic devices. Further, electronic device holder 500 can be sized and/or shaped, without departing from the essence, spirit, or scope of the present invention, to hold electronic devices other than the one shown in FIGS. 1A-1E.

The electronic device holder 500 illustrated in FIGS. 5A-5Q can include a body portion 510 and a base or support portion 550.

An electronic device can be removably coupled to the electronic device holder 500 by way of a front face 502 of the electronic device holder 500. More specifically, an electronic device can be inserted into the electronic device holder 500, via the front face 502, such that the edges or sides of the electronic device are completely or partially surrounded or covered by the body portion 510 (e.g., a frame portion of the body portion 510) of the electronic device holder 500 and held by friction fit and/or snap fit. Portions of the body 510 can cover or surround a front face portion of the electronic device and, optionally, such portions do not cover an access or operation portion of the electronic device, such as a touch screen, display, or keypad area of the electronic device, so a user may access or operate these portions. Optionally, body portion 510 can have access portions 512 to access or provide access to portions, buttons, etc. on the edges or sides of the electronic device. The access portions 512 can include, but are not limited to, parts with no material or holes, clear portions, preformed "buttons," or the like.

In this or other embodiments of the present invention, body portion 510 can have a portion or portions arranged on a back side of the electronic device holder 500 that are clear or cut away (i.e., removed). Body portion 510 includes a backside with only one, relatively small cut-out or clear portion 511, which may provide access to an operational portion of the electronic device, such as an image or video detection or capturing portion. Of course body portion 510 can have a backside the same as or similar to the backside of body portion 110 of electronic device holder 100, with multiple clear or cut-away portions.

Body portion 510 also includes a mounting portion 514 constructed to rotatably connect to and house a base portion 560 of support portion 550, for example, as shown and illustrated in FIGS. 5A-5Q. Mounting portion 514 can have a thickness to allow stand 570 to be fully recessed within an opening 561 formed in a base portion 560 such that the stand 570 is flush or substantially flush with the top of the mounting portion 514 and the base portion 560. Optionally, the top of the mounting portion 514 may exceed in height slightly (e.g., 1 mm or less in a thickness direction) the base portion 560 and the stand 570 when the stand is fully retracted in opening 561, with the base portion 560 and the stand 570 being flush or substantially flush. The rotatable connection and housing of the base portion 560 by the mounting portion 514 can be based on or as set forth as described and illustrated above for electronic device holder 100. The holder 500 may be coupled to a mounting apparatus in an extended position (fully or partially) of the stand 570. Thus, an electronic device coupled to the holder 500 may be mounted, by way of the holder 500 and a corresponding mounting apparatus, to one or more of an arm, a torso or waist, a bicycle, a car, a dashboard, a stroller, or the like.

Rotation positions of the support portion 550 around its central axis (i.e., center portion of the circle defined by the support portion 550) relative to mounting portion 514 can be undefined, and thus the support portion 550 can be rotated, clockwise and/or counterclockwise, to any orientation, including 0 degrees from any starting point, 90 degrees from the starting point, 180 degrees from the starting point, 270 degrees from the starting point, 360 degrees or greater from the starting point, or anywhere in between. Alternatively, support portion 550 can be rotated to preset or predefined positions, such as some or all of those expressly set forth above. Optionally, portions of undefined positions and defined support portion 550 orientations can be implemented. Of course, as noted above, other rotatable orientations for the support portion 550 are also possible, such as orientations non-orthogonal or non-parallel to landscape or portrait orientations.

Support portion 550 can include a base portion 560, a stand or leg portion 570, a first coupler, coupling mechanism, or fastener 580, and a second coupler, coupling mechanism, or fastener 590 (shown in FIG. 5P) that rotatably couples the stand 570 to base portion 560 such that the stand 570 can be rotatably retracted and extended inwardly and outwardly, respectively, about a rotational axis of the second coupler 590. First coupler 580 can be rotatably coupled to a projecting portion 565 of base portion 560 such that first coupler 580 can be rotatably retracted and extended inwardly and outwardly, respectively, about a rotational axis at which the first coupler 580 is rotatably coupled to projecting portion 565. Further, first coupler 580 can be frictionally and slidably coupled to stand 570 such that the stand 570 can be fixed in a plurality of different positions, including fully extended, fully retracted, or anywhere in between.

First coupler 580 can be a U-shaped or generally U-shaped pin or wire (e.g., metallic) having a middle portion 582 of the pin 580 that can extend through a corresponding pin hole of the projecting portion 565 such that the pin 580 can rotate around the axis formed by the pin hole of the projecting portion 565. Pin 580 may have ends 581, for example bent ends, that can extend into respective separate elongate sleeve portions 571 of the stand 570, via a recessed portion 572 of the stand 570. The sleeve portions 571 can be elongate in both width- and length-wise directions of the stand 570. The elongate sleeve portions 571 can be tight sleeves and can respectively act on the pin ends 581 of the first coupler 580 in sliding friction fit manner, without the use of notches, grooves, or some other recessed or protruding members, for example, such that the pin ends 581 and thus the stand 570 can be held or fixed in any of a plurality of positions, for example, from a fully extended position of the stand 570 to anywhere in between the fully extended position and a fully retracted position of the stand 570. Thus, the pin ends 581 of the first coupler 580 can move from one end of the sleeve portions 571 to the other end of sleeve portions 571 (in a length-wise direction of the stand 570) such that the stand 570 can be frictionally held in a fully retracted position, a fully extended position, or any position between the fully extended position and the fully retracted position. Put another way, other than the fully extended position and the fully retracted position, one or more embodiments of the present invention do not include predetermined or predefined set positions to which the stand 570 can be extended or retracted, because the sleeve portions 571 may not include notches, grooves, or some other recessed or protruding members. When the stand 570 is fully retracted (i.e., fully seated in opening 561), no portion of the first coupler 580 is exposed to view from a back side of the electronic device holder 500. Optionally, the ends 581 may be removably coupled to the respective sleeve portions 571, for example, by forcing the ends 581 toward each other such that they become free of their respective retaining mechanisms (i.e., the respective sleeve portions 571). Alternatively, notches, grooves, some other recessed or protruding members, or the like may be implemented to hold the stand 570 in particular, predefined or predetermined positions.

Optionally, the interior of the sleeve portions 571 may taper in one or both directions (in a length-wise direction of the stand 570) such that the friction force applied to respective ends 581 varies. Alternatively, notches, grooves, some other recessed or protruding members, or the like may be implemented in the sleeve portions 571 to hold the stand 570 in particular, predefined or predetermined positions.

Stand 570 and base portion 560 may optionally include recess portions 573, 563, respectively, that can facilitate seating of the stand 570 in opening 561 and/or rotatable extension of the stand 570 from its fully retracted position to an extended position, for example, by a user finger, thumb, or some other object that fits within the recess portions to pry or lift up the stand 570 from opening 561. Optionally, in one or more embodiments, stand 570 may include a grip portion or handle that a user may grab or grip to pull out the stand 570 from its fully retracted position and/or to move the stand 570 to other positions, including back to the fully retracted position, seated within opening 561.

Body portion 510 and support portion 550 can be made of the same material, for example, thermoplastic or rubber, or alternatively some portions of may be made of different materials. Further, body portion 510 and support portion 550 (and respective components thereof) can be formed by molded, for example, injection molding. Thus, electronic device holder 500 according to embodiments of the present invention may be comprised of only two or three separate plastic or rubber parts, for example, the body portion 510, the base portion 560, and the stand 570, in the case of three plastic or rubber parts.

Embodiments of the electronic device holders according to the present invention, such as holders 100, 200, 300, 400, and 500 discussed above, can provide cost and/or reliability advantages over other holders. For example, embodiments of the present invention can achieve relative reduction in part counts (e.g., plastic, rubber, and or metallic parts), assembly time, assembly time complexity, and part durability. For instance, electronic device holder 400 illustrated in FIGS. 4A-4S can require half of the number of parts and/or half the number of labor required to manufacture and assemble the holder as compared to other holders. Durability is also improved over other holders, for example, because of increased surface area and/or flexibility of slots/slot portions 171, 271, 371, 471, 571.

Figure 6A:
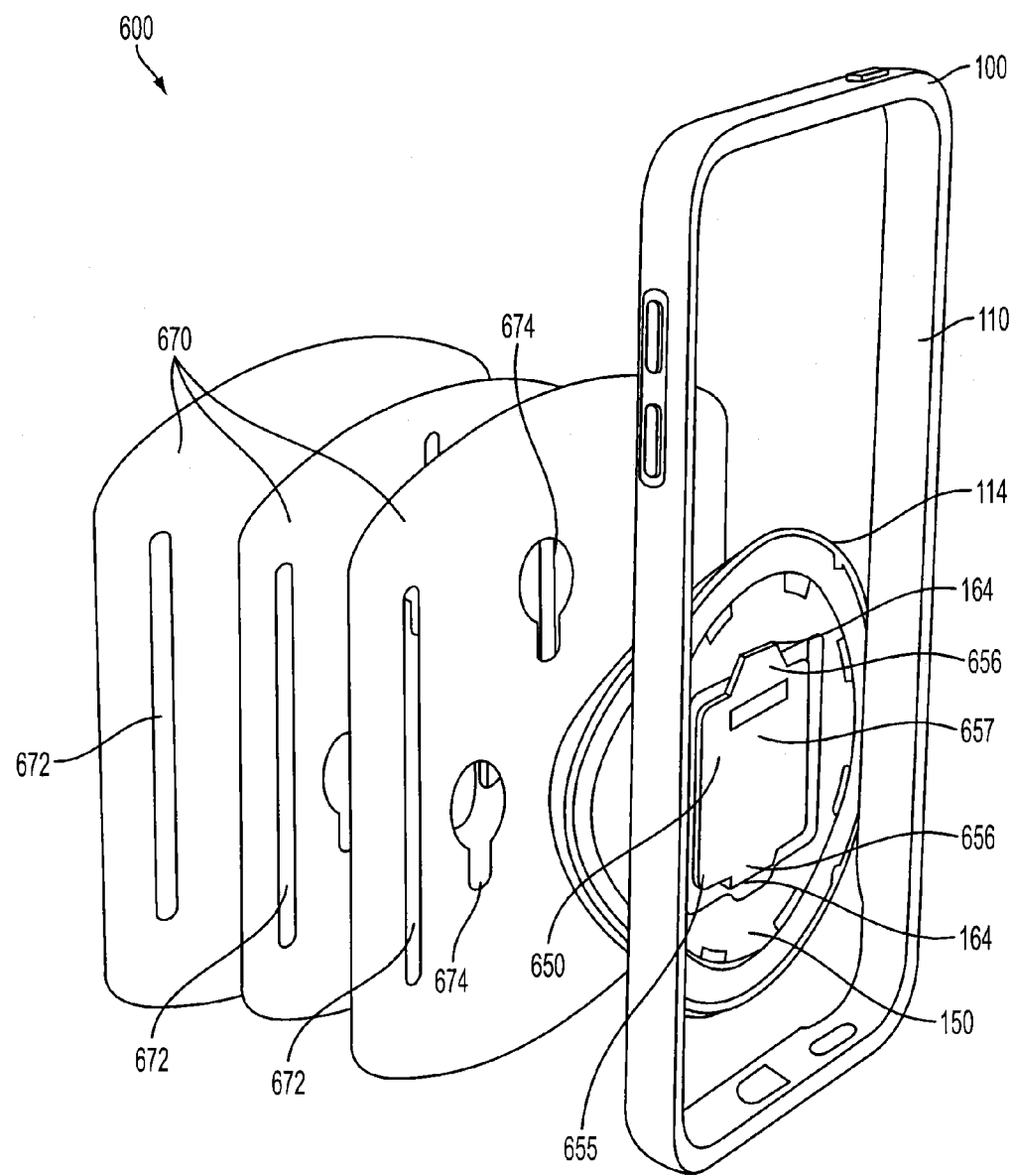
FIG. 6A is an exploded perspective view of a portion of mounting apparatus or system according to one or more embodiments of the present invention.
Figure 6B:
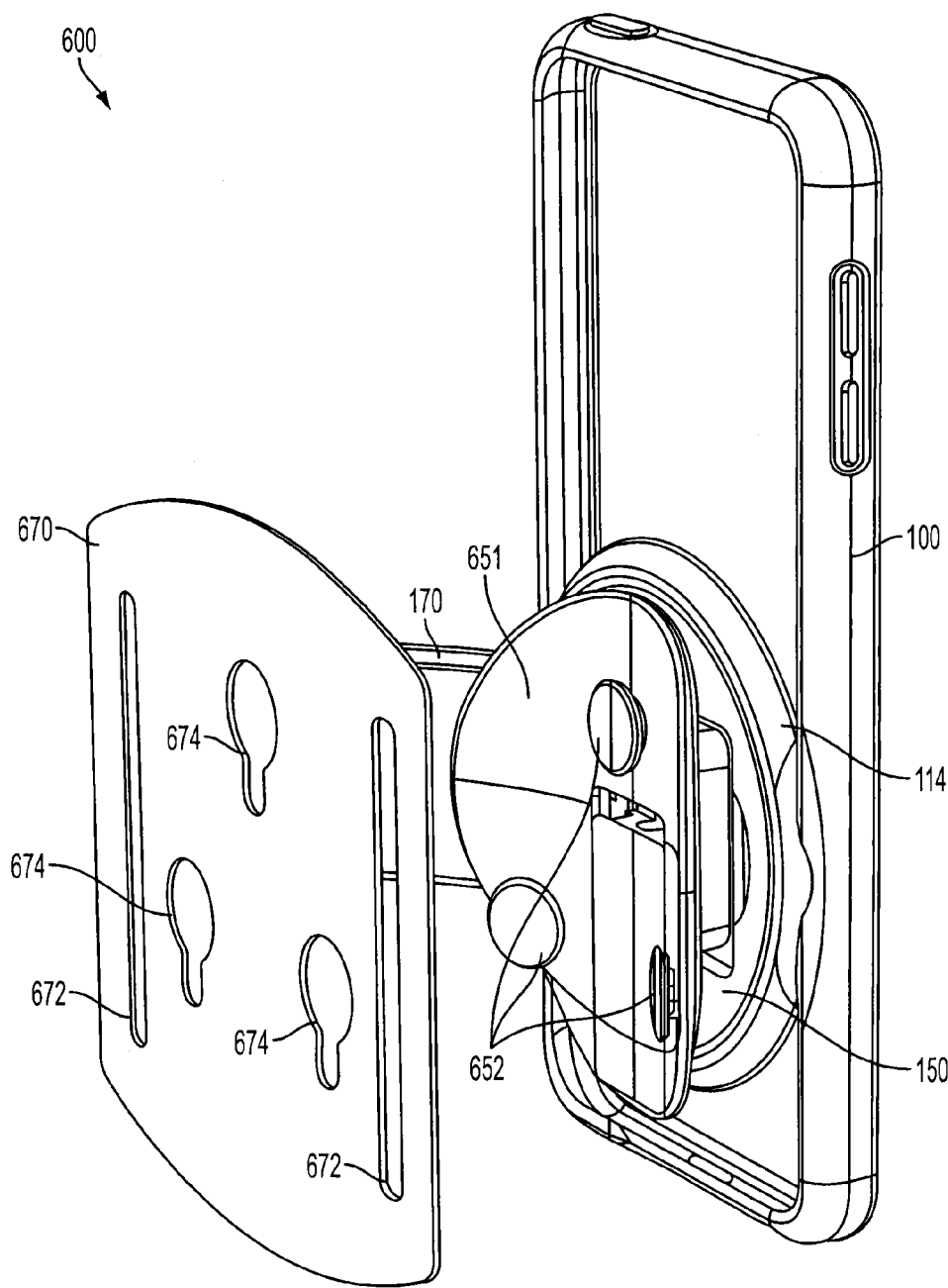
FIG. 6B is a non-exploded perspective view of a portion of the mounting apparatus or system of FIG. 6A.
Figure 6C:
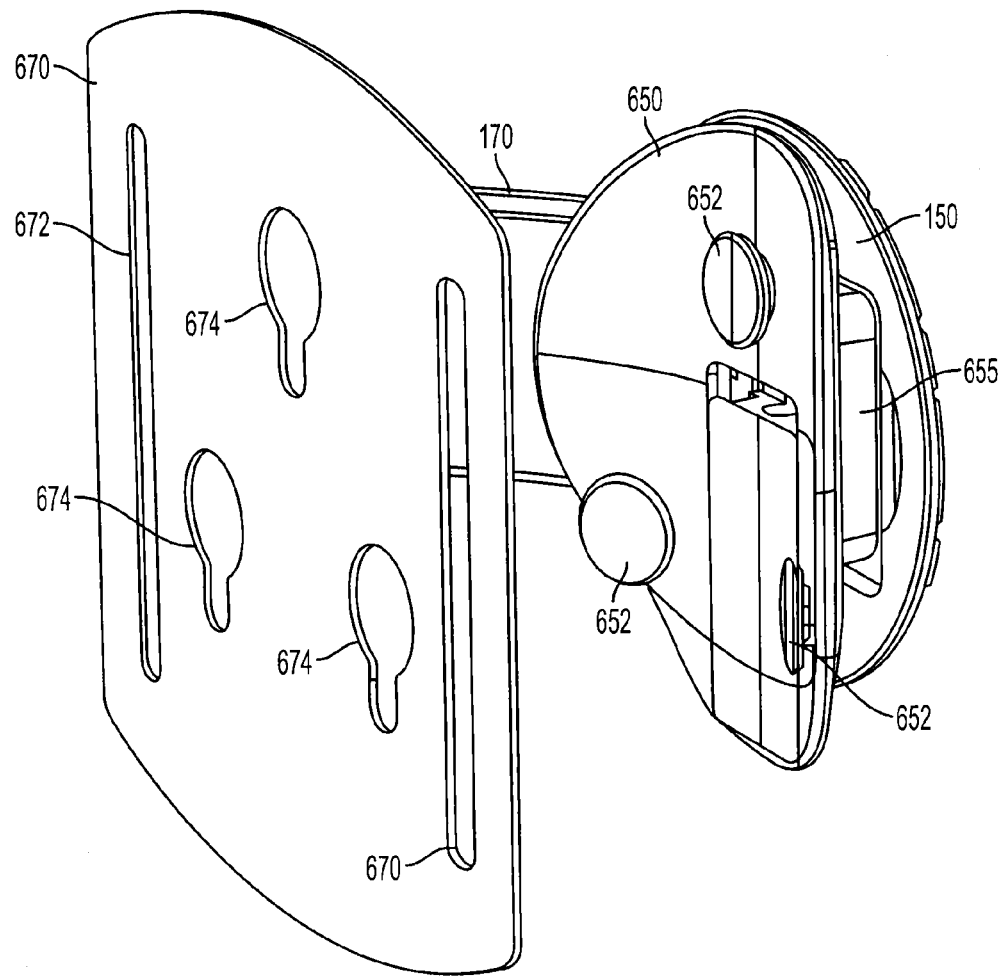
FIG. 6C is a perspective view of a portion of the mounting apparatus or system of FIG. 6A.
Figure 6F:
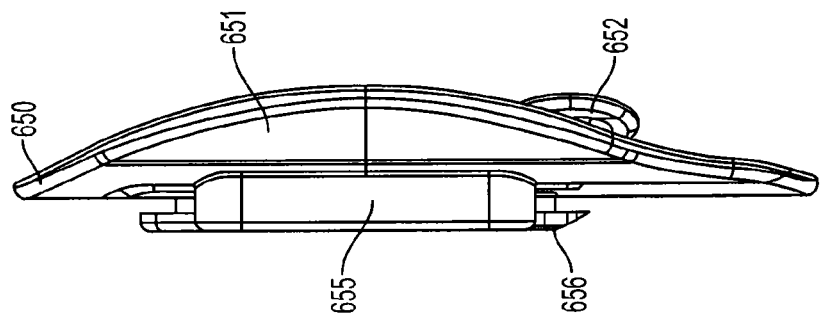
FIG. 6F is a left side view of a portion of the mounting apparatus or system of FIG. 6A.
Figure 6E:
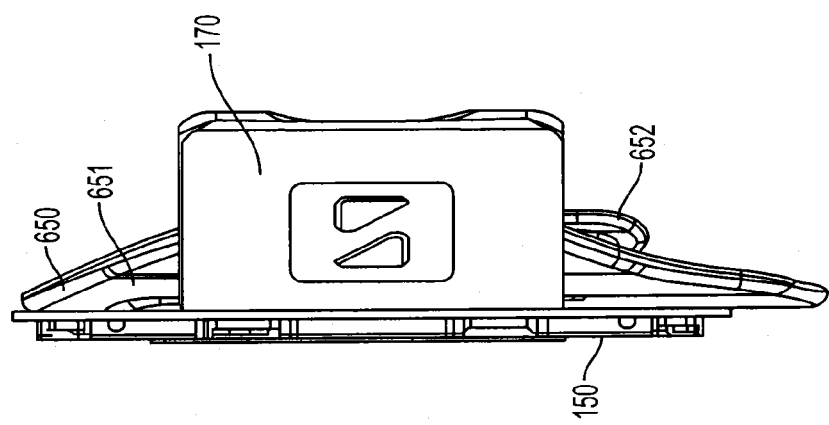
FIG. 6E is a right side view of a portion of the mounting apparatus or system of FIG. 6A.
Figure 6G:
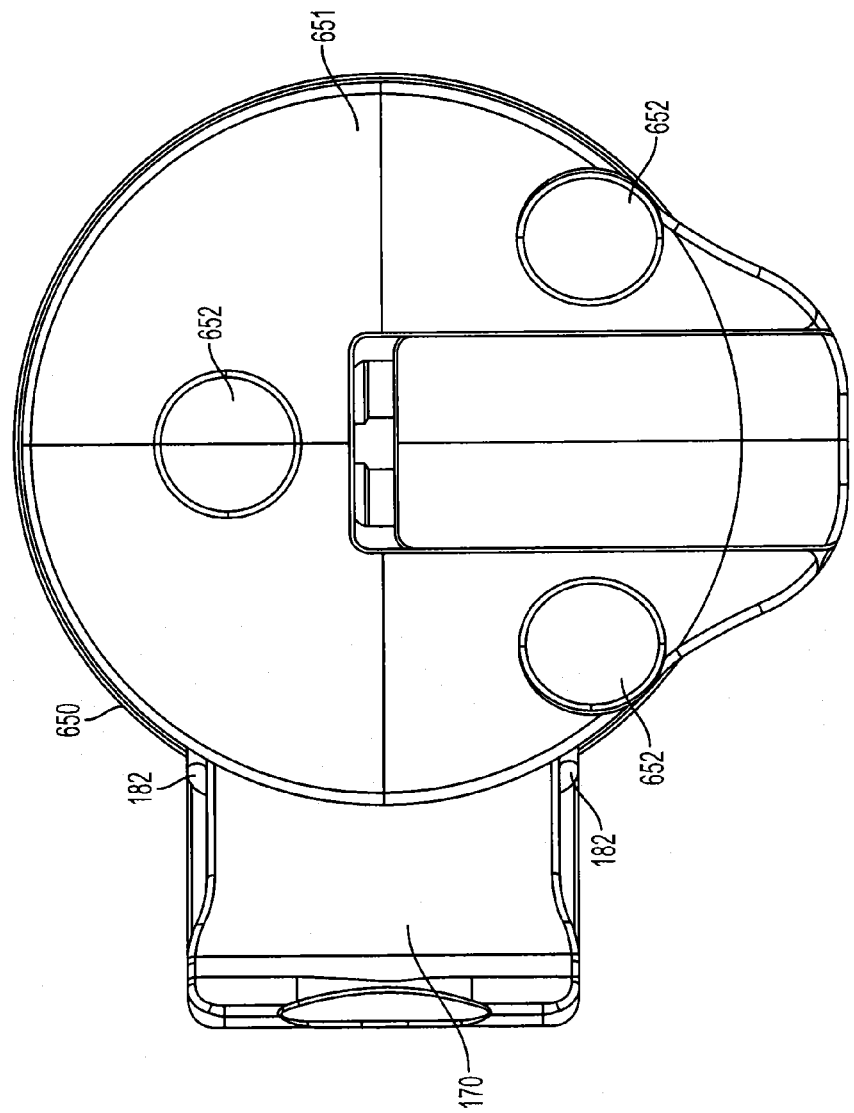
FIG. 6G is a cross-sectional rear-facing view of a portion of the mounting apparatus or system of FIG. 6A.
Figure 6H:
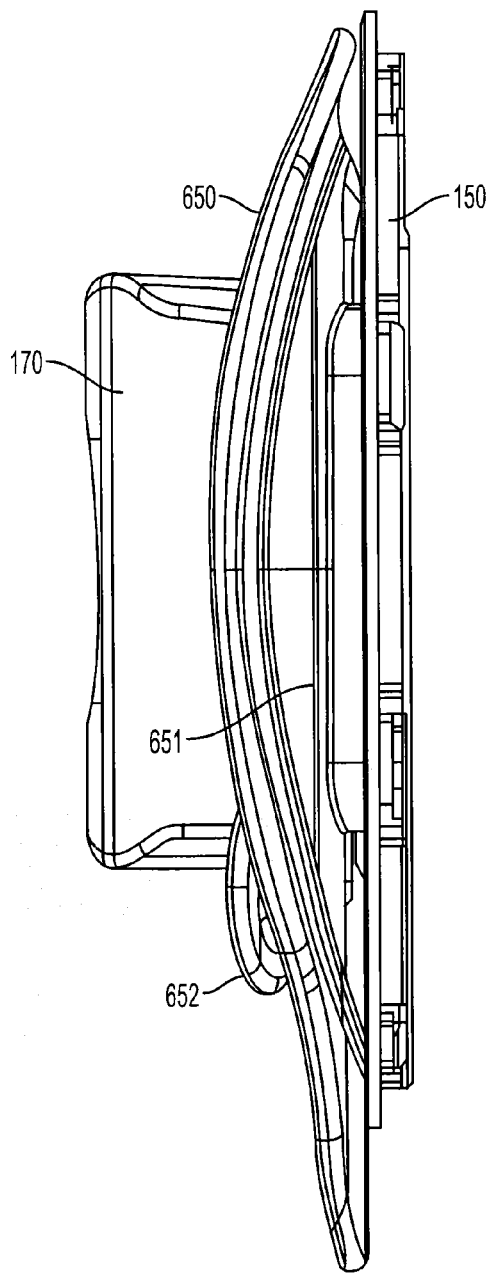
FIG. 6H is a view of a portion of the mounting apparatus or system of FIG. 6A according to another embodiment of the present invention.
Figure 6I:
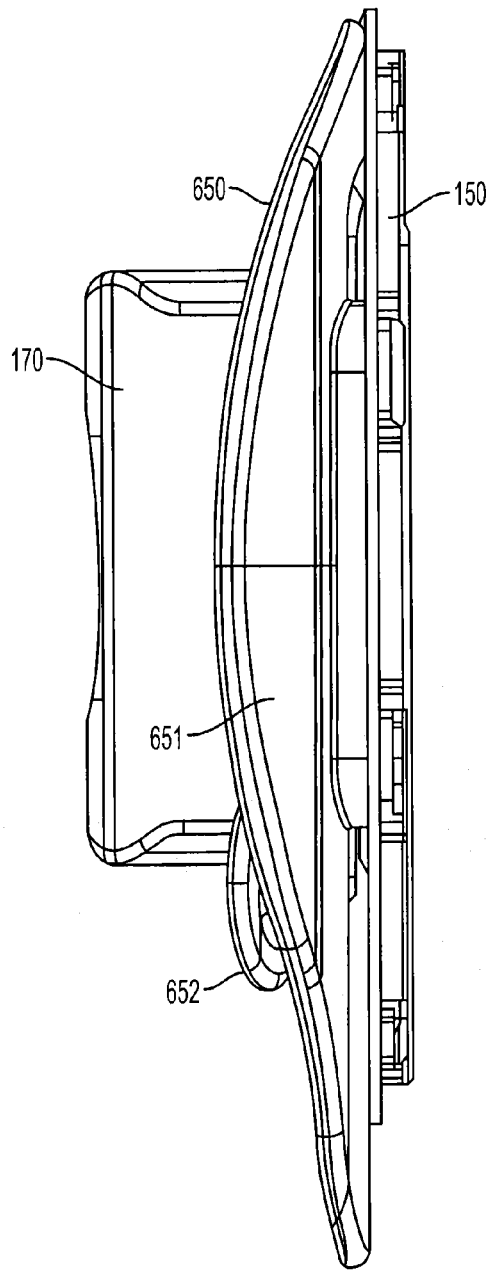
FIG. 6I is a side view of portions of the system of FIG. 6A, where a device holder is coupled to a coupling member.
Figure 6J:
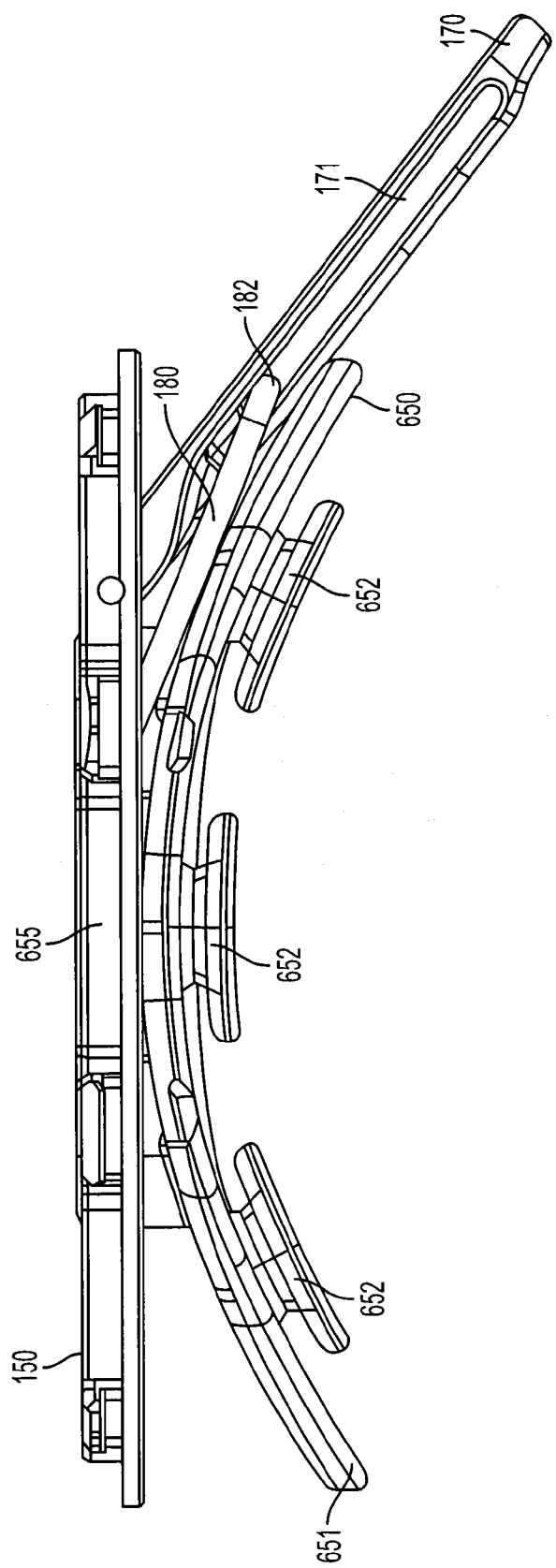
FIG. 6J is a side cross-sectional view of the portions of FIG. 6J.
Figure 6L:
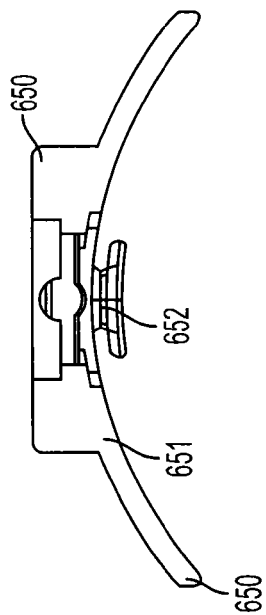
FIG. 6L is a front view of a portion of the mounting apparatus or system of FIG. 6A, with an engagement/disengagement member of the coupling member in a first position.
Figure 6K:
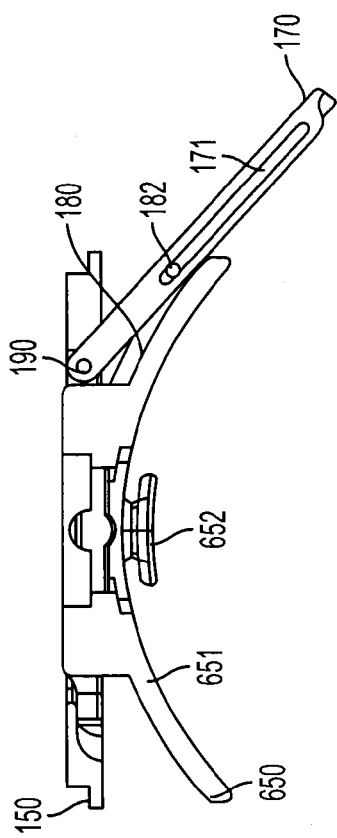
FIG. 6K is a side cross-sectional view of the coupling member of FIG. 6J.
Figure 6M:
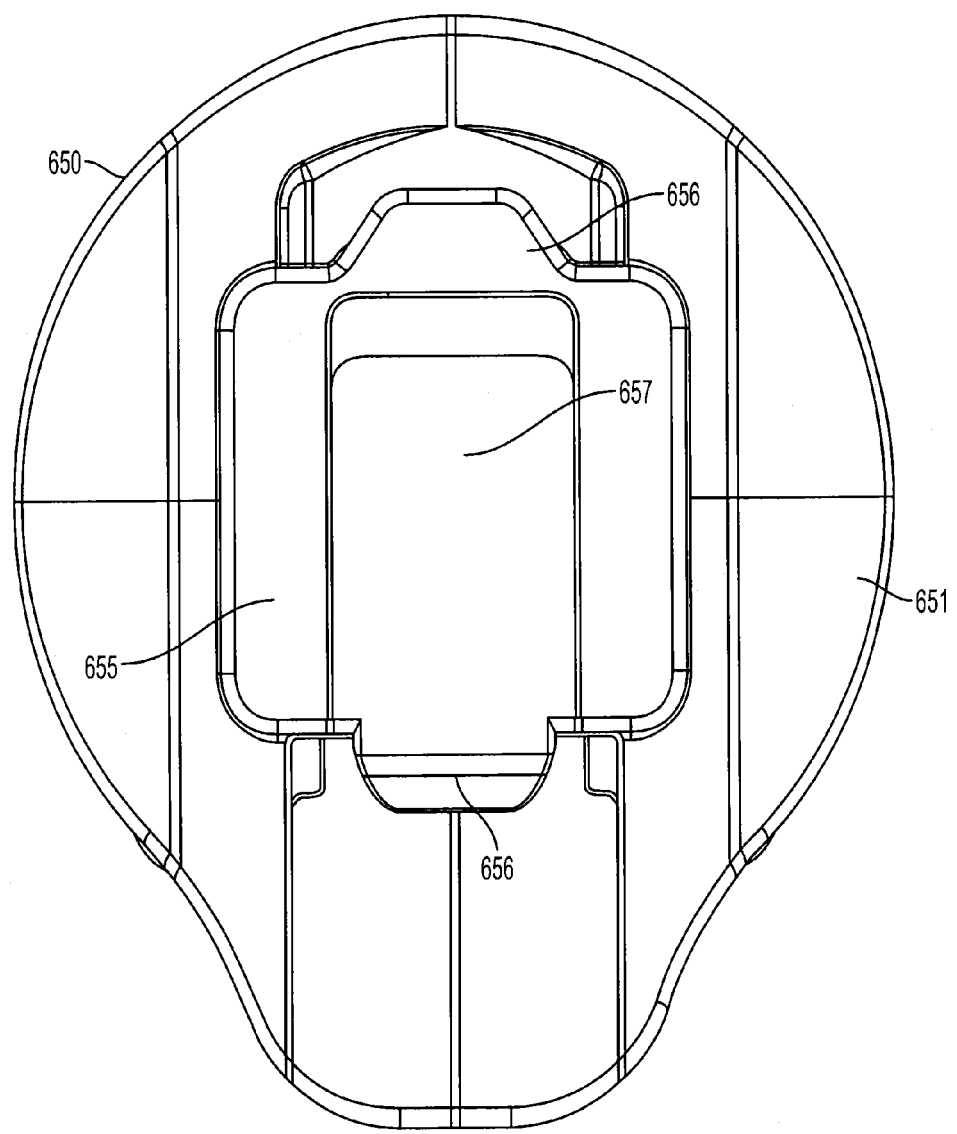
FIG. 6M is a rear view of the portion of the mounting apparatus or system of FIG. 6L, with the engagement/disengagement member in the first position.
Figure 6N:
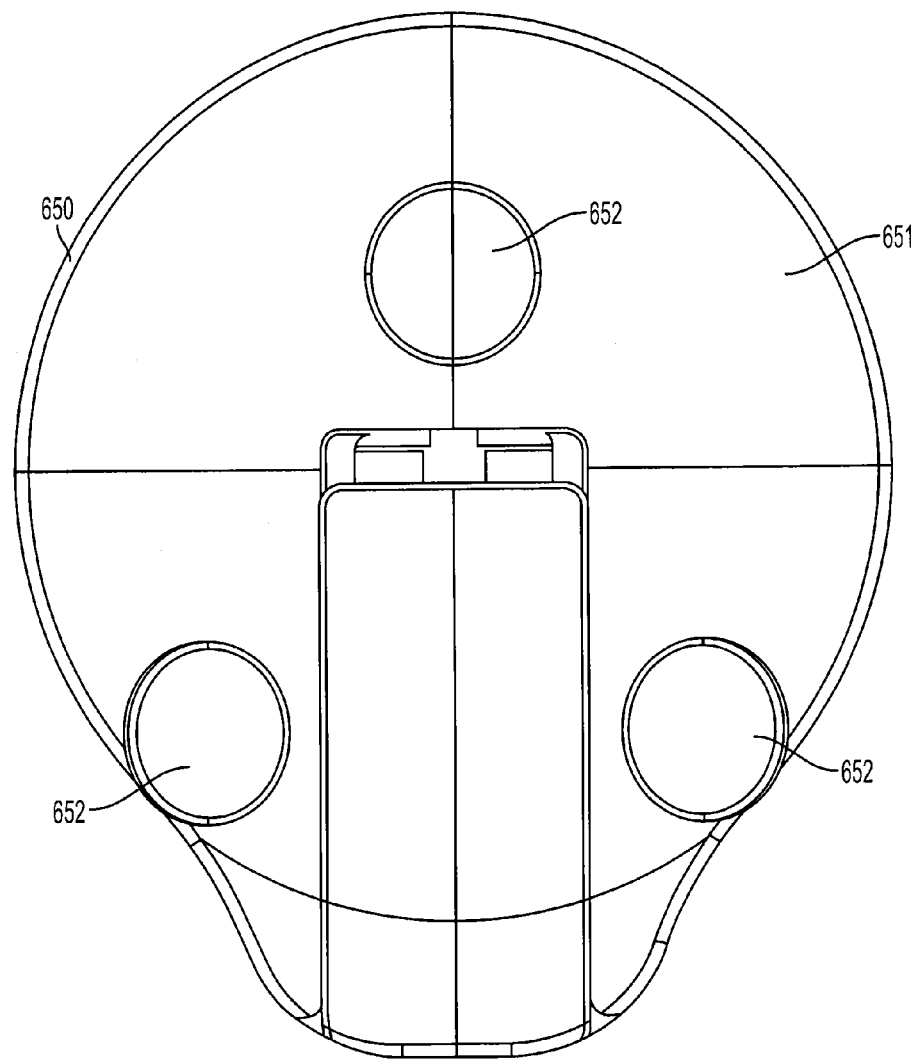
FIG. 6N is a top view of the coupling member of FIG. 6K.
Figure 6P:
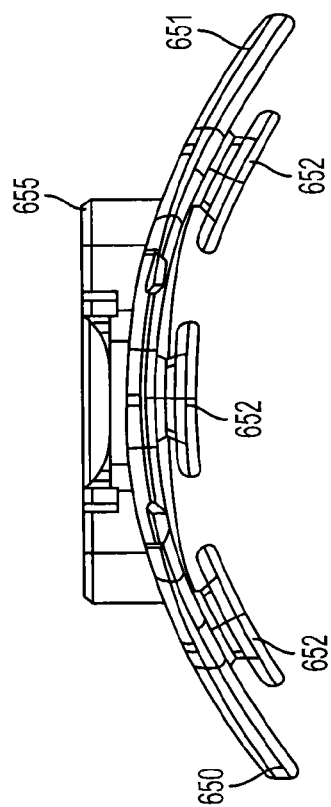
FIG. 6P is a perspective view of the coupling member of FIG. 6K, with the engagement/disengagement member in the first position.
Figure 6O:
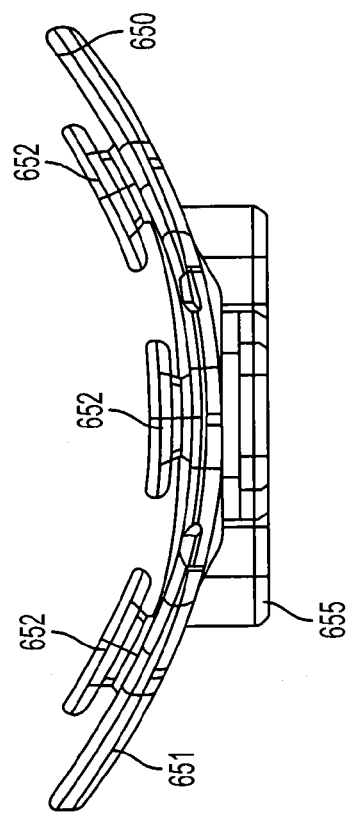
FIG. 6O is bottom end view of the coupling member of FIG. 6K.
Figure 6R:
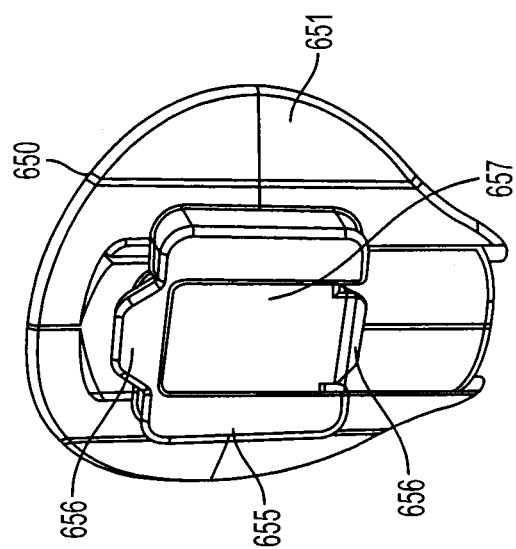
FIG. 6R is a perspective view of a portion of the mounting apparatus or system of FIG. 6A, with the engagement/disengagement member of the coupling member in the first position.
Figure 6Q:
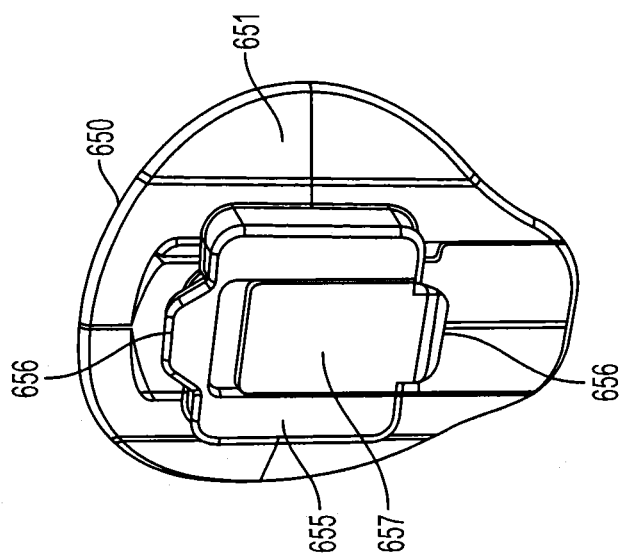
FIG. 6Q is a perspective view of the coupling member of FIG. 6K, with the engagement/disengagement member in a second position.
Figure 6T:
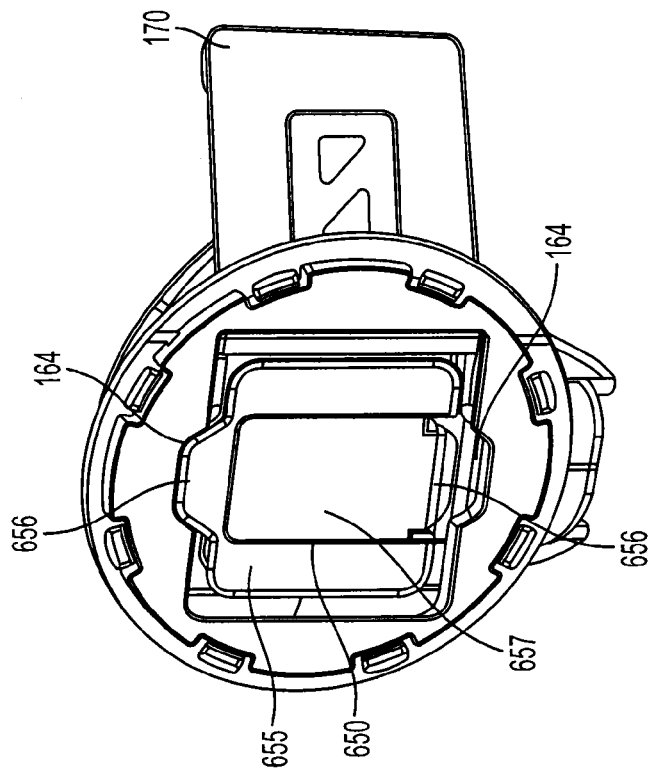
FIG. 6T is a cross-sectional perspective view of a portion of the system of FIG. 6A, with the engagement/disengagement member of the coupling member in the first position.
Figure 6S:
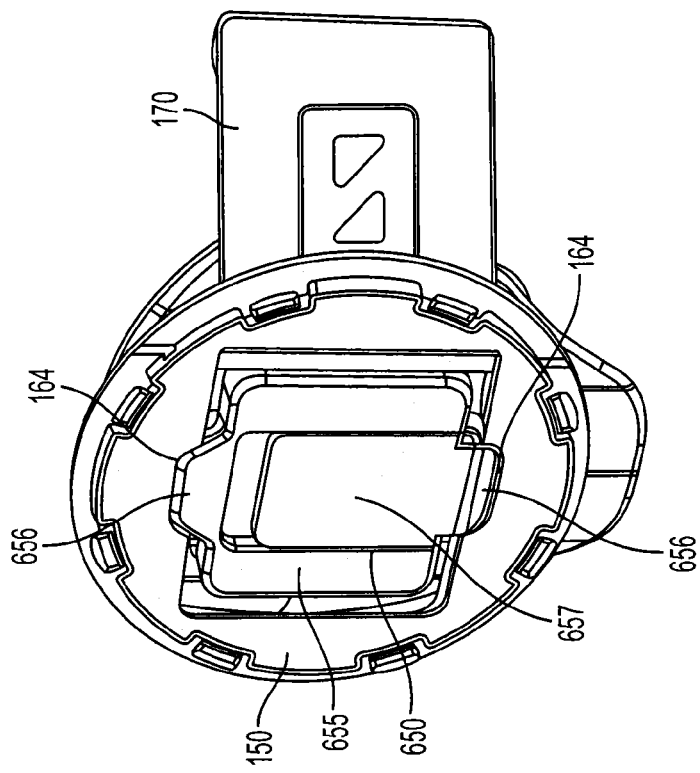
FIG. 6S is a perspective view of a portion of the mounting apparatus or system of FIG. 6A, with the engagement/disengagement member of the coupling member in the second position.
Figure 6V:
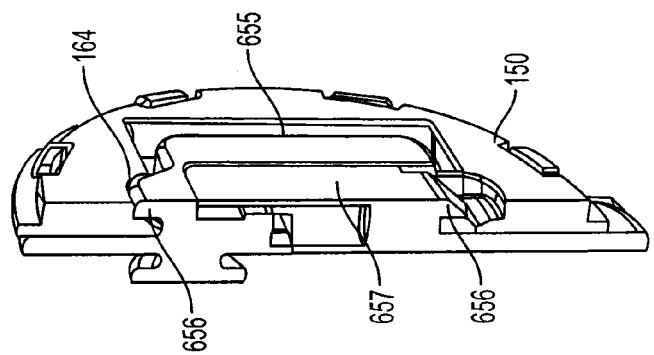
FIG. 6V is a cross-sectional perspective view of a portion of the system of FIG. 6A, with the engagement/disengagement member of the coupling member in the first position.
Figure 6U:
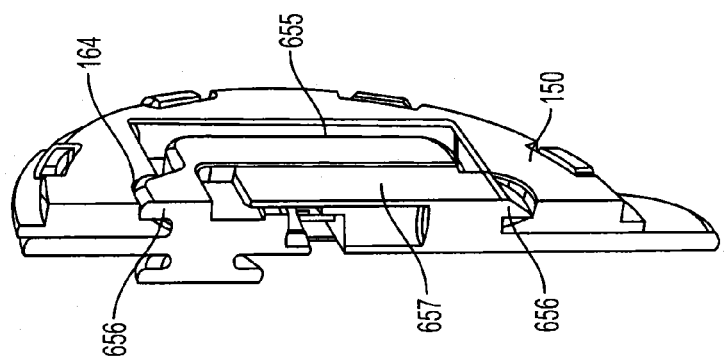
FIG. 6U is a cross-sectional perspective view of a portion of the system of FIG. 6A, with the engagement/disengagement member of the coupling member in the second position.

FIGS. 6A-6V illustrate a mounting apparatus or system 600 for mounting electronic device holders (and thus electronic devices) according to one or more embodiments of the present invention. The system 600 is for use with an arm band, but mounting apparatuses and systems as set forth herein are not so limited. As noted above, mounting systems can be for a torso or waist, a bicycle, a car, a dashboard, a back of a vehicle headrest, a stroller, or the like.

Mounting system 600 includes a holder for an electronic device, such as holder 100, a coupling member 650, and a mounting member 670. Generally speaking, holder 100 is removably coupled to coupling member 650, which is removably coupled to mounting member 670.

Mounting member 670 may include or be coupled to a cloth portion forming some or all of a strap (not expressly shown) that is removably coupleable to a user's arm, head, or waist, for example. More specifically, mounting member 670, which may include multiple layer portions for support or strength (illustrated in FIG. 6A), can have a strap inserted through slots 672 such that the ends of the strap can be fitted around a user's arm to form an arm band in order to mount the coupling member 650, the holder 100, and an electronic device to the user's arm. In an alternative embodiment (not shown), mounting member 670 may be inserted into a sleeve or pocket of an armband to be held in place in a predetermined location on the armband. In yet another embodiment, in the place of slots 672, one or more clips may be used.

Coupling member 650 and mounting member 670 may be coupled together via cooperating holes (e.g., notched holes) 674 and plugs 652 with relatively thinner bases sized to slide into and be retained by the notches of holes 674. Though FIGS. 6A-6V illustrate three holes 674 and plugs 652, less than three or more than three of such holes/plugs may be used. Further, other means to couple coupling member 650 and mounting member 670 together may be implemented, such as hook and loop fastening/fastener, snap fit, clips, or the like. Also note that in one or more embodiments, coupling member 650 may have a body portion 651 that is sized and/or shaped to fit the mounting member 670 and/or a body or object to which the mounting member 670 is to be mounted. For example, body portion 651 of coupling member 650 is sized and shaped (i.e., curved) to fit a human's arm.

Coupling member 650 can also include an engagement/disengagement member 655, which can include flanges 656, moveable member 657, and sliding member 658 coupled to moveable member 657. Optionally, moveable member 657 and sliding member 658 can be formed as one piece or they may be separate pieces coupled together. Engagement/disengagement member 655 can be inserted into opening 161 when the stand 170 of the holder 100 is extended (e.g., partially and/or fully). More specifically, engagement/disengagement member 655 may be inserted into opening 161 such that flanges 656 are aligned with slots 164, for example, as illustrated in FIGS. 6A, 6D, 6R, 6U, and 6V. One of the flanges 656 may be formed as part of or in once piece with moveable member 657, and moveable member 657 may be movable such that its corresponding flange 656 can be inserted into and removed from a corresponding slot 164 to be fixedly engaged with or coupled to holder 100. More specifically, movable member 657 may be slide along a track, for example, outwardly from a position illustrated in FIGS. 6Q, 6S, 6U to a position illustrated in FIGS. 6L, 6P, 6R, 6T, and 6V the latter of which being to engage and lock the coupling member 650 to the holder 100 and the former of which being to disengage and unlock the coupling member 650 from the holder 100. Optionally, the moveable member 657 may be biased in the engaged/locked position (i.e., the outward position) by a spring or other biasing member (shown diagrammatically as item 659 in FIGS. 6G and 6M). Optionally, the moveable member 657 may be held in the engaged or locked position by a locking device, such as a snap or ridge to mate in locking fashion to the slot 164. Additionally, a side of the engagement/disengagement member 655 perpendicular to the sides of the engagement/disengagement member 655 having the flanges 656 may abut a fastening portion 190 of stand 170 to provide a more stable and reliable fit and lock. Moveable member 657 can be moved in correspondence with movement of sliding member 658. That is, a user may push sliding member 658 (upward in the case of FIG. 6M, for example) to move the moveable member 657 in the same direction, for example, so the engagement/disengagement member 655 can be inserted into opening 161. The sliding member 658 can be moved to an engagement position (downward in the case of FIG. 6M, for example) to make the moveable member 657 also move in the same direction in order to engage and lock the engagement/disengagement member 655 to the holder 100. In embodiments, the biasing member 569 may bias and push the sliding member 658 and thus the moveable member 657 to the engagement position. That is, the engagement position, such as the position illustrated in FIGS. 6L, 6M, 6P, 6R, 6T, and 6V, may be the "home" position for the sliding member 658 and the moveable member 657.

In the engaged and locked position, the body portion 110 of holder 100 can rotate about support portion 150 of holder 100, coupling member 650, and mounting member 670. Thus, when mounted, the body portion 110 of holder 100 and thus an electronic device held therein can be rotated to change its orientation, for example, from landscape view to portrait view or vice versa.

Having now described embodiments of the disclosed subject matter, it should be apparent to those skilled in the art that the foregoing is merely illustrative and not limiting, having been presented by way of example only. Thus, although particular configurations have been discussed and illustrated herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:
1. A holder for a portable device, comprising:
a body including a coupling portion configured to couple a portable device to the body via a front face of the body; and
a support rotatably coupled to the body such that an orientation of the support relative to the body is changeable to a plurality of different orientations, a portion of the support being movable between a fully retracted position and a fully extended position relative to the body, the portion of the support being fixable at the fully extended position and a plurality of positions between the fully retracted position and the fully extended position, the support being engageable with a support surface in any of its extended positions in any of its orientations, and capable of supporting the weight of the body and the portable device in any combination of orientation and position of the support, wherein the movable portion of the support is a stand, and the support further including a base and a coupler, the coupler being coupled to the base and the stand, and the stand being coupled to the base and the coupler, wherein the coupler is slidably coupled to the stand and rotatably coupled to the base, wherein the stand is rotatably coupled to the base, wherein the stand has a length running from a first end portion at which the stand is rotatably coupled to the base to a second end portion opposite the first end portion, the second end portion being free and without connection, wherein in the fully retracted position no portion of the stand extends past a circular outer perimeter of the base in a rear plan view of the holder, and wherein the coupler is rotatably coupled to the base about a first axis, the first axis being in a same position when the stand is in the fully retracted position and in the fully extended position.

2. The holder according to claim 1,
wherein the coupler is slidably coupled to the stand in a friction-fit manner.

3. The holder according to claim 1,
wherein the plurality of positions between the fully retracted position and the fully extended position include any position between the fully retracted and fully extended positions.

4. The holder according to claim 1,
wherein the coupler is slidably and friction-fit coupled to the stand so as to be movable between the fully extended position and the retracted position, the friction-fit coupling being provided by a friction sleeve of the stand through which a portion of the coupler traverses.

5. The holder according to claim 4,
wherein the coupler is a U-shaped pin, wire, or rod.

6. The holder according to claim 1,
wherein the body includes a backside portion that is cut-out or clear over fifty percent of a back side of the body.

7. The holder according to claim 1,
wherein the body includes a backside portion that is cut-out or clear over seventy-five percent of a back side of the body.

8. The holder according to claim 1,
wherein the fully extended position of the stand is greater than 90 degrees.

9. The holder according to claim 1,
wherein the support is rotatable relative to the body by more than 270 degrees.

10. The holder according to claim 1,
wherein the holder consists of three distinct plastic or rubber components and a metal component, the plastic or rubber components being the body, the base, and the stand, and the metal component being the coupler.

11. The holder according to claim 1,
wherein the stand is flush or substantially flush with an uppermost portion of the base in one or more of side, end, and cross-sectional view.

12. The holder according to claim 1,
wherein the support is configured to be removably coupled to a mounting apparatus, and the body is rotatable relative to the mounting apparatus when the support is coupled to the mounting apparatus.

13. The holder according to claim 1, further comprising a mounting apparatus that is removably attachable to a wearer to removably attach the holder to the wearer, the support being removably coupled to the mounting apparatus, and the body being rotatable about an axis such that the orientation of the support relative to the body and the mounting apparatus is changeable to the plurality of different orientations.

14. The holder according to claim 1,
wherein the stand is unsegmented along a length thereof, and
wherein the second end portion of the stand is embedded in the base in the fully retracted position.

15. The holder according to claim 1,
wherein, from a side view, an upper-most surface of the stand is flush with an upper-most surface of the base and an upper-most surface portion of the body when the stand is in the fully retracted position.

16. The holder according to claim 1, wherein the stand is a one-piece stand.

17. A method comprising:
providing a plastic holder for a portable electronic device, the holder including:
a body having a coupling portion configured to couple the portable electronic device to the body via a front side of the body; and
a support rotatably coupled to the body such that an orientation of the support relative to the body is changeable to support the body and the portable electronic device in a plurality of different orientations, the support including a base, a coupling mechanism in a form of a generally U-shaped metallic pin, and a stand, the coupling mechanism being pivotably coupled to the base about a first axis, the stand being pivotably coupled to the base about a second axis different from the first axis, the coupling mechanism being slidably coupled to the stand such that a portion of the coupling mechanism is always frictionally slidable from a first end to a second end of a hollow sleeve portion formed in the stand such that the stand is fixable at a fully extended position and a plurality of positions between a fully retracted position and the fully extended position, the stand being engageable with a support surface in any of its extended positions in any of its orientations, the hollow sleeve portion being without surface features, and the plurality of positions between the fully retracted position and the fully extended position being any undefined fixable position between the fully retracted and fully extended positions,
wherein the stand has a first end portion that is pivotably coupled to the base and a second end portion opposite the first end portion that is free, unconnected, and engageable with a support surface,
wherein, in the fully retracted position, the stand is entirely surrounded by an outer perimeter of the base in a front or rear plan view of the plastic holder, and
wherein the first axis at which the coupling mechanism is pivotably coupled to the base is configured to be in a same position when the stand is in the fully retracted position and in the fully extended position.

18. The method according to claim 17, wherein the body includes a back side with at least two separate cut-out or clear portions.

19. The method according to claim 17, further comprising coupling the portable electronic device to the body via the front side of the body.

20. The method according to claim 17, wherein the hollow sleeve portion includes two separate sleeves.

21. The method according to claim 17, wherein the hollow sleeve portion consists of a single sleeve.

22. The method according to claim 17, wherein, of plastic components, the holder consists of three distinct plastic components, the three plastic components being the body, the base, and the stand.

23. The method according to claim 17, wherein a middle portion of the coupling mechanism in the form of the generally U-shaped metallic pin is slidably coupled to the stand such that the middle portion of the coupling mechanism is always frictionally slidable from the first end to the second end of the hollow sleeve portion formed in the stand such that the stand is fixable at the fully extended position and the plurality of positions between the fully retracted position and the fully extended position, and wherein ends of the coupling mechanism in the form of the generally U-shaped metallic pin are pivotably coupled to the base about the first axis.

24. The method according to claim 17, wherein the body is configured to be rotatable relative to a mounting apparatus when the holder is coupled to the mounting apparatus.

25. The method according to claim 17, wherein the stand is a one-piece stand.

26. The method according to claim 17, wherein the stand is unsegmented and unjointed along an entire length thereof, the length running from the first end portion to the second end portion.

* * * * *